(12) United States Patent
Schilders

(10) Patent No.: US 12,645,647 B1
(45) Date of Patent: Jun. 2, 2026

(54) GRAPH-BASED MODELS USING EXTERNAL DATASTORE

(71) Applicants: Infosys Limited, Bangalore (IN); InventIT Inc., Columbus, IN (US)

(72) Inventor: Steven Schilders, Columbus, IN (US)

(73) Assignees: Infosys Limited, Bangalore (IN); InvertIT Inc., Columbus, IN (US)

( * ) Notice: Subject to any disclaimer, the term of this patent is extended or adjusted under 35 U.S.C. 154(b) by 0 days.

(21) Appl. No.: 19/094,751

(22) Filed: Mar. 28, 2025

(30) Foreign Application Priority Data

Mar. 28, 2025 (IN) .............................. 202541030569

(51) Int. Cl.
*G06F 16/21* (2019.01)
(52) U.S. Cl.
CPC .................................. *G06F 16/211* (2019.01)
(58) Field of Classification Search
None
See application file for complete search history.

(56) References Cited

U.S. PATENT DOCUMENTS

| | | | |
|---|---|---|---|
| 7,930,160 B1 * | 4/2011 | Hosagrahara | ........... G06F 30/00 703/13 |
| 12,164,569 B2 | 12/2024 | Schilders | |
| 12,222,986 B2 | 2/2025 | Schilders | |
| 2020/0151608 A1 * | 5/2020 | Bhowan | .............. G06F 16/9024 |
| 2024/0256603 A1 | 8/2024 | Schilders | |

* cited by examiner

*Primary Examiner* — Eddy Cheung
(74) *Attorney, Agent, or Firm* — Finnegan, Henderson, Farabow, Garrett & Dunner, LLP

(57) ABSTRACT

An overlay system is provided that includes a storage element and processing circuitry coupled thereto. The processing circuitry receives a stimulus associated with the overlay system and creates an executable graph-based model that implements an external datastore in the storage element, based on the stimulus. The processing circuitry creates, in the executable graph-based model, a plurality of node groups that implements a plurality of schemas associated with the external datastore, with a first node group created for a first schema. The processing circuitry creates, in the first node group, a first set of active nodes that implements a first database object associated with the first schema. The processing circuitry creates, in the first node group, a second set of active nodes that implements a first set of database records associated with the first database object. The processing circuitry executes one or more operations in the executable graph-based model.

20 Claims, 20 Drawing Sheets

500

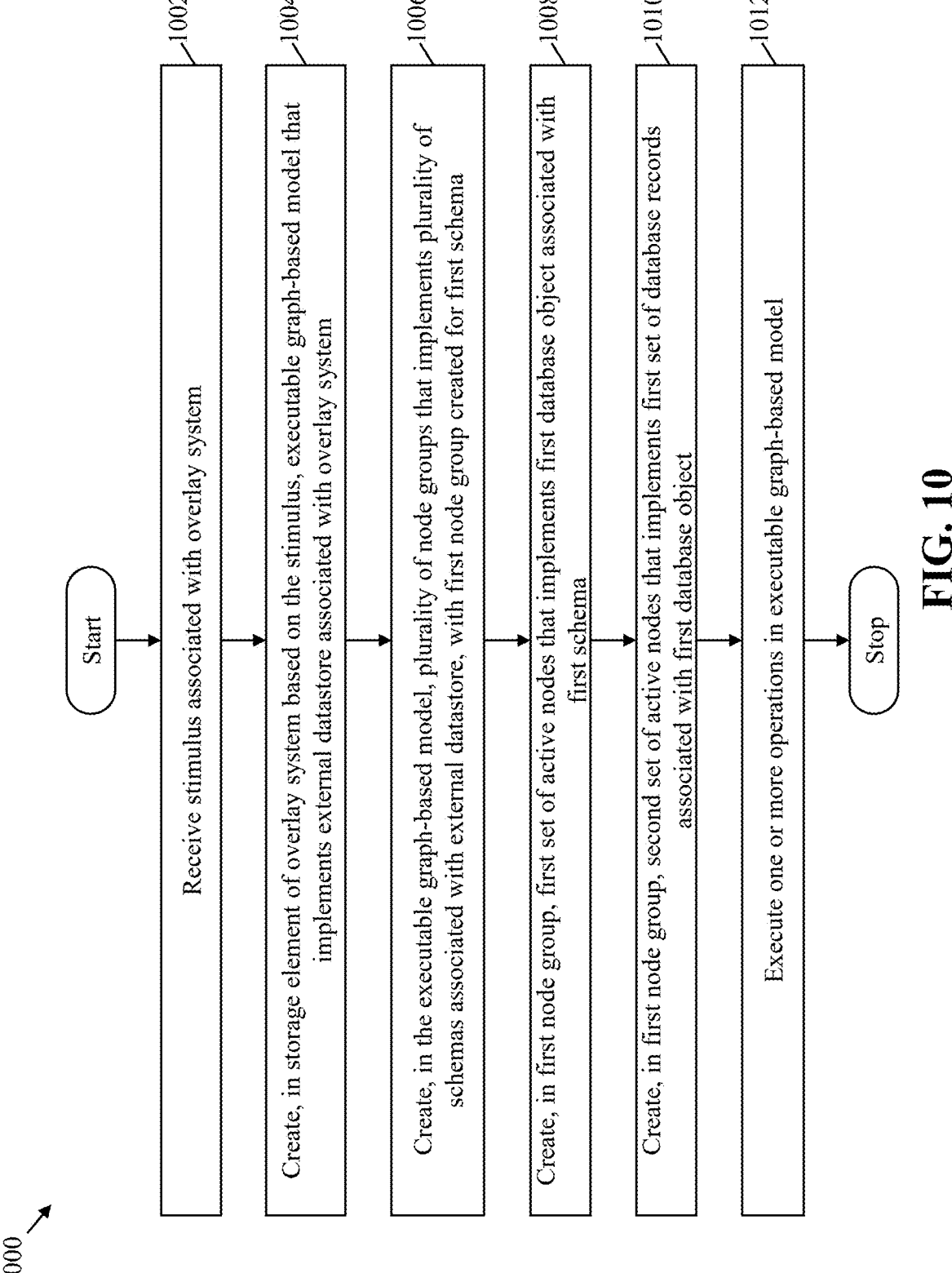

1000

Start

Receive stimulus associated with overlay system
1002

Create, in storage element of overlay system based on the stimulus, executable graph-based model that implements external datastore associated with overlay system
1004

Create, in the executable graph-based model, plurality of node groups that implements plurality of schemas associated with external datastore, with first node group created for first schema
1006

Create, in first node group, first set of active nodes that implements first database object associated with first schema
1008

Create, in first node group, second set of active nodes that implements first set of database records associated with first database object
1010

Execute one or more operations in executable graph-based model
1012

Stop

FIG. 10

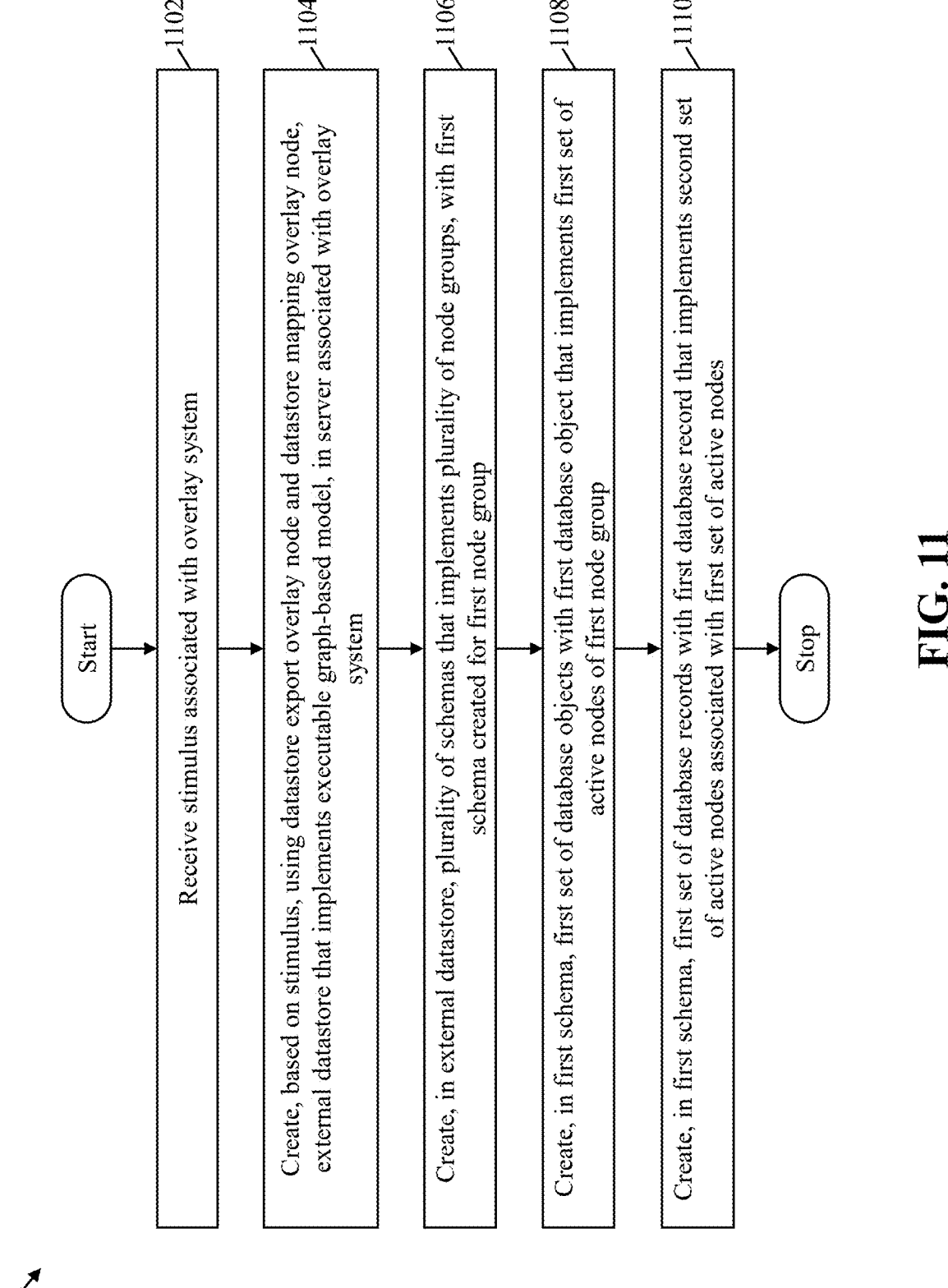

1100

Start

1102 — Receive stimulus associated with overlay system

1104 — Create, based on stimulus, using datastore export overlay node and datastore mapping overlay node, external datastore that implements executable graph-based model, in server associated with overlay system 1106 — Create, in external datastore, plurality of schemas that implements plurality of node groups, with first schema created for first node group 1108 — Create, in first schema, first set of database objects with first database object that implements first set of active nodes of first node group 1110 — Create, in first schema, first set of database records with first database record that implements second set of active nodes associated with first set of active nodes Stop

FIG. 11

GRAPH-BASED MODELS USING EXTERNAL DATASTORE

FIELD OF THE DISCLOSURE

Various embodiments of the present disclosure relate generally to graph-based models. More specifically, various embodiments of the present disclosure relate to executable graph-based models using an external datastore.

BACKGROUND

Data is essential across various domains such as artificial intelligence (AI), machine learning (ML), healthcare, finance, and cybersecurity. In these domains, the data may be used for various tasks such as diagnostics in healthcare, fraud detection and risk assessment in finance, training, predictions, and classifications in AI and ML, or the like. In these domains, the data is loaded from external storage systems or remote databases into a processing environment for data processing. Further, the processed data is unloaded from the processing environment and stored in the external storage systems or remote databases. However, the loading and unloading of the data incur significant computational overheads. This may further lead to delayed execution of the operations that may prove to be fatal in critical tasks. If the process of loading and unloading data takes excessive time, it may introduce latency that may affect the overall performance of the system.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating graph-based models using external datastores are provided substantially as shown in, and described in connection with, at least one of the figures.

Certain embodiments of the disclosure may disclose an overlay system. The overlay system comprises a storage element and processing circuitry that is coupled to the storage element. The processing circuitry is configured to receive a stimulus associated with the overlay system. Further, the processing circuitry is configured to create, in the storage element, based on the stimulus, an executable graph-based model that implements an external datastore associated with the overlay system. The processing circuitry is further configured to create, in the executable graph-based model, a plurality of node groups that implements a plurality of schemas associated with the external datastore, with a first node group created for a first schema. Additionally, the processing circuitry is configured to create, in the first node group, a first set of active nodes that implements a first database object associated with the first schema. Furthermore, the processing circuitry is configured to create, in the first node group, a second set of active nodes that implements a first set of database records associated with the first database object. The processing circuitry is further configured to execute one or more operations in the executable graph-based model.

In some embodiments, the processing circuitry is further configured to create, in the storage element, a datastore import overlay node that extends functionality of the executable graph-based model, and a datastore mapping overlay node that extends functionality of the datastore import overlay node. Further, the processing circuitry is configured to determine, using the datastore import overlay node, the first schema of the plurality of schemas. The first node group, that implements the first schema, is created using the datastore mapping overlay node.

In some embodiments, the processing circuitry is further configured to determine, using the datastore import overlay node, at least one of a set of data formats, a set of views, a set of triggers, or a size, of the first schema. Additionally, the creation of the first node group is further based on the determination of at least one of the set of data formats, the set of views, the set of triggers, or the size, of the first schema.

In some embodiments, the processing circuitry is further configured to create, in the executable graph-based model, a schema import overlay node that extends functionality of the first node group, and a schema mapping overlay node that extends functionality of the schema import overlay node. The first schema has a plurality of database objects associated therewith. Further, the processing circuitry is configured to determine, using the schema import overlay node, the first database object of the plurality of database objects. The first set of active nodes, that implements the first database object, is created using the schema mapping overlay node.

In some embodiments, the processing circuitry is further configured to create, in the executable graph-based model, a data import overlay node that extends functionality of the first node group, and a data mapping overlay node that extends functionality of the data import overlay node. The processing circuitry is further configured to determine, using the data import overlay node, the first set of database records associated with the first database object. The second set of active nodes, that implements the first set of database records, is created using the data mapping overlay node.

In some embodiments, the processing circuitry is further configured to create, in the executable graph-based model, a listener overlay node that extends functionality of the data import overlay node. The processing circuitry is further configured to monitor the first schema of the external datastore using the listener overlay node and the data import overlay node. Further, the processing circuitry is configured to update, using the data mapping overlay node, the first node group in the executable graph-based model based on the monitoring of the first schema.

In some embodiments, the update of the first node group corresponds to at least one of addition, modification, or deletion of one or more active nodes in the first node group.

In some embodiments, the monitoring of the first schema is periodic.

In some embodiments, the monitoring of the first schema is continuous.

In some embodiments, the update of the first node group is periodic.

In some embodiments, the update of the first node group is in real-time.

In some embodiments, the processing circuitry is further configured to create, in the executable graph-based model, a search overlay node that extends functionality of the data import overlay node. Further, the processing circuitry is configured to search, using the search overlay node and the data import overlay node, the first schema based on a search value and retrieve, based on the search, a second set of database records from the first schema. The processing circuitry is further configured to create, using the data mapping overlay node, a third set of active nodes in the first node group that implements the retrieved second set of database records.

In some embodiments, the processing circuitry is further configured to create, in the executable graph-based model, a lookup overlay node that extends functionality of the data import overlay node. Further, the processing circuitry may be configured to lookup, using the lookup overlay node and the data import overlay node, the first schema based on one or more identifiers associated with the external datastore. Additionally, the processing circuitry may be configured to retrieve, based on the lookup, a second set of database records from the first schema. The processing circuitry is further configured to create, using the data mapping overlay node, a third set of active nodes in the first node group that implements the retrieved second set of database records.

In some embodiments, the processing circuitry is further configured to create, in the executable graph-based model, a data import overlay node that extends functionality of the first node group, and a data mapping overlay node and a retrieve-all overlay node, that extend functionality of the data import overlay node. Further, the processing circuitry is configured to retrieve, using the data import overlay node and the retrieve-all overlay node, the first set of database records associated with the first database object. The second set of active nodes that implements the first set of database records is created using the data mapping overlay node.

In some embodiments, the execution of the one or more operations in the executable graph-based model results in modification of the executable graph-based model.

In some embodiments, the modification of the executable graph-based model corresponds to addition of a third set of active nodes in the first node group of the executable graph-based model. Further, the processing circuitry is configured to create a data export overlay node that extends functionality of the first node group, and a data mapping overlay node that extends functionality of the data export overlay node. The processing circuitry is further configured to identify, using the data mapping overlay node, the third set of active nodes added to the first node group. Furthermore, the processing circuitry is configured to create, using the data export overlay node, a second set of database records that implements the identified third set of active nodes in the first schema of the external datastore.

In some embodiments, the processing circuitry is further configured to create a creation overlay node that extends functionality of the data export overlay node. The creation of the second set of database records in the first schema is further based on the creation overlay node.

In some embodiments, the modification of the executable graph-based model corresponds to modification of a third set of active nodes in the executable graph-based model. Further, the third set of active nodes includes one or more active nodes of the second set of active nodes. The processing circuitry is further configured to create a data export overlay node that extends functionality of the first node group, and a data mapping overlay node that extends functionality of the data export overlay node. Further, the processing circuitry is configured to identify, using the data mapping overlay node, the modified third set of active nodes in the first node group, and update, using the data export overlay node, one or more database records of the first set of database records based on the identified third set of active nodes.

In some embodiments, the processing circuitry is further configured to create an update overlay node that extends functionality of the data export overlay node, where the update of the one or more database records of the first set of database records in the first schema is further based on the update overlay node.

In some embodiments, the modification of the executable graph-based model corresponds to deletion of a third set of active nodes in the first node group of the executable graph-based model, where the third set of active nodes includes one or more active nodes of the second set of active nodes. Further, the processing circuitry is configured to create a data export overlay node that extends functionality of the first node group and a data mapping overlay node that extends functionality of the data export overlay node. The processing circuitry is further configured to determine, using the data mapping overlay node, the deleted third set of active nodes in the first node group. Additionally, the processing circuitry is configured to delete, using the data export overlay node, one or more database records of the first set of database records based on the determined third set of active nodes.

In some embodiments, the processing circuitry is further configured to create a delete overlay node that extends functionality of the data export overlay node. The deletion of the one or more database records of the first set of database records in the first schema is further based on the delete overlay node.

In some embodiments, the executable graph-based model is one of persistable or non-persistable. The executable graph-based model is stored in the storage element based on the executable graph-based model being persistable. The executable graph-based model ceases to exist from the storage element upon expiration of a threshold time-period based on the executable graph-based model being non-persistable.

In some embodiments, the executable graph-based model is a run-time model that includes (i) an executable graph-based model template that defines a graph structure and (ii) an executable graph-based model instance that is an implementation of the executable graph-based model template.

In certain additional embodiments, an overlay system is disclosed. The overlay system comprises a storage element and processing circuitry that is coupled to the storage element. The storage element is configured to store an executable graph-based model that includes a plurality of node groups, a datastore export overlay node that extends functionality of the executable graph-based model, and a datastore mapping overlay node that extends functionality of the datastore export overlay node. Each node group of the plurality of node groups comprises a plurality of active nodes. The processing circuitry is configured to receive a stimulus associated with the overlay system and create, based on the stimulus, using the datastore export overlay node and the datastore mapping overlay node, an external datastore that implements the executable graph-based model, in a server associated with the overlay system. The processing circuitry is further configured to create, in the external datastore, a plurality of schemas that implements the plurality of node groups, with a first schema created for a first node group. Additionally, the processing circuitry is configured to create, in the first schema, a first set of database objects with a first database object that implements a first set of active nodes of the first node group. Furthermore, the processing circuitry is configured to create, in the first schema, a first set of database records with a first database record that implements a second set of active nodes associated with the first set of active nodes.

In some embodiments, the executable graph-based model further includes a schema export overlay node that extends functionality of the first node group, and a schema mapping overlay node that extends functionality of the schema export overlay node. The processing circuitry is further configured to determine, using the schema mapping overlay node, the first node group in the executable graph-based model. The first schema, that implements the first node group, is created using the schema export overlay node.

In some embodiments, the executable graph-based model further includes a data export overlay node that extends functionality of the first node group, and a data mapping overlay node that extends functionality of the data export overlay node. The processing circuitry is further configured to determine, using the data mapping overlay node, the first set of active nodes of the plurality of active nodes of the first node group. The first database object, that implements the first set of active nodes, is created using the data export overlay node.

In some embodiments, the processing circuitry is further configured to determine, using the data mapping overlay node, the second set of active nodes associated with the first set of active nodes. The first database record, that implements the second set of active nodes is created using the data export overlay node.

In numerous embodiments, a method is disclosed. The method comprises receiving, by processing circuitry of an overlay system, a stimulus associated with the overlay system. The method further comprises creating, in a storage element of the overlay system, based on the stimulus, an executable graph-based model that implements an external datastore associated with the overlay system. The method further comprises creating, in the executable graph-based model, a plurality of node groups that implements a plurality of schemas associated with the external datastore, with a first node group created for a first schema. Additionally, the method comprises creating, in the first node group, a first set of active nodes that implements a first database object associated with the first schema. Further, the method comprises creating, in the first node group, a second set of active nodes that implements a first set of database records associated with the first database object. Furthermore, the method comprises executing one or more operations in the executable graph-based model.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

FIG. 10 illustrates a flowchart of a method for facilitation of an executable graph-based model using an external datastore, consistent with disclosed embodiments of the present disclosure; and FIG. 11 illustrates a flowchart of a method for facilitation of an external datastore using an executable graph-based model, consistent with disclosed embodiments of the present disclosure.

DETAILED DESCRIPTION

Figure 1:
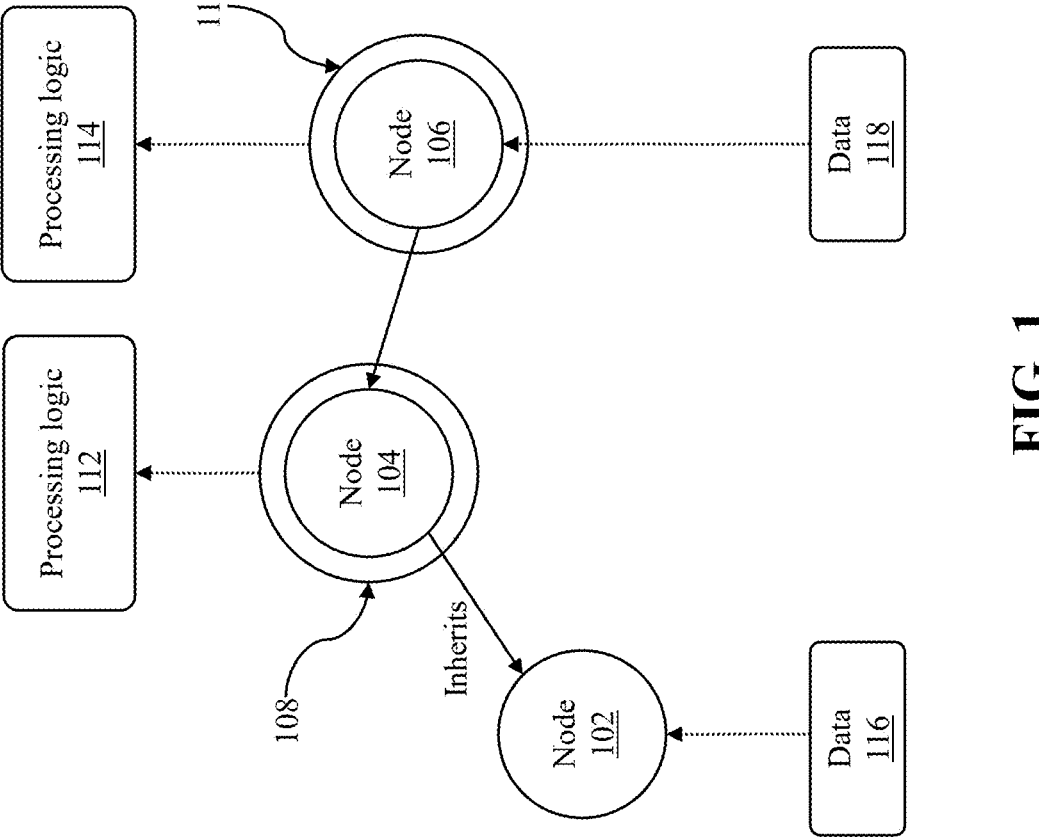
FIG. 1 is a graph that illustrates a composition of an executable graph-based model, consistent with disclosed embodiments of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview

Data is essential across various domains such as artificial intelligence (AI), machine learning (ML), healthcare, finance, and cybersecurity. In these domains, the data may be used for various tasks such as diagnostics in healthcare, fraud detection and risk assessment in finance, training, predictions, and classifications in AI and ML, or the like. In these domains, the data is loaded from external storage systems or remote databases into a processing environment for data processing. Further, the processed data is unloaded from the processing environment and stored in the external storage systems or remote databases. However, the loading and unloading of the data incur significant computational overheads. This may further lead to delayed execution of the operations that may prove to be fatal in critical tasks. If the process of loading and unloading data takes excessive time, it may introduce latency that may affect the overall performance of the system. Additionally, conventional processing environments may not have capability to perform complex operations on the loaded data efficiently. As a result, the latency associated with the overall performance of the system is further increased.

The data may be stored in various external datastores such as Relational Database Management Systems (RDBMS), Document Database (Document DB), Event DB, Binary Large Object (BLOB) DB, or the like. Further, the conventional processing environments may not be equipped to process the data stored in the various external datastores due to the formats in which the data is stored in such external datastores. As a result, there is a need to transform the data in the external datastores to a format that is suitable for efficient processing.

The present disclosure is directed to facilitation of executable graph-based models using external datastores in an overlay system. An external datastore may include schemas. A schema may refer to a structure or blueprint that defines how data is organized and how relationships among data are maintained in a datastore. The schema may outline data types, constraints, relationships, and other metadata for the data being stored in the datastore. Further, each schema may include database objects. A database object may refer to a logical structure that defines and organizes the data within a schema. A table may be an example for a database object. A database object may include data records. A data record may refer to one or more values associated with the database object.

In operation, processing circuitry of the overlay system may receive a stimulus and create an executable graph-based model in a storage element of the overlay system. The executable graph-based model implements the external datastore. The executable graph-based model is a customized hypergraph with hyper-edges that are realized by way of executable nodes. Each executable node is associated with a particular node-type. For example, an edge node corresponds to a base node with an edge node-type. Nodes (for example, base nodes and executable nodes) are connected with other nodes by way of roles included in an edge node therebetween. In some embodiments, roles are represented by way of nodes of role node-type. A role node between two nodes may be indicative of a context regarding an association therebetween. The executable graph-based model also includes a plurality of overlay nodes that incorporate in-situ features in the overlay system. Each overlay node is associated with one or more nodes (for example, a vertex node, an edge node, or the like) of the executable graph-based model and includes a corresponding processing logic that when executed implements a functionality thereof on the associated nodes. Hence, the processing logic is implemented within the executable graph-based model and is not required to be retrieved from any external system.

The processing circuitry may further create node groups in the executable graph-based model. The node groups implement the schemas in the executable graph-based model. The processing circuitry may further create active nodes in each node group that implement database objects of the corresponding schema. Additionally, the processing circuitry may create active nodes in each node group that implement data records associated with corresponding database objects. Thus, the external datastore is implemented in the overlay system. The processing circuitry may execute one or more operations in the executable graph-based model.

Conventionally, the data is loaded from external storage systems or remote databases into a processing environment for data processing. Further, the processed data is unloaded from the processing environment and stored in the external storage systems or remote databases. In contrast, the present invention discloses the creation of the executable graph-based model for the external datastore that may prevent the latency associated with the loading and unloading of the external datastore as the capabilities associated with the overlay system may be leveraged by way of the executable graph-based model. That is to say, the execution of one or more operations utilizing the external datastore may be more performant upon being implemented as the executable graph-based model due to the efficient computing and processing capabilities as well as the low-latency behavior of the overlay system.

It is appreciated that the human mind is not equipped to create the executable graph-based model that implements the external datastore in the storage element of the overlay system and executes one or more operations in the executable graph-based model. It is appreciated that the approaches discussed herein improve the technical field of computer performance by reducing time complexity.

Figure Description:

FIG. 1 is a graph that illustrates a composition of an executable graph-based model 100, consistent with disclosed embodiments of the present disclosure. Referring to FIG. 1, the executable graph-based model 100 is generally formed of a data structure (e.g., a graph-based model or a graphical model) comprising a plurality of nodes 102-106 which can be functionally extended with processing logic via the use of overlays. For example, as shown in FIG. 1, the nodes 104 and 106 are functionally extended with processing logic via the use of overlay nodes 108 and 110, respectively. Although not shown, the node 102 can be similarly extended with processing logic via the use of one or more overlays. Each overlay includes processing logic, such as processing logic 112 and 114 which are associated with the overlay nodes 108 and 110, respectively. At run-time, data, such as data 116 and 118, is associated with the nodes 102 and 106, respectively. Further, the overlay nodes 108 and 110 of the nodes 104 and 106, respectively, provide the functionality to respond to stimuli and interact with, manipulate, or otherwise process the data based on the stimuli. Further, the node 104 inherits the node 102, and hence, also inherits the data 116 which is associated with the node 102. In some embodiments, the node 102 may be extended to have one or more overlays. In such embodiments, the node 104 may further inherit the overlays of the node 102.

Each element within the executable graph-based model 100 (both the data and the processing functionality) is implemented by way of a node. A node forms the fundamental building block of all executable graph-based models. A node may be an executable node. A node that is extended by way of an overlay node forms an executable node. One or more nodes are extended to include overlays in order to form the executable graph-based model 100. As such, the executable graph-based model 100 includes one or more nodes that can be dynamically generated, extended, or processed by one or more other modules within an overlay system (shown in FIG. 2). Throughout the description, the terms "overlay node" and "overlay" are used interchangeably.

Notably, the structure and functionality of the data processing are separate from the data itself when offline (or at rest) and are combined dynamically at run-time. The executable graph-based model 100 thus maintains the separability of the data and the processing logic when offline. Moreover, by integrating the data and the processing logic within a single model, processing delays or latencies are reduced because the data and the processing logic exist within the same logical system. Therefore, the executable graph-based model 100 applies to a range of time-critical systems where efficient processing of the stimuli is required.

Figure 2:
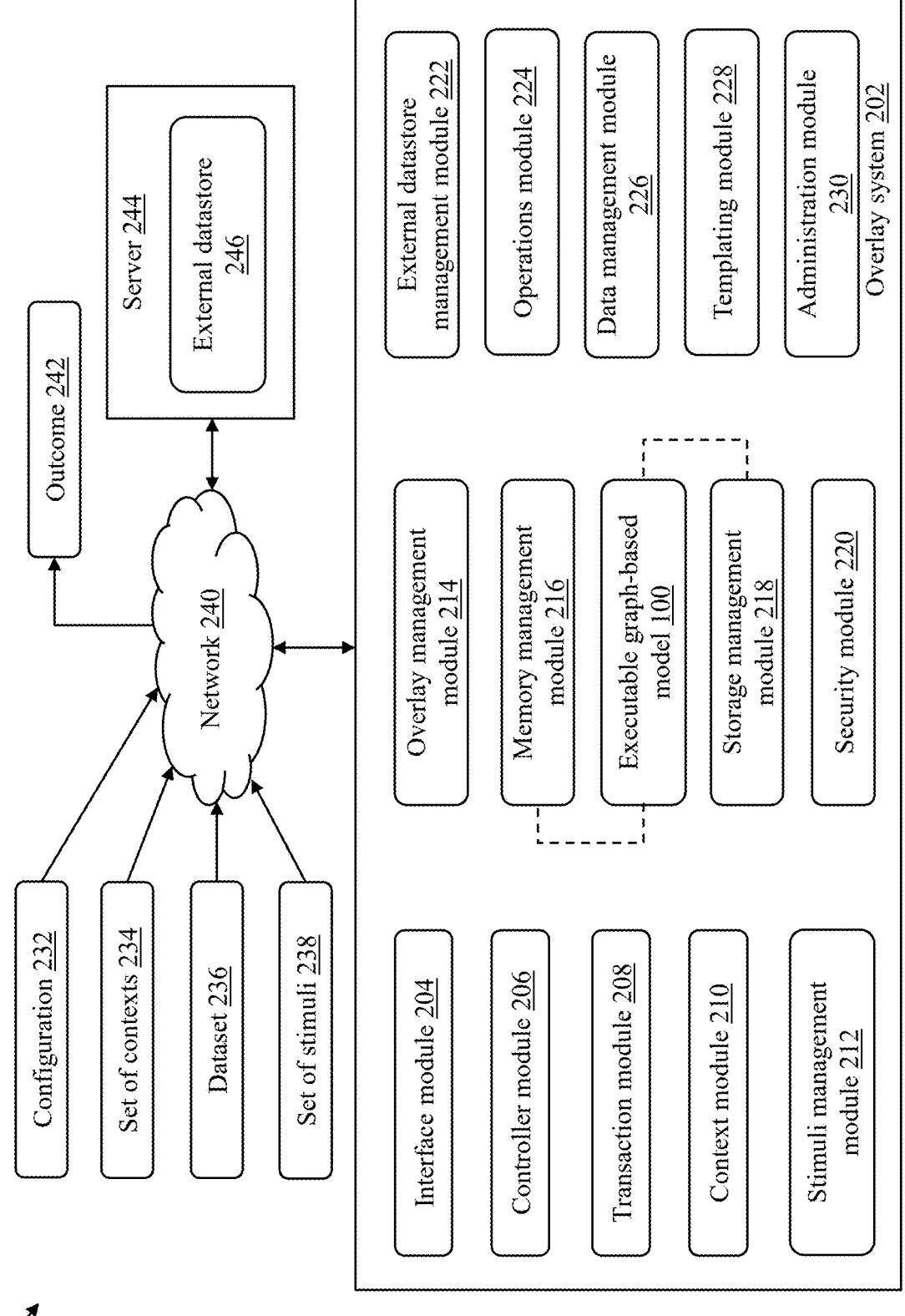
FIG. 2 is a block diagram that illustrates a system environment of an overlay system for execution, management, and configuration of the executable graph-based model, consistent with disclosed embodiments of the present disclosure.

FIG. 2 is a block diagram that illustrates a system environment 200 of an overlay system 202 for execution, management, and configuration of the executable graph-based model 100, consistent with disclosed embodiments of the present disclosure. Referring to FIG. 2, the overlay system 202 includes the executable graph-based model 100. The overlay system 202 further includes an interface module 204, a controller module 206, a transaction module 208, a context module 210, a stimuli management module 212, an overlay management module 214, a memory management module 216, a storage management module 218, a security module 220, an external datastore management module 222, an operations module 224, a data management module 226, a templating module 228, and an administration module 230. FIG. 2 further shows a configuration 232, a set of contexts 234, dataset 236, a set of stimuli 238, a network 240, and an outcome 242. Additionally, the system environment 200 is shown to include a server 244. The server 244 may host an external datastore 246. In some embodiments, all the modules of the overlay system 202 except for the executable graph-based model 100 may collectively form processing circuitry that facilitate operations in the system environment 200.

The overlay system 202 may include suitable logic, circuitry, interfaces, and/or code, executable by the circuitry, that may be configured to facilitate one or more operations associated with facilitation of the executable graph-based model 100 using the external datastore 246.

The interface module 204 may include suitable logic, circuitry, interfaces, and/or code, executable by the circuitry, configured to provide a common interface between internal modules of the overlay system 202 and/or external sources. The interface module 204 provides an application programmable interface (API), scripting interface, or any other suitable mechanism for interfacing externally or internally with any module of the overlay system 202. The configuration 232, the set of contexts 234, the dataset 236, and the set of stimuli 238 may be received by the interface module 204 via the network 240. Similarly, outputs (e.g., the outcome 242) produced by the overlay system 202 are passed by the interface module 204 to the network 240 for consumption or processing by external systems. In one embodiment, the interface module 204 supports one or more messaging patterns or protocols such as the simple object access protocol (SOAP), the representational state transfer (REST) protocol, or the like. The interface module 204 thus allows the overlay system 202 to be deployed in any number of application areas, operational environments, or architecture deployments. Although not illustrated in FIG. 2, the interface module 204 is communicatively coupled (e.g., connected either directly or indirectly) to one or more other modules or elements within the overlay system 202 (such as the controller module 206, the context module 210, the executable graph-based model 100, or the like). In one embodiment, the interface module 204 is communicatively coupled (e.g., connected either directly or indirectly) to one or more overlays within the executable graph-based model 100.

The controller module 206 may include suitable logic, circuitry, interfaces, and/or code, executable by the circuitry, configured to handle and process interactions and executions within the overlay system 202. As will be described in more detail below, stimuli (such as the set of stimuli 238) and their associated contexts (such as the set of contexts 234) provide the basis for all interactions within the executable graph-based model 100. Processing of such stimuli may lead to execution of processing logic associated with one or more overlays within the executable graph-based model 100. The processing of the stimuli within the overlay system 202 may be referred to as a system transaction. The processing and execution of stimuli (and associated overlay execution) within the overlay system 202 is handled by the controller module 206. The controller module 206 manages all received input stimuli (e.g., the set of stimuli 238) and processes them based on a corresponding context (e.g., one of the set of contexts 234). The context of the set of contexts 234 determines the priority that is to be assigned to the processing of the corresponding stimulus by the controller module 206 or the context module 210. This allows each stimulus to be configured with a level of importance and prioritization within the overlay system 202.

The controller module 206 may maintain the integrity of the modules within the overlay system 202 before, during, and after a system transaction. The transaction module 208, which is associated with the controller module 206, is responsible for maintaining the integrity of the overlay system 202 through the lifecycle of a transaction. Maintaining system integrity via the controller module 206 and the transaction module 208 allows a transaction to be rolled back in an event of an expected or unexpected software or hardware fault or failure. The controller module 206 is configured to handle the processing of the set of stimuli 238 and transactions through architectures such as parallel processing, grid computing, priority queue techniques, or the like. In one embodiment, the controller module 206 and the transaction module 208 are communicatively coupled (e.g., connected either directly or indirectly) to one or more overlays within the executable graph-based model 100.

As stated briefly above, the overlay system 202 utilizes a context-driven architecture, whereby the set of stimuli 238 within the overlay system 202 is associated with the set of contexts 234 which is used to adapt the handling or processing of the set of stimuli 238 by the overlay system 202. That is to say that the handling or processing of the set of stimuli 238 is done based on the set of contexts 234 associated therewith. Hence, each stimulus of the set of stimuli 238 is a contextualized stimulus. Further, each context of the set of contexts 234 may include details such as username, password, access token, device information, time stamp, one or more relevant identifiers (IDs), or the like, that are required for processing of the corresponding stimulus of the set of stimuli 238 within the executable graph-based model 100. Each context within the overlay system 202 may be extended to include additional information that is required for the processing of the stimulus (e.g., a query, a command, or an event).

The context module 210 may include suitable logic, circuitry, interfaces, and/or code, executable by the circuitry, configured to manage the handling of contexts within the overlay system 202. The context module 210 is responsible for processing any received contexts (e.g., the set of contexts 234) and translating the received context to an operation execution context. In some examples, the operation execution context is larger than the received context because the context module 210 supplements the received context with further information necessary for the processing of the received context. The context module 210 passes the operation execution context to one or more other modules within the overlay system 202 to drive communication of data associated with the operation execution context. Contexts within the overlay system 202 can be external or internal. While some contexts apply to all application areas and problem spaces, some applications may require specific contexts to be generated and used to process the received set of stimuli 238. As will be described in more detail below, the executable graph-based model 100 is configurable (e.g., via the configuration 232) so as only to execute within a given execution context for a given stimulus.

The stimuli management module 212 may include suitable logic, circuitry, interfaces, and/or code, executable by the circuitry, configured to process externally received stimuli (e.g., the set of stimuli 238) and any stimuli generated internally from any module within the overlay system 202. The stimuli management module 212 is communicatively coupled (e.g., connected either directly or indirectly) to one or more overlays within the executable graph-based model 100 to facilitate the processing of stimuli within the executable graph-based model 100. The overlay system 202 utilizes different types of stimuli such as a command (e.g., a transactional request), a query, or an event received from an external system such as an Internet-of-Things (IoT) device. As previously stated, a stimulus (such as a stimulus of the set of stimuli 238) can be either externally or internally generated. In an example, a stimulus of the set of stimuli 238 may be a message that is internally triggered (e.g., generated) from any of the modules within the overlay system 202. Such internal generation of the stimulus indicates that something has happened within the overlay system 202 and subsequent handling by one or more other modules within the overlay system 202 may be required. Internal stimulus can also be triggered (e.g., generated) from the execution of processing logic associated with overlays within the executable graph-based model 100. In another example, a stimulus of the set of stimuli 238 may be externally triggered and may be generated based on an input received via a user interface associated with the controller module 206. The externally triggered stimulus may be received in the form of a signal, a textual, audio, or visual input. The externally triggered stimulus may be associated with the intent of a user to execute an operation indicated by the stimulus. The operation is executed in accordance with information included in the context associated with the stimulus.

The stimuli management module 212 may receive the stimuli (such as the set of stimuli 238) in real-time or near-real-time and communicate the received stimuli to one or more other modules or nodes of the executable graph-based model 100. In some examples, the stimuli are scheduled in a batch process. The stimuli management module 212 utilizes any suitable synchronous or asynchronous communication architectures or approaches in communicating the stimuli (along with associated information). The stimuli within the overlay system 202 are received and processed (along with a corresponding context) by the stimuli management module 212, which then determines the processing steps to be performed for the communication of data associated with each stimulus. In one embodiment, the stimuli management module 212 processes the received stimuli in accordance with a predetermined configuration (e.g., the configuration 232) or dynamically determines what processing needs to be performed based on the contexts associated with the stimuli and/or based on a state of the executable graph-based model 100. The state of the executable graph-based model 100 refers to the current state of each node of the executable graph-based model 100 at a given point in time. The state of the executable graph-based model 100 is dynamic, and hence, may change based on processing of data by any of its nodes. In some examples, the processing of a stimulus (such as a stimulus of the set of stimuli 238) results in the generation, communication, or processing of data that further results in one or more outcomes (e.g., the outcome 242) being generated. Such outcomes are either handled internally by one or more modules in the overlay system 202 or communicated via the interface module 204 as an external outcome. In one embodiment, all stimuli and corresponding outcomes are recorded for auditing and post-processing purposes by, for example, the operations module 224 of the overlay system 202.

The overlay management module 214 may include suitable logic, circuitry, interfaces, and/or code, executable by the circuitry, configured to manage all overlays within the overlay system 202. Operations performed by the overlay management module 214 include overlay storage management, overlay structure modeling, overlay logic creation and execution, and overlay loading and unloading (within the executable graph-based model 100). The overlay management module 214 is communicatively coupled (e.g., connected either directly or indirectly) to one or more other modules within the overlay system 202 to complete some or all of these operations. For example, overlays can be persisted in some form of physical storage using the storage management module 218 (as described in more detail below). As a further example, overlays can be compiled and preloaded into memory via the memory management module 216 for faster run-time execution.

The memory management module 216 may include suitable logic, circuitry, interfaces, and/or code, executable by the circuitry, configured to manage and optimize the memory usage of the overlay system 202. The memory management module 216 thus helps to improve the responsiveness and efficiency of the processing performed by one or more of the modules within the overlay system 202 by optimizing the memory handling performed by these modules. The memory management module 216 uses direct memory or some form of distributed memory management architecture (e.g., a local or remote caching solution). Additionally, or alternatively, the memory management module 216 deploys multiple different types of memory management architectures and solutions (e.g., reactive caching approaches such as lazy loading or a proactive approach such as write-through cache may be employed). These architectures and solutions are deployed in the form of a flat (single-tiered) or multi-tiered caching architecture where each layer of the caching architecture can be implemented using a different caching technology or architecture solution approach. In such implementations, each cache or caching tier can be configured (e.g., by the configuration 232) independent of the requirements for one or more modules of the overlay system 202. For example, data priority and an eviction strategy, such as least-frequently-used (LFU) or least-recently-used (LRU), can be configured for all or parts of the executable graph-based model 100. In one embodiment, the memory management module 216 is communicatively coupled (e.g., connected either directly or indirectly) to one or more overlays within the executable graph-based model 100.

The storage management module 218 may include suitable logic, circuitry, interfaces, and/or code, executable by the circuitry, configured to manage the temporary or permanent storage of data associated with the overlay system 202. The storage management module 218 is any suitable low-level storage device solution (such as a file system) or any suitable high-level storage technology such as another database technology (e.g., relational database management system (RDBMS) or NoSQL database). The storage management module 218 is directly connected to the storage device upon which the relevant data is persistently stored. For example, the storage management module 218 can directly address the computer-readable medium (e.g., hard disk drive, external disk drive, or the like) upon which the data is being read or written. Alternatively, the storage management module 218 is connected to the storage device via a network such as the network 240. As will be described in more detail later in the present disclosure, the storage management module 218 uses manifests to manage the interactions between the storage device and the modules within the overlay system 202. In one embodiment, the storage management module 218 is communicatively coupled (e.g., connected either directly or indirectly) to one or more overlays within the executable graph-based model 100. Throughout the description, the term 'storage device' is used interchangeably with the term 'storage element'.

As described, storage, loading, and unloading of the executable graph-based model 100 or one or more components thereof is facilitated by the memory management module 216 and the storage management module 218. The memory management module 216 and the storage management module 218 may facilitate such operations by interacting with the storage device that stores the executable graph-based model 100. The overlay system 202 further includes a plurality of manifest storages. The manifest storages are used by the memory management module 216 and the storage management module 218 to facilitate storage manifest states (including manifest template states and manifest instance states) of nodes. The storage element may include a primary storage and a secondary storage. The primary storage may store the executable graph-based model 100 and may also store nodes that are loaded in the executable graph-based model 100. The secondary storage may store node states, manifests, and manifest states associated with nodes that are unloaded from the executable graph-based model 100. Storage and retrieval of nodes are described in detail in conjunction with FIG. 6.

The security module 220 may include suitable logic, circuitry, interfaces, and/or code, executable by the circuitry, configured to manage the security of the overlay system 202. This includes security at a system level and a module level. Security is hardware-related, network-related, or software-related, depending on the operational environment, the architecture of the deployment, or the data and information contained within the overlay system 202. For example, if the system is deployed with a web-accessible API (as described above in relation to the interface module 204), the security module 220 can enforce a hypertext transfer protocol secure (HTTPS) protocol with the necessary certification. As a further example, if the data or information associated with the data associated with the overlay system 202 contains Personally Identifiable Information (PII) or Protected Health Information (PHI), the security module 220 can implement one or more layers of data protection to ensure that the PII or PHI are correctly processed and stored. In an additional example, in implementations whereby the overlay system 202 operates on United States of America citizen medical data, the security module 220 may enforce additional protections or policies as defined by the United States Health Insurance Portability and Accountability Act (HIPAA).

Similarly, if the overlay system 202 is deployed in the European Union (EU), the security module 220 may enforce additional protections or policies to ensure that the data processed and maintained by the overlay system 202 complies with the General Data Protection Regulation (GDPR). In one embodiment, the security module 220 is communicatively coupled (e.g., connected either directly or indirectly) to one or more overlays within the executable graph-based model 100, thereby directly connecting security execution to the data/information in the executable graph-based model 100. The security module 220 thus acts as a centralized coordinator that works in conjunction with the overlay management module 214 for managing and executing security-based overlays.

The external datastore management module 222 may include suitable logic, circuitry, interfaces, and/or code, executable by the circuitry, configured to facilitate creation of the executable graph-based model 100 using the external datastore 246. The external datastore 246 may refer to storage of data in various formats, such as structured tables, binary objects, flexible documents, or event logs. The external datastore 246 may include a plurality of schemas. A schema may refer to a structure or blueprint that defines how data is organized and how relationships among data are maintained in a datastore. The schema may outline data types, constraints, relationships, and other metadata for the data being stored in the datastore. Further, each schema may include a plurality of database objects. A database object may refer to a logical structure that defines and organizes the data within a schema. A table may be an example of a database object. A database object may include a set of data records. A data record may refer to one or more values associated with the database object.

In some embodiments, the external datastore management module 222 may be configured to facilitate creation of the external datastore 246 using the executable graph-based model 100.

The operations module 224 may include suitable logic, circuitry, interfaces, and/or code, executable by the circuitry, configured to track operational metrics and the behavior of all modules of the overlay system 202. Operational metrics of a module are indicative of statistics associated with the performance of the module while performing an operation (for example, communication, data processing, stimulus processing, or the like).

The data management module 226 may include suitable logic, circuitry, interfaces, and/or code, executable by the circuitry, configured to manage all data or information within the overlay system 202 (e.g., the dataset 236) for a given application. Operations performed by the data management module 226 include data loading, data unloading, data modeling, and data processing. The data management module 226 is communicatively coupled (e.g., connected either directly or indirectly) to one or more other modules within the overlay system 202 to complete some or all of these operations. For example, data storage is handled by the data management module 226 in conjunction with the storage management module 218.

The templating module 228 may include suitable logic, circuitry, interfaces, and/or code, executable by the circuitry, configured to enable the overlay system 202 to implement a templated version of the executable graph-based model 100. The templating module 228 may be configured to create an executable graph-based model template that defines a graph structure and an executable graph-based model instance that is an implementation of the executable graph-based model template to implement the templated version of the executable graph-based model 100. Notably, the templating module 228 ensures ontology integrity by enforcing the structure and rules of a template when generating instances of the template at run-time. Ontology integrity refers to the consistency, accuracy, and correctness of an ontology. Thus, the templating module 228 ensures that the consistency, accuracy, and correctness of the ontology of the executable graph-based model 100 is maintained while generating the instances of the template at run-time. The templating module 228 may be communicatively coupled (i.e., connected either directly or indirectly) to one or more nodes and/or one or more overlays within the executable graph-based model 100.

The administration module 230 may include suitable logic, circuitry, interfaces, and/or code, executable by the circuitry, configured to facilitate management of configurable aspects of the overlay system 202. The administration module 230 may facilitate administration of the overlay system 202 by an administrator. In some embodiments, the administration module 230 may facilitate the administrator to initiate the creation of the executable graph-based model 100 using the external datastore 246. In some more embodiments, the administration module 230 may facilitate the administrator to initiate the creation of the external datastore 246 using the executable graph-based model 100. In one embodiment, the administration module 230 is communicatively coupled (e.g., connected either directly or indirectly) to one or more overlays within the executable graph-based model 100.

The server 244 may include suitable logic, circuitry, interfaces, and/or code, executable by the circuitry, configured to host or store the external datastore 246. The server 244 may be communicatively coupled to the overlay system 202 by way of the network 240. The server 244 may be realized through various web-based technologies, such as, but not limited to, a Java web-framework, a .NET framework, a Hypertext Preprocessor (PHP) framework, a python framework, or any other web-application framework. Examples of the server 244 include, but are not limited to, a personal computer, a laptop, or a network of computer systems. The external datastore 246 may correspond to one of a Relational Database Management System (RDBMS), a Document Database (Document DB), an Event DB, a Binary Large Object (BLOB) DB, or the like.

The functionality of two or more of the modules included in the overlay system 202 may be combined within a single module. Conversely, the functionality of a single module can be split into two or more further modules which can be executed on two or more devices. The modules described above in relation to the overlay system 202 can operate in a parallel, distributed, or networked fashion. The overlay system 202 may be implemented in software, hardware, or a combination of both software and hardware. Examples of suitable hardware modules include, but are not limited to, a general-purpose processor, a field programmable gate array (FPGA), and/or an application-specific integrated circuit (ASIC). Software modules can be expressed in a variety of software languages such as C, C++, Java, Ruby, Visual Basic, Python, and/or other object-oriented, procedural, or functional programming languages.

Although it is described that the overlay system 202 includes a single executable graph-based model (e.g., the executable graph-based model 100), the scope of the present disclosure is not limited to it. In other embodiments, the overlay system 202 may include more than one executable graph-based model, without deviating from the scope of the present disclosure. In such a scenario, each executable graph-based model is implemented and managed in a manner that is similar to the executable graph-based model 100.

Having described the overlay system 202 for executing and managing executable graph-based models, the description will now turn to the elements of an executable graph-based model; specifically, the concept of a node. Unlike conventional graph-based systems, all elements (e.g., data, overlays, etc.) within the executable graph-based model (e.g., the executable graph-based model 100) are implemented as nodes. As will become clear, this allows executable graph-based models to be flexible, extensible, and highly configurable.

Figure 3A:
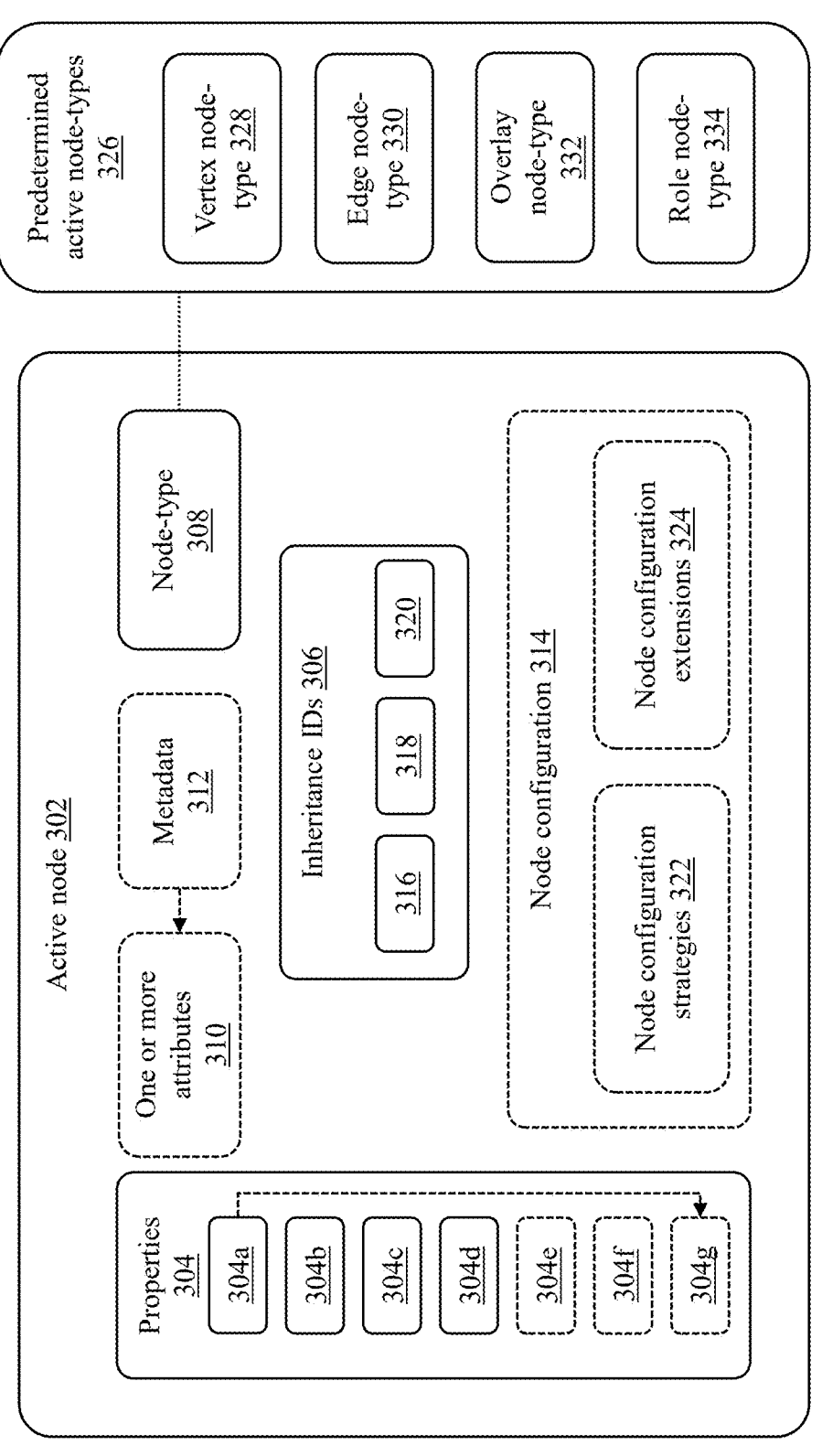
FIG. 3A is a block diagram that illustrates a generic structure of an active node within the executable graph-based model, consistent with disclosed embodiments of the present disclosure.

FIG. 3A is a block diagram 300A that illustrates a generic structure of an active node 302 within the executable graph-based model 100, consistent with disclosed embodiments of the present disclosure. Referring to FIG. 3A, the active node 302 corresponds to a node of the executable graph-based model 100.

The active node 302 further corresponds to the core structure of the executable graph-based model 100 and forms the foundational building block for all data and processing logic within the executable graph-based model 100. The active node 302 includes properties 304, inheritance IDs 306, and a node-type 308. The active node 302 optionally includes one or more attributes 310, metadata 312 associated with the one or more attributes 310, and a node configuration 314.

The properties 304 of the active node 302 include a unique ID 304a, a version ID 304b, a namespace 304c, and a name 304d. The properties 304 optionally include one or more icons 304e, one or more labels 304f, and one or more alternative IDs 304g. The inheritance IDs 306 of the active node 302 include an abstract flag 316, a leaf flag 318, and a root flag 320. The node configuration 314 optionally includes one or more node configuration strategies 322 and one or more node configuration extensions 324.

The unique ID 304a is unique for each node within the executable graph-based model 100. The unique ID 304a is used to register, manage, and reference the active node 302 within the system (e.g., the overlay system 202). In some embodiments, the one or more alternative IDs 304g are associated with the unique ID 304a to help manage communications and connections with external systems (e.g., during configuration, sending stimuli, or receiving outcomes). The version ID 304b of the active node 302 is incremented when the active node 302 undergoes transactional change. This allows the historical changes between versions of the active node 302 to be tracked by modules or overlays within the overlay system 202. The namespace 304c of the active node 302, along with the name 304d of the active node 302, is used to help organize nodes within the executable graph-based model 100. That is, the active node 302 is assigned a unique name 304d within the namespace 304c such that the name 304d of the active node 302 need not be unique within the entire executable graph-based model 100, only within the context of the namespace 304c to which the active node 302 is assigned. The active node 302 optionally includes the one or more icons 304e which are used to provide a visual representation of the active node 302 when visualized via a user interface. The one or more icons 304e can include icons at different resolutions and display contexts such that the visualization of the active node 302 is adapted to different display settings and contexts. The active node 302 also optionally includes one or more labels 304f which are used to override the name 304d when the active node 302 is rendered or visualized.

The active node 302 supports the concept of inheritance of data and processing logic associated with any other node of the executable graph-based model 100 that is inherited by the active node 302. This allows the behavior and functionality of the active node 302 to be extended or derived from the inherited node of the executable graph-based model 100. The inheritance IDs 306 of the active node 302 indicate the inheritance-based information, which may apply to the active node 302. The inheritance IDs 306 comprise a set of Boolean flags that identify the inheritance structure of the active node 302. The abstract flag 316 allows the active node 302 to support the construct of abstraction. When the abstract flag 316 takes a value 'true', the active node 302 is flagged as abstract that is to say that it cannot be instantiated or created within an executable graph-based model (e.g., the executable graph-based model 100). Thus, in an instance when the active node 302 has the abstract flag 316 set to 'true', the active node 302 may only form the foundation of other nodes that inherit therefrom. By default, the abstract flag 316 of the active node 302 is set to 'false'. The leaf flag 318 is used to indicate whether any other node may inherit from the active node 302. If the leaf flag 318 is set to 'true', then no other node may inherit from the active node 302 (but unlike an abstract node, a node with the leaf flag 318 set to 'true' may be instantiated and created within the executable graph-based model 100). The root flag 320 is used to indicate whether the active node 302 inherits from any other node. If the root flag 320 is set to 'true', the active node 302 does not inherit from any other node. The active node 302 is flagged as leaf (e.g., the leaf flag 318 is set to 'true') and/or root (e.g., the root flag 320 is set to 'true'), or neither (e.g., both the leaf flag 318 and the root flag 320 are set to 'false'). It will be apparent to a person skilled in the art that a node cannot be flagged as both abstract and leaf (e.g., the abstract flag 316 cannot be set to 'true' whilst the leaf flag 318 is set to 'true').

As stated above, all elements of the executable graph-based model 100 are defined as nodes. This functionality is in part realized due to the use of a node-type. The node-type 308 of the active node 302 is used to extend the functionality of the active node 302. All nodes within the executable graph-based model 100 comprise a node-type that defines additional data structures and implements additional executable functionality. A node-type thus includes data structures and functionality that are common across all nodes that share that node-type. Therefore, composition of a node with a node-type improves extensibility by allowing the generation of specialized node functionalities for specific application areas. Such extensibility is not present in prior art graph-based models. As illustrated in FIG. 3A, the active node 302 and the node-type 308 are one logical unit that is not separated in the context of an executing system at run-time (e.g., in the context of execution of an executable graph-based model).

FIG. 3A further shows the plurality of predetermined active node-types 326 which provides a non-exhaustive list of node-types for the node-type 308 associated with the active node 302. The plurality of predetermined active node-types 326 includes a vertex node-type 328 and an edge node-type 330. The vertex node-type 328 (also referred to as a data node-type or a value node-type) includes common data structures and functionality related to the 'things' modeled in the graph (e.g., the data). The edge node-type 330 includes common data structures and functionality related to coupling/linking/associating two or more nodes. A node having the edge node-type 330 may connect two or more nodes and thus the edge node-type 330 constructs associations and connections between nodes (for example, objects or 'things') within the executable graph-based model 100. The edge node-type 330 is not restricted to the number of nodes that can be associated or connected by a node having the edge node-type 330. The data structures and functionality of the edge node-type 330 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween.

The plurality of predetermined active node-types 326 further includes an overlay node-type 332 and a role node-type 334. As will be described in more detail below, a node with the overlay node-type 332 is used to extend the functionality of a node, such as the active node 302, to incorporate processing logic. Unlike non-overlay nodes, an overlay node (e.g., a node having the overlay node-type 332) includes processing logic which determines the functionality of the overlay node. The processing logic of an overlay node includes a block of executable code, or instructions, which carries out one or more operations associated with the communication of data within the executable graph-based model 100. The block of executable code is pre-compiled code, code that requires interpretation at run-time, or a combination of both. Different overlay nodes provide different processing logic to realize different functionality. For example, an encryption overlay node includes an encryption technique using which an associated node is to be protected/secured and processing logic for facilitating such security/protection of the associated node.

The role node-type 334 defines a connective relationship between two nodes, for example, an edge node and a first vertex node. A node with the role node-type 334 defines a relationship without expressly defining the first vertex node to which the edge node connects. A number of roles (and thus a number of connections) that an edge node-type can have is not limited.

The one or more attributes 310 correspond to the data associated with the active node 302 (e.g., the data represented by the active node 302 within the executable graph-based model 100 as handled by the data management module 226). Notably, a node in the executable graph-based model 100 that is not associated with data may not have any attributes. The one or more attributes 310 represent a complex data type. Each attribute of the one or more attributes 310 is composed of an attribute behavior. Attribute behavior may be one of a standard attribute behavior, a reference attribute behavior, a derived attribute behavior, or a complex attribute behavior. The attribute behavior of each attribute defines the behavior of the corresponding attribute. The attribute behavior of each attribute may be configured by associated attribute configurations. The attribute configurations are examples of attribute configuration extensions which are node configuration extensions (e.g., they are part of the one or more node configuration extensions 324 of the active node 302 shown in FIG. 3A). The standard attribute behavior may be configured by a standard attribute configuration, the reference attribute behavior may be configured by a reference attribute configuration, the derived attribute behavior is configured by a derived attribute configuration, and the complex attribute behavior is configured by a complex attribute configuration.

The attribute behavior defines the behavior of the corresponding attribute. The standard attribute behavior is a behavior that allows read-write access to the data of the corresponding attribute. The reference attribute behavior is a behavior that allows read-write access to the data of the corresponding attribute but restricts possible values of the data to values defined by a reference data set. The reference attribute configuration associated with the reference attribute behavior includes appropriate information to obtain a reference data set of possible values. The derived attribute behavior is a behavior that allows read-only access to data of the corresponding attribute. Also, data of the corresponding attribute is derived from other data or information, within the executable graph-based model 100 in which an executable node of the corresponding attribute is used. The data is derived from one or more other attributes associated with the node or is derived from more complex expressions depending on the application area. In one embodiment, the derived attribute configuration (which is used to configure the derived attribute behavior) includes mathematical and/or other forms of expressions (e.g., regular expressions, templates, or the like) that are used to derive the data (value) of the corresponding attribute. The complex attribute behavior is a behavior that allows the corresponding attribute to act as either a standard attribute behavior if the data of the corresponding attribute is directly set, or a derived attribute behavior if the data of the corresponding attribute is not directly set.

As shown, the active node 302 further includes the metadata 312 (e.g., data stored as a name, a confidentiality indicator for indicating data as sensitive and/or confidential, an average processing time required for processing data, or the like) which is associated with either the active node 302 or an attribute (for example, the one or more attributes 310) of the active node 302. An attribute within the one or more attributes 310 may either have an independent state or a shared state. That is to say, an attribute may be a value-shared attribute or a non-value-shared attribute. An independent attribute has data that is not shared with any other active node within the executable graph-based model 100. Conversely, a shared attribute has data that is shared with one or more other active nodes within the executable graph-based model 100. For example, if two nodes within the executable graph-based model 100 comprise a shared-data attribute with a value state shared by both nodes, then updating the data (e.g., the value) of this shared attribute will be reflected across both nodes.

The node configuration 314 provides a high degree of configurations for the different elements of the active node 302. The node configuration 314 optionally includes the one or more node configuration strategies 322 and/or the one or more node configuration extensions 324 which are complex data types. An example of a concrete node configuration strategy is an ID strategy, associated with the configuration of the unique ID 304a of the active node 302, which creates message source IDs. A further example of a concrete node configuration strategy is a versioning strategy, associated with the configuration of the version ID 304b of the active node 302, which supports major and minor versioning (depending on the type of transactional change incurred by the active node 302). The versioning strategy may be adapted to a native filing system of a user device hosting the overlay system 202 or a third-party data storage (for example, Snowflake®, or the like) associated with the overlay system 202. All attribute configurations examples of node configuration extensions 324.

Figure 3B:
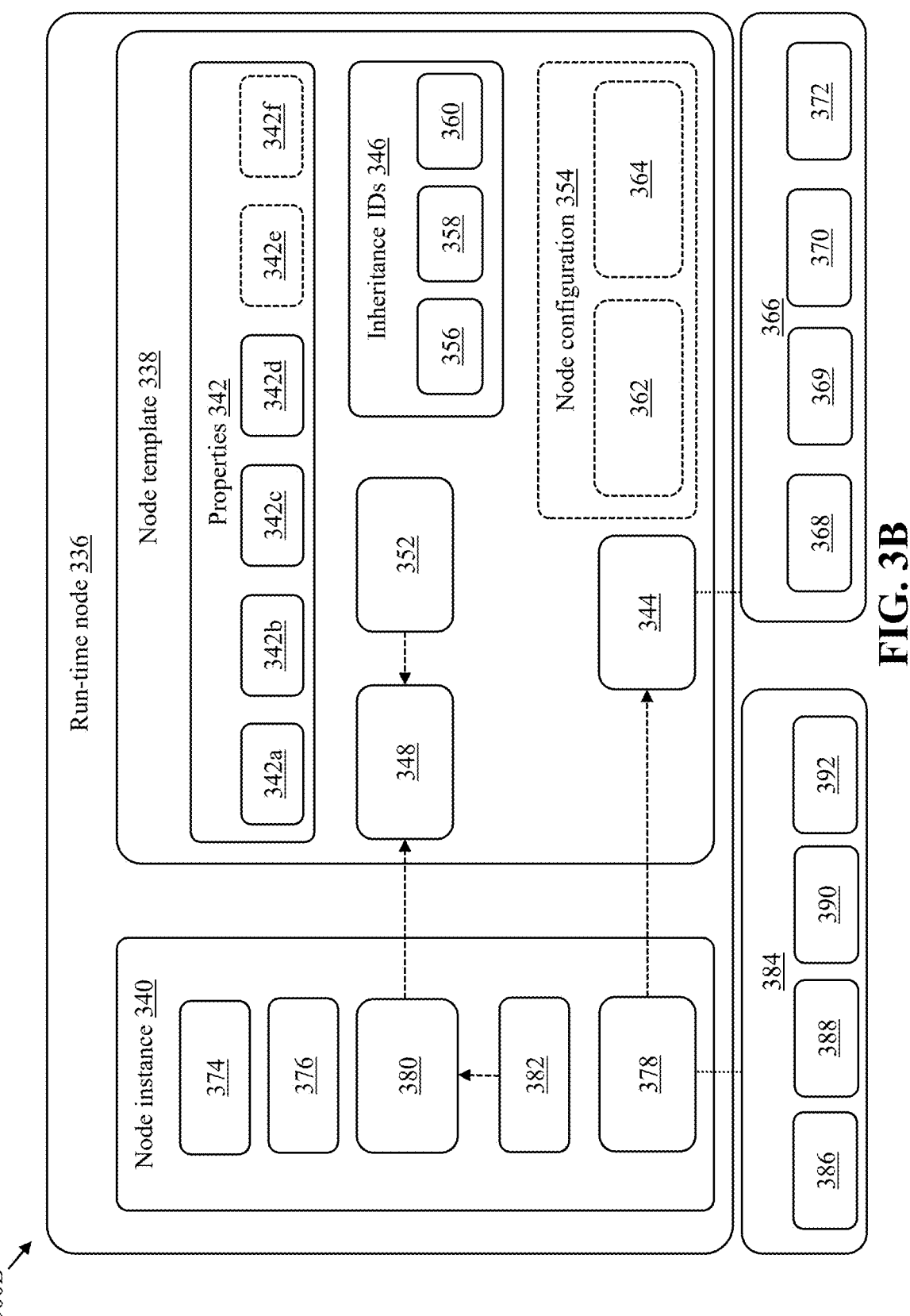
FIG. 3B is a block diagram that illustrates a generic structure of a run-time node within the executable graph-based model, consistent with disclosed embodiments of the present disclosure.

FIG. 3B is a block diagram 300B that illustrates a generic structure of a run-time node 336 within the executable graph-based model 100, consistent with disclosed embodiments of the present disclosure. Referring to FIG. 3B, the run-time node 336 corresponds to the core structure of the executable graph-based model 100 and forms the foundational building block for all data and processing logic within the executable graph-based model 100. The run-time node 336 is shown to include a node template 338 and a node instance 340. The node instance 340 is generated according to the node template 338. The node template 338 forms a data structure for the node instance 340. The run-time node 336 shown in FIG. 3B is a compositional structure that is generated and executed, at run-time as part of the executable graph-based model 100. In other words, the node template 338 is defined 'offline' and the node instance 340 and the run-time node 336 are run-time structures that are dynamically generated during execution of the executable graph-based model 100.

The node template 338 comprises a predetermined node structure. Further, the node template 338 defines one or more rules that govern the generation of the node instance 340. The node instance 340 is an implementation of the node template 338. In other words, the node instance 340 is generated based on the predetermined node structure and the one or more rules of the node template 338. The node template 338 cannot be modified during the execution but may be modified during offline mode or at rest. During execution, only the node instance 340 of the run-time node 336 may be modified.

The node template 338 includes properties 342, a node-type template 344, inheritance IDs 346, and a set of attribute templates 348. The node template 338 may optionally include metadata 352 and node configuration 354. The properties 342 of the node template 338 include a unique ID 342a, a version ID 342b, a namespace 342c, a name 342d, and optionally include one or more icons 342e and a set of labels 342f. The inheritance IDs 346 comprise an abstract flag 356, a leaf flag 358, and a root flag 360. The node configuration 354 optionally comprises one or more node configuration strategies 362 and/or one or more node configuration extensions 364. FIG. 3B further shows a plurality of predetermined node-type templates 366. The plurality of predetermined node-type templates 366 includes a vertex node-type template 368, an edge node-type template 369, a role node-type template 370, and an overlay node-type template 372. Further, the node instance 340 includes a unique ID 374, a version ID 376, a node-type instance 378, and a set of attribute instances 380. The node instance 340 may optionally include metadata 382. FIG. 3B further shows a plurality of predetermined node-type instances 384. The plurality of predetermined node-type instances 384 includes a vertex node-type instance 386, an edge node-type instance 388, a role node-type instance 390, and an overlay node-type instance 392.

Each of the unique ID 342a, the version ID 342b, the namespace 342c, the name 342d, the one or more icons 342e, the set of labels 342f, the set of attribute templates 348, the metadata 352, the node configuration 354, the one or more node configuration strategies 362, the one or more node configuration extensions 364, the unique ID 374, the version ID 376, the set of attribute instances 380, and the metadata 382 corresponds to a node element. That is to say, the run-time node 336 includes the plurality of node elements, where the plurality of node elements includes the unique ID 342a, the version ID 342b, the namespace 342c, the name 342d, the one or more icons 342e, the set of labels 342f, the set of attribute templates 348, the metadata 352, the node configuration 354, the one or more node configuration strategies 362, the one or more node configuration extensions 364, the unique ID 374, the version ID 376, the set of attribute instances 380, and the metadata 382.

The unique ID 342a is unique for each node template within the executable graph-based model 100. Similarly, the unique ID 374 is unique for each node instance within the executable graph-based model 100. The unique ID 342a and the unique ID 374 are used to register, manage, and reference the node template 338 and the node instance 340, respectively, within the overlay system 202. The version ID 342b of the node template 338 is incremented when the node template 338 undergoes transactional change. Similarly, the version ID 376 of the node instance 340 is incremented when the node instance 340 undergoes transactional change. The namespace 342c of the node template 338, along with the name 342d of the node template 338, is used to help organize node templates within the executable graph-based model 100. That is, the node template 338 is assigned a unique name 342d within the namespace 342c such that the name 342d of the node template 338 need not be unique within the entire executable graph-based model 100, only within the context of the namespace 342c to which the node template 338 is assigned. The node template 338 optionally comprises one or more icons 342e which are used to provide a visual representation of the node template 338. The one or more icons 342e can include icons at different resolutions and display contexts such that the visualization of the node is adapted to different display settings and contexts. The node template 338 also optionally comprises the set of labels 342f which are used to override the name 342d when the node template 338 is rendered or visualized.

The node template 338 supports the software development feature of multiple inheritance by maintaining references (not shown) to zero or more other node templates, which then act as the base of the node template 338. This allows the behavior and functionality of a node template to be extended or derived from one or more other node templates within an executable graph-based model (such as the executable graph-based model 100). The node instance 340 likewise supports multiple inheritance because it is an instance representation of the node template 338. The multiple inheritance structure of the node instance 340 is, however, limited to the corresponding instance realization of the multiple inheritance structure defined by the node template 338, i.e., one node instance 340 is created and managed for each node template 338 defined in the inheritance hierarchy for a node instance of a node template.

The inheritance IDs 346 of the node template 338 provide an indication of the inheritance-based information, which is applicable, or can be applicable, to the node template 338. The inheritance IDs 346 has a description that is similar to the inheritance IDs 306. The abstract flag 356 has a description that is similar to the abstract flag 316, the leaf flag 358 has a description that is similar to the leaf flag 318, and the root flag 360 has a description that is similar to the root flag 320.

All elements within the executable graph-based model 100 are defined as node templates or node instances. The functionality of the node template 338 and the node instance 340 are realized due to the use of the node-type template 344 and the node-type instance 378. The node-type template 344 of the node template 338 is used to extend the functionality of the node template 338 by defining the standard set of capabilities, including data and associated behavior. The vertex node-type template 368 (also referred to as a data node-type) includes a template of common data structures and functionality related to the 'things' modeled in the graph (e.g., the data). The vertex node-type instance 386 includes the common data structures and functionality related to the 'things' modeled in the graph based on the vertex node-type template 368. The edge node-type template 369 includes a template of common data structures and functionality related to joining two or more nodes. A node instance having the edge node-type instance 388 may connect two or more nodes and thus the edge node-type instance 388 constructs associations and connections between nodes (for example objects or 'things') within the executable graph-based model 100. The edge node-type instance 388 is not restricted to the number of nodes that can be associated or connected by a node having the edge node-type instance 388. The data structures and functionality of the edge node-type instance 388 thus define a hyper-edge which allows two or more nodes to be connected through a defined set of roles. The role node-type template 370 includes a template of common data structures and functionality related to defining a connective relationship between the two or more nodes, and hence, allows an edge node to connect two or more nodes such that the two or more nodes may have more than one relationship therebetween. A node instance having the role node-type instance 390 defines the connective relationship between two or more nodes.

The overlay node-type template 372 is used to extend the functionality of a node template (e.g., the node template 338) to incorporate processing logic. Similarly, the overlay node-type instance 392 is used to extend the functionality of a node instance (e.g., the node instance 340) to incorporate processing logic.

The set of attribute templates 348 corresponds to the data defined by the node template 338. For example, the set of attribute templates 348 may define the names and value types (e.g., integer, string, float, etc.) of one or more attributes but not the values of these attributes. The values of the set of attribute templates 348 may be defined by the set of attribute instances 380 of the node instance 340 through one or more values or instance values. For example, the node template 338 may define a string attribute 'surname' and the corresponding node instance 340 may assign the instance value 'Bell-Richards' to this string attribute. Each attribute instance of the set of attribute instances 380 is associated with an attribute template of the set of attribute templates 348. The node template 338 may define one or more default values for the set of attribute templates 348. The default values correspond to the values that the attributes take if no value is assigned. The metadata 352 (e.g., data stored as a name, value type, and value triplet) is associated with either the node template 338 or one or more of the set of attribute templates 348 of the node template 338. Similarly, the node instance 340 also optionally comprises the metadata 352 (e.g., data stored as a name, value type, and value triplet) which is associated with either the node instance 340 or one or more of the set of attribute instances 380.

The node configuration 354 provides a high degree of configurability for the different elements of a node template and/or node instance. An example of a concrete node configuration strategy is an ID strategy, associated with the configuration of the unique ID 342a of the node template 338. A further example of a concrete node configuration strategy is a versioning strategy, associated with the configuration of the version ID 342b of the node template 338 which supports major and minor versioning (depending on the type of transactional change incurred). The versioning strategy may be adapted to a native filing system of a user device hosting the overlay system 202 or a third-party data storage (for example, Snowflake®, or the like) associated with the overlay system 202.

Although it is provided that the node template 338 is associated with one node instance (e.g., the node instance 340), the scope of the present disclosure is not limited to it. In other embodiments, the node template 338 may be further associated with two or more node instances where the two or more node instances correspond to two or more implementations of the node template 338, respectively.

Figure 4:
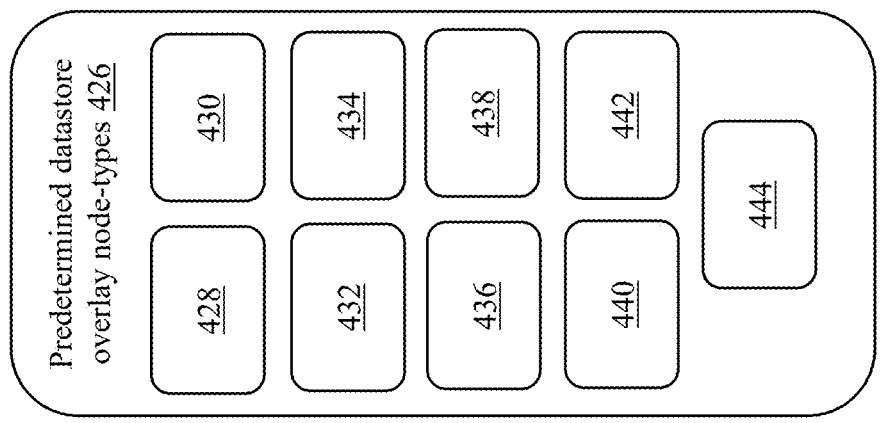
FIG. 4 is a block diagram that illustrates a generic structure of a datastore overlay node associated with the executable graph-based model, consistent with disclosed embodiments of the present disclosure.
Figure 4:
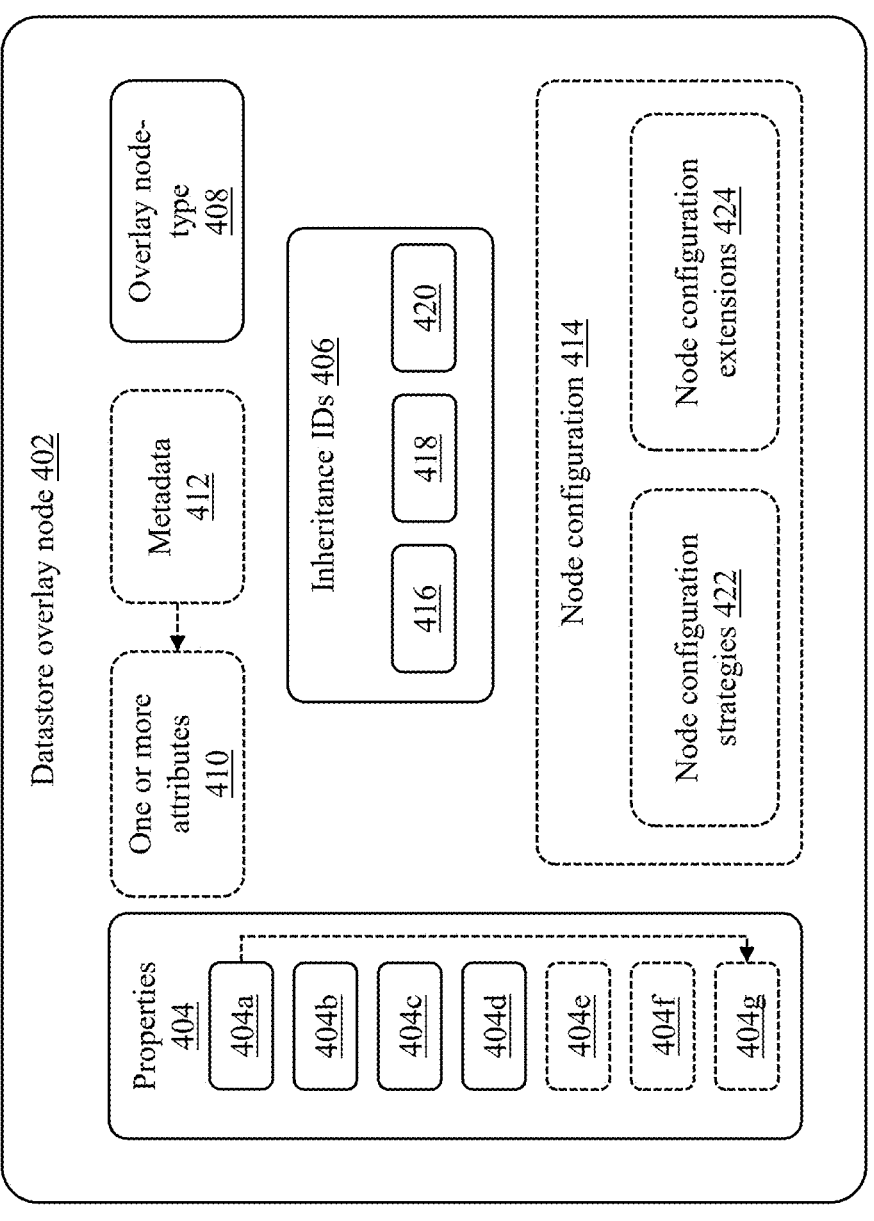

FIG. 4 is a block diagram 400 that illustrates a generic structure of a datastore overlay node 402 associated with the executable graph-based model 100, consistent with disclosed embodiments of the present disclosure. Referring to FIG. 4, the datastore overlay node 402 corresponds to the core structure of the executable graph-based model 100 and forms the foundational building block for various data and processing logics within the executable graph-based model 100. The datastore overlay node 402 includes properties 404, inheritance IDs 406, and an overlay node-type 408. The datastore overlay node 402 optionally includes one or more attributes 410, metadata 412 associated with the one or more attributes 410, and a node configuration 414.

The properties 404 of the datastore overlay node 402 include a unique ID 404*a*, a version ID 404*b*, a namespace 404*c*, and a name 404*d*. The properties 404 optionally include one or more icons 404*e*, one or more labels 404*f*, and one or more alternative IDs 404*g*.

The properties 404 of the datastore overlay node 402 is same as the properties 304 of the active node 302. In other words, the unique ID 404*a*, the version ID 404*b*, the namespace 404*c*, the name 404*d*, the one or more icons 404*e*, the one or more labels 404*f*, and the one or more alternative IDs 404*g* are same as the unique ID 304*a*, the version ID 304*b*, the namespace 304*c*, the name 304*d*, the one or more icons 304*e*, the one or more labels 304*f*, and the one or more alternative IDs 304*g*, respectively, of the active node 302.

The inheritance IDs 406 of the datastore overlay node 402 include an abstract flag 416, a leaf flag 418, and a root flag 420. The inheritance IDs 406 of the datastore overlay node 402 402 is same as the inheritance IDs 306 of the active node 302. In other words, the abstract flag 416, the leaf flag 418, and the root flag 420 are same as the abstract flag 316, the leaf flag 318, and the root flag 320 of the active node 302.

The node configuration 414 optionally includes one or more node configuration strategies 422 and one or more node configuration extensions 424. The node configuration 414 is same as the node configuration 314 of the active node 302. In other words, the one or more node configuration strategies 422 and one or more node configuration extensions 424 of the datastore overlay node 402 are same as the node configuration strategies 322 and one or more node configuration extensions 324 of the active node 302.

FIG. 4 further shows a plurality of predetermined datastore overlay node-types 426 which provides a non-exhaustive list of overlay node-types for the overlay node-type 408 associated with the datastore overlay node 402. The plurality of predetermined datastore overlay node-types 426 includes a datastore import overlay node-type 428, a datastore mapping overlay node-type 430, a schema import overlay node-type 432, a schema mapping overlay node-type 434, a data import overlay node-type 436, and a data mapping overlay node-type 438.

The datastore overlay node 402 with the datastore import overlay node-type 428 may be referred to as the datastore import overlay node. Further, the datastore overlay node 402 with the datastore mapping overlay node-type 430 may be referred to as the datastore mapping overlay node. The datastore import overlay node may be configured to facilitate determination of one or more schemas of the plurality of schemas in the external datastore 246. Further, the datastore mapping overlay node may facilitate creation of one or more node groups that implement the determined one or more schemas in the executable graph-based model 100.

In some embodiments, the datastore overlay node 402 with the schema import overlay node-type 432 may be referred to as the schema import overlay node. Further, the datastore overlay node 402 with the schema mapping overlay node-type 434 may be referred to as the schema mapping overlay node. The schema import overlay node may be configured to facilitate determination of one or more database objects of a schema in the external datastore 246. Further, the schema mapping overlay node may facilitate creation of one or more first active nodes that implement the determined one or more database objects in the executable graph-based model 100.

The datastore overlay node 402 with the data import overlay node-type 436 may be referred to as the data import overlay node. Further, the datastore overlay node 402 with the data mapping overlay node-type 438 may be referred to as the data mapping overlay node. The data import overlay node may be configured to facilitate determination of one or more data records of a database object in the external datastore 246. Further, the data mapping overlay node may facilitate creation of one or more second active nodes that implement the determined one or more data records in the executable graph-based model 100.

In some embodiments, the plurality of predetermined datastore overlay node-types 426 may further include a datastore export overlay node-type 440, a schema export overlay node-type 442, and a data export overlay node-type 444.

The datastore overlay node 402 with the datastore export overlay node-type 440 may be referred to as the datastore export overlay node. The datastore export overlay node and the datastore mapping overlay node may be configured to facilitate creation of the external datastore 246 using the executable graph-based model 100.

The datastore overlay node 402 with the schema export overlay node-type 442 may be referred to as the schema export overlay node. The schema export overlay node and the schema mapping overlay node may be configured to facilitate creation of one or more schemas in the external datastore 246 based on the executable graph-based model 100.

The datastore overlay node 402 with the data export overlay node-type 444 may be referred to as the data export overlay node. The data export overlay node and the data mapping overlay node may be configured to facilitate creation of one or more database objects in the external datastore 246 based on the executable graph-based model 100. The data export overlay node and the data mapping overlay node may be further configured to facilitate creation of one or more data records in the external datastore 246 based on the executable graph-based model 100.

Figure 5:
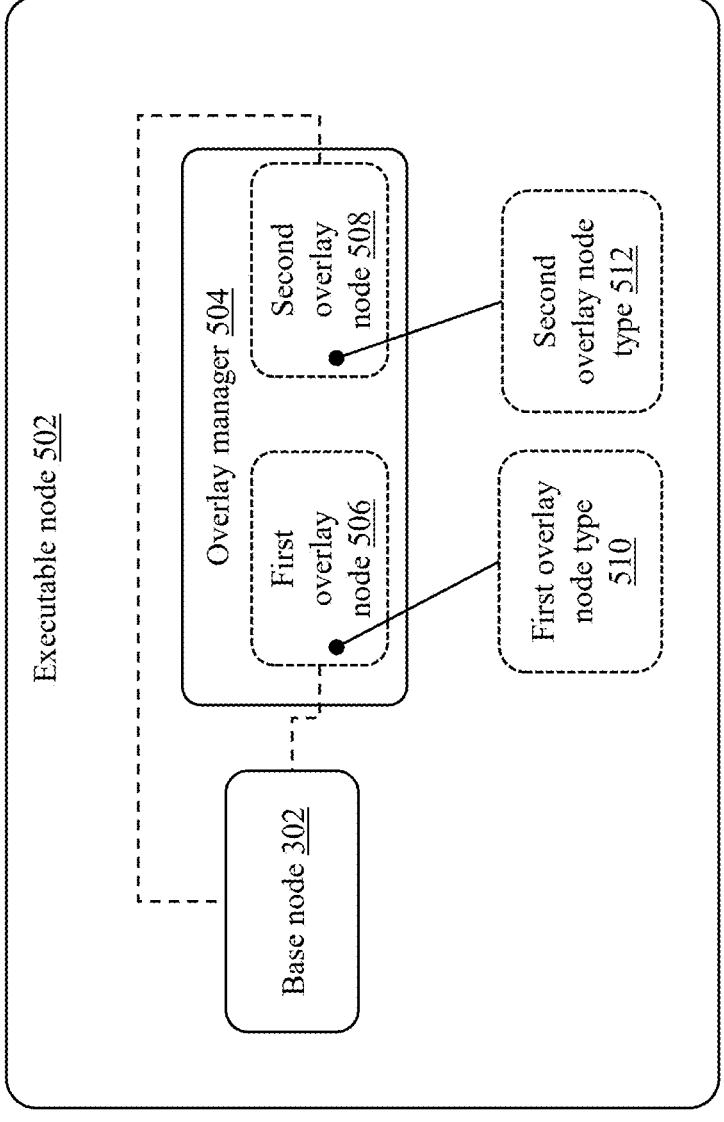
FIG. 5 is a block diagram that illustrates an executable node within the executable graph-based model, consistent with disclosed embodiments of the present disclosure.

FIG. 5 is a block diagram 500 that illustrates an executable node 502 within the executable graph-based model 100, consistent with disclosed embodiments of the present disclosure. Referring to FIG. 5, the executable node 502 is shown to include a base node (e.g., the active node 302) and an overlay manager 504. For the sake of ongoing discussion, the base node corresponds to the active node 302, and is hereinafter referred to as the "base node 302". The base node 302 when extended by way of one or more overlay nodes becomes the executable node 502.

The overlay manager 504 includes a first overlay node 506 and a second overlay node 508. The executable node 502 provides processing functionality (e.g., processing logic) to the base node 302 via one or more associated overlay nodes (for example, the first and second overlay nodes 506 and 508). Beneficially, the data and processing capability of the base node 302 may be dynamically and significantly extended using the concept of an executable node (for example, the executable node 502). As shown, the first overlay node 506 has a first overlay node-type 510, and the second overlay node 508 has a second overlay node-type 512. Examples of overlay node-type include, but are not limited to, an encryption overlay node-type, a publisher overlay node-type, a handler overlay node-type, an obfuscation overlay node-type, or the like.

A node with the encryption overlay node-type is an encryption overlay node that is indicative of an encryption technique using which an associated node is to be secured. The encryption overlay node also includes processing logic to secure a corresponding node. Examples of the encryption technique include a symmetric encryption algorithm, an asymmetric encryption algorithm, a combination of these, or any other encryption technique. A node with the publisher overlay node-type is a publisher overlay node that is indicative of an operation of publishing an output of an associated node. The publisher overlay node also includes processing logic to publish the output.

Although, the executable node 502 is shown to include the first and second overlay nodes 506 and 508, in other embodiments, the executable node 502 may include any number of overlay nodes, without deviating from the scope of the present disclosure.

The executable node 502 extends the base node 302 (or is a subtype of the base node 302) such that all the functionality and properties of the base node 302 are accessible to the executable node 502. The executable node 502 also dynamically extends the functionality of the base node 302 by associating the overlay nodes maintained by the overlay manager 504 with the base node 302. The executable node 502 may thus be considered a combination of the base node 302 and the first and second overlay nodes 506 and 508. The executable node 502 may be alternatively referred to as a node with overlay(s). Therefore, the executable node 502 acts as a decorator of the base node 302 adding the functionality of the overlay manager 504 to the base node 302.

It will be apparent to a person skilled in the art that the base node 302 refers to any suitable node within the executable graph-based model 100. As such, the base node 302 may be a node having a node-type such as a vertex node-type, an edge node-type, an overlay node-type, or the like. Alternatively, the base node 302 may be an executable node such that the functionality of the (executable) base node 302 is dynamically extended. In this way, complex and powerful processing functionality can be dynamically generated by associating and extending overlay nodes.

The overlay manager 504 registers and maintains one or more overlay nodes (such as the first overlay node 506 and the second overlay node 508) associated with the base node 302. The assignment of the first and second overlay nodes 506 and 508 to the base node 302 (via the overlay manager 504) endows the base node 302 with processing logic and executable functionality defined within the first and second overlay nodes 506 and 508.

Extending the functionality of a base node through one or more overlay nodes is at the heart of the overlay system 202. As illustrated in FIG. 2, the data (e.g., a vertex node as represented by the base node 302 in FIG. 5) and the functionality that acts upon that data (e.g., an overlay node) can be separated and independently maintained offline, but at run-time, an association between the data node and the overlay node is determined and an executable node is generated (e.g., the executable node 502 shown in FIG. 5).

It will be apparent to a person skilled in the art that functionalities of the first and second overlay nodes 506 and 508 may be performed by a single overlay node that includes processing logic associated with both the first and second overlay nodes 506 and 508.

It will be apparent to a person skilled in the art that the list of overlay types is not exhaustive and the number of different overlay types that can be realized is not limited. Because an overlay node is itself a node, all functionality of a node described in relation to the base node 302 is thus applicable to an overlay node. For example, an overlay node includes a unique ID, a name, etc., can have attributes (e.g., an overlay node can have its data defined), supports multiple inheritance, and can be configured via node configurations. Furthermore, because an overlay node is a node, the overlay node can have one or more overlay nodes associated therewith (e.g., the overlay node may be an overlay node with an overlay). Moreover, the processing functionality of an overlay node extends to the node-type of the node to which the overlay node is applied.

An overlay node, such as the first overlay node 506 or the second overlay node 508, is not bound to a single executable node or a single executable graph-based model (unlike nodes that have non-overlay node-types). This allows overlay nodes to be centrally managed and reused across multiple instances of executable graph-based models. Notably, a node (for example, a base node, an executable node, and an overlay node) may be extended by way of overlays. Further, each overlay node may be extended to have one or more overlays. Such overlays may be termed chaining overlays. Also, a single overlay node may be associated with multiple executable nodes. Thus, the overlay node and functionality thereof may be shared among the multiple executable nodes.

The overlay manager 504 of the executable node 502 is responsible for executing all overlays registered therewith. The overlay manager 504 also coordinates the execution of all associated overlay nodes. As shown in FIG. 5, the executable node 502 associates the base node 302 with two overlay nodes that is the first overlay node 506 and the second overlay node 508. Thus, the overlay manager 504 employs a strategy to manage the potentially cascading execution flow. Example strategies to manage the cascading execution of overlays include the visitor pattern and the pipe and filter pattern. Further examples include strategies that apply either breadth-first or depth-first processing patterns, a prioritization strategy, or a combination thereof. All execution strategies are defined and registered with the overlay manager 504 and are associated with an overlay via a node configuration extension for the overlay.

Figure 6:
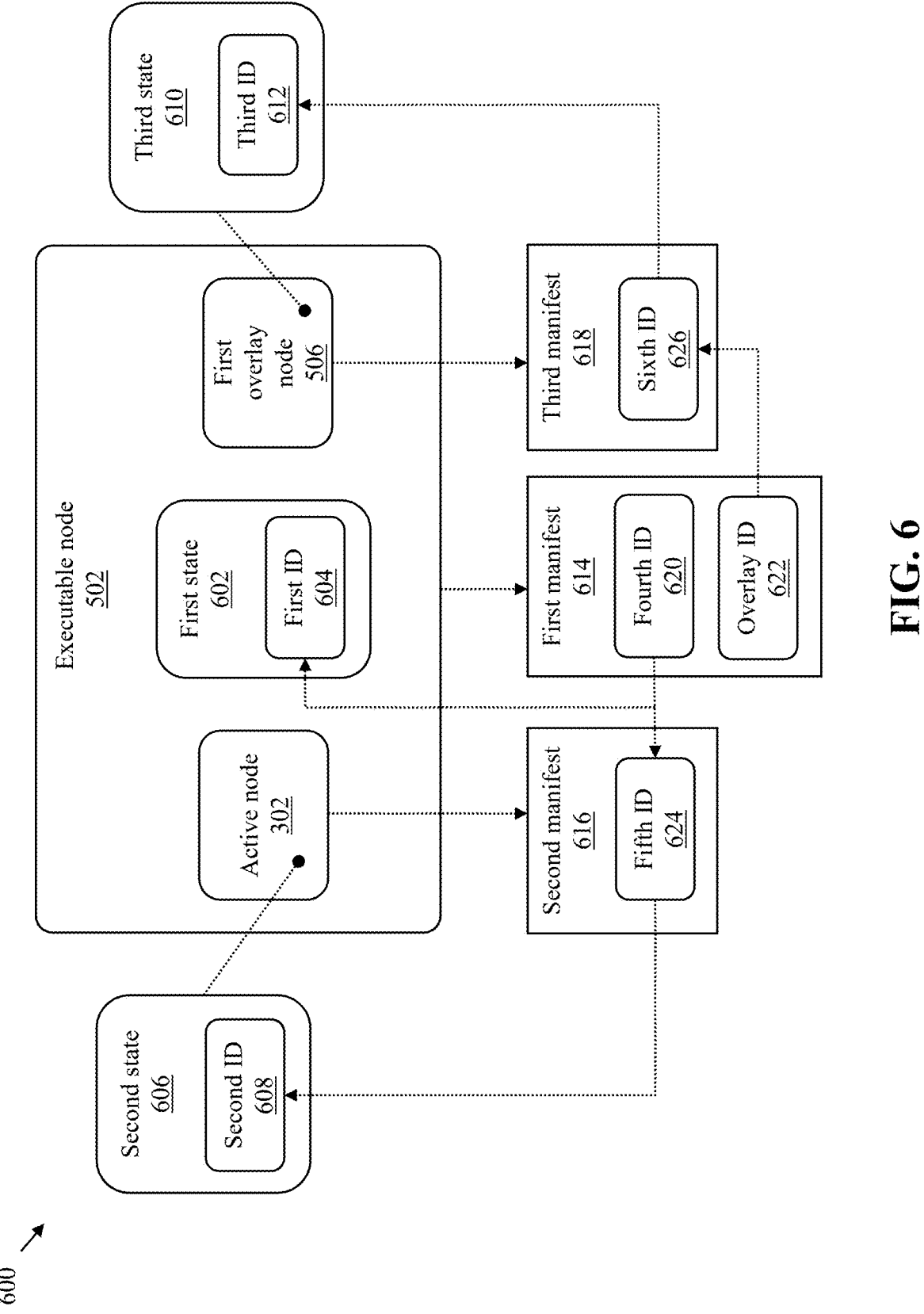
FIG. 6 is a block diagram that illustrates a composition of the executable node that enables persistent storage of data and processing logic associated therewith, consistent with disclosed embodiments of the present disclosure.

FIG. 6 is a block diagram 600 that illustrates a composition of the executable node 502 that enables persistent storage of data and the processing logic associated therewith, consistent with disclosed embodiments of the present disclosure.

As described in conjunction with FIG. 6, the executable node 502 includes the base node 302 and one or more overlay nodes (e.g., the first and second overlay nodes 506 and 508). For the brevity of the ongoing description, the persistent storage is explained for the executable node 502 including only the first overlay node 506. One or more operations performed for ensuring the persistence of the first overlay node 506 may be performed for the second overlay node 508 as well.

Referring to FIG. 6, the executable node 502 includes the base node 302 and the first overlay node 506. The executable node 502 has a corresponding first state 602 having a first ID 604. The base node 302 has a second state 606 having a second ID 608, and the first overlay node 506 has a third state 610 having a third ID 612. A manifest (for example, first through third manifests 614-618) is generated for each of the base node 302, the executable node 502, and the first overlay node 506. In an embodiment, the manifests may be generated by the storage management module 218. The first manifest 614 is associated with the executable node 502 and has a fourth ID 620 and an overlay ID 622. The second manifest 616 is associated with the base node 302 and has a fifth ID 624. The third manifest 618 is associated with the first overlay node 506 and has a sixth ID 626. Further, the manifests are stored at respective storage locations that may be centralized or distributed storage locations associated with the overlay system 202. The manifests may be stored by the storage management module 218.

The first state 602 of the executable node 502 includes data required to reconstruct the executable node 502 (e.g., attributes, properties, etc.). The first state 602 of the executable node 502 is persistently stored along with the first ID 604. The first manifest 614 is generated for the executable node 502 and has (i) the fourth ID 620 (which is the same as the first ID 604), (ii) the storage location of the first state 602 of the executable node 502, and (iii) the overlay ID 622 (which is the same as the sixth ID 626). Notably, the fourth ID 620 is the same as the first ID 604 and the fifth ID 624, hence, the first manifest 614 includes the ID of the state of the base node 302 and the executable node 502. Further, the overlay ID 622 is the same as the sixth ID 626 of the state of the first overlay node 506. Therefore, the first manifest 614 may be used to identify and retrieve the states of the base node 302, the executable node 502, and the first overlay node 506. Subsequently, the retrieved states may be used to reconstruct the executable node 502 and the first overlay node 506. In an instance, the executable node 502 may be further extended to include additional overlay nodes. In such an instance, the first manifest 614 may include state IDs of the additional overlay nodes as well. A first manifest state (not shown) is then generated for the first manifest 614 and persistently stored along with the fourth ID 620.

The second state 606 of the base node 302 includes data required to reconstruct the base node 302 (e.g., attributes, properties, etc.) and is persistently stored along with the second ID 608. The second manifest 616 is generated for the base node 302 and has the fifth ID 624 and the storage location of the second state 606 of the base node 302. The second ID 608 of the second state 606 and the fifth ID 624 of the second manifest 616 are the same as the first ID 604 of the first state 602 of the executable node 502 (which is also the same as the fourth ID 620 of the first manifest 614 of the executable node 502). As mentioned above, along with the first state 602, the first manifest 614 may also be used to identify and retrieve the second manifest 616 which in turn may be used to identify the second state 606 of the base node 302. A second manifest state (not shown) is then generated for the second manifest 616 and persistently stored along with the fifth ID 624. Thus, the states, manifests, and manifest states for the executable node 502 and the base node 302 include the same, shared, ID. A shared ID can be used in this instance because the states, manifests, and manifest states are stored separately. The separate storage of the states, manifests, and manifest states exhibit a distributed architecture of the overlay system 202.

The third state 610 of the first overlay node 506 includes data required to reconstruct the first overlay node 506 (e.g., attributes, properties, processing logic, etc.) and is persistently stored along with the third ID 612. The third manifest 618 is generated for the first overlay node 506 and includes the sixth ID 626, which is the same as the third ID 612. Therefore, the first manifest 614 may be further used to identify and retrieve the third manifest 618 which in turn may be used to identify and retrieve the third state 610 of the first overlay node 506. A third manifest state (not shown) is then generated for the third manifest 618 and is persistently stored along with the sixth ID 626.

In operation, when the executable node 502 is to be loaded, the transaction module 208, in conjunction with the storage management module 218, may execute one or more operations to retrieve the first manifest state stored at a known storage location. Based on the first manifest state, the storage management module 218 may re-construct the first manifest 614 which includes the fourth ID 620 which is the same as the fifth ID 624 of the second manifest 616. Based on the fifth ID 624, the storage management module 218 may identify the second manifest state and may generate the second manifest 616 based on which the second state 606 is identified. Subsequently, the base node 302 is loaded and the storage management module 218 may determine that the base node 302 is a node with overlay. Based on the fourth ID 620 (that is the same as the first ID 604 of the first state 602 of the executable node 502) of the first manifest 614, the first state 602 is identified and retrieved. Subsequently, the executable node 502 is loaded. Moreover, based on the overlay ID 622 (that is the same as the sixth ID 626 of the third manifest 618) of the first manifest 614, the third manifest state is identified and the third manifest 618 is generated. Subsequently, based on the sixth ID 626 (that is the same as the third ID of the third state 610) of the third manifest 618, the third state 610 is identified and retrieved. Based on the third state 610, the first overlay node 506 is reconstructed and loaded in the executable graph-based model 100.

Based on a context of a stimulus (for example, a stimulus of the set of stimuli 238) associated with the overlay system 202, the processing circuitry (such as the context module 210) may determine an ID that is the same as the fifth ID 624. Based on the determined ID, the processing circuitry (such as the memory management module 216 and the storage management module 218) may identify the second manifest 616. Subsequently, the processing circuitry (such as the memory management module 216 and the storage management module 218) may identify the second state 606 which has the second ID 608 that matches the fifth ID 624. Further, the processing circuitry (such as the memory management module 216 and the storage management module 218) may retrieve the second state 606 associated with the second manifest 616 from a corresponding storage element. Subsequently, the processing circuitry (such as the memory management module 216 and the storage management module 218) may determine, by checking the manifest storage(s) associated with the overlay system 202, whether there is another manifest (such as the first manifest 614 of the executable node 502) with an ID that matches the second ID 608 and the fifth ID 624. Notably, the first manifest 614 includes storage locations of each overlay node (for example, the first overlay node 506) of the executable node 502. Based on the overlay ID 622 included in the first manifest 614 that matches the sixth ID 626 included in the third manifest 618, the processing circuitry (such as the memory management module 216 and the storage management module 218) may identify and retrieve the third manifest 618 from a manifest storage of a plurality of manifest storages of the overlay system 202. Subsequently, the processing circuitry (such as the memory management module 216 and the storage management module 218) may identify the third state 610 which has the third ID 612 that matches the sixth ID 626. Further, the processing circuitry (such as the memory management module 216 and the storage management module 218) may retrieve the third state 610 associated with the third manifest 618 from a corresponding storage element. To determine whether the first overlay node 506 has an overlay node associated therewith, the processing circuitry (such as the memory management module 216 and the storage management module 218) may also perform a check to determine whether any of the plurality of manifest storages of the overlay system 202 includes any other manifest with an ID that matches the sixth ID 626. Since the first overlay node 506 does not have an overlay associated therewith, no other manifest has the ID that matches the sixth ID.

Notably, the manifest (the third manifest 618) of the first overlay node 506 includes a reference (such as an identifier that is common to the second manifest 616 and the third manifest 618, a link, a path, a storage location, or the like) to the second manifest 616 of the base node 302. Therefore, the re-formation of the executable node 502 includes re-creation of the first overlay node 506 prior to re-creation of the base node 302. Subsequently, the first overlay node 506 and the base node 302 are organized by associating the base node 302 with the first overlay node 506 to re-form the executable node 502.

In some embodiments, the first overlay node 506 may not be loaded in case it is not required for executing the operation associated with the one stimulus of the set of stimuli 238. The loaded executable node 502 and the first overlay node 506 may be unloaded in case they remain unused for a predefined time period, whereas one or more executable nodes that are used at least once during the predefined time period may remain loaded in the executable graph-based model 100. In some embodiments, the data and processing logic associated with a loaded executable node and/or overlay node may be transferred to a local memory of the overlay system 202 if the data and the processing logic remain unused for a first predefined period of time. Further, the data and the processing logic associated with the executable node/overlay node are transferred to an external storage from the local memory in case the executable node/overlay node remains unused for a second predefined period of time. The second predefined period of time is greater than the first predefined period of time. The term unloading refers to storing a state of a node with a current version of data and processing logic associated therewith at a storage location that is pointed by the corresponding manifest.

An executable graph-based model (for example, the executable graph-based model 100) may be stored (and loaded) using the above-described composition. Beneficially, each component is stored separately thereby allowing a user to maintain and store their data independently of the storage of the structure and functionality of the executable graph-based model 100.

Notably, the management and storage of manifests is managed by the controller module 206, the memory management module 216, the storage management module 218, a combination of these, or any other module of the overlay system 202. Also, all manifest states are stored together at a storage location (such as a manifest storage) that is known to the storage management module 218. Such centralized storage of the manifest states ensures that node states associated therewith are easily accessible.

It will be apparent to a person skilled in the art that although FIG. 6 illustrates only a single overlay node associated with a base node, in other embodiments, the executable node 502 may include additional or different overlay nodes (for example, the second overlay node 508). It will also be apparent to a person skilled in the art that only those overlay nodes that are required for responding to one stimulus of the set of stimuli 238 may be loaded.

The overlay system 202 described in conjunction with FIGS. 1-6 is used to facilitate one or more operations associated with facilitation of the executable graph-based model 100 using the external datastore 246. Various concepts and features associated with the facilitation of the executable graph-based model 100 using the external datastore 246 are described in detail later in the description.

Figure 7A:
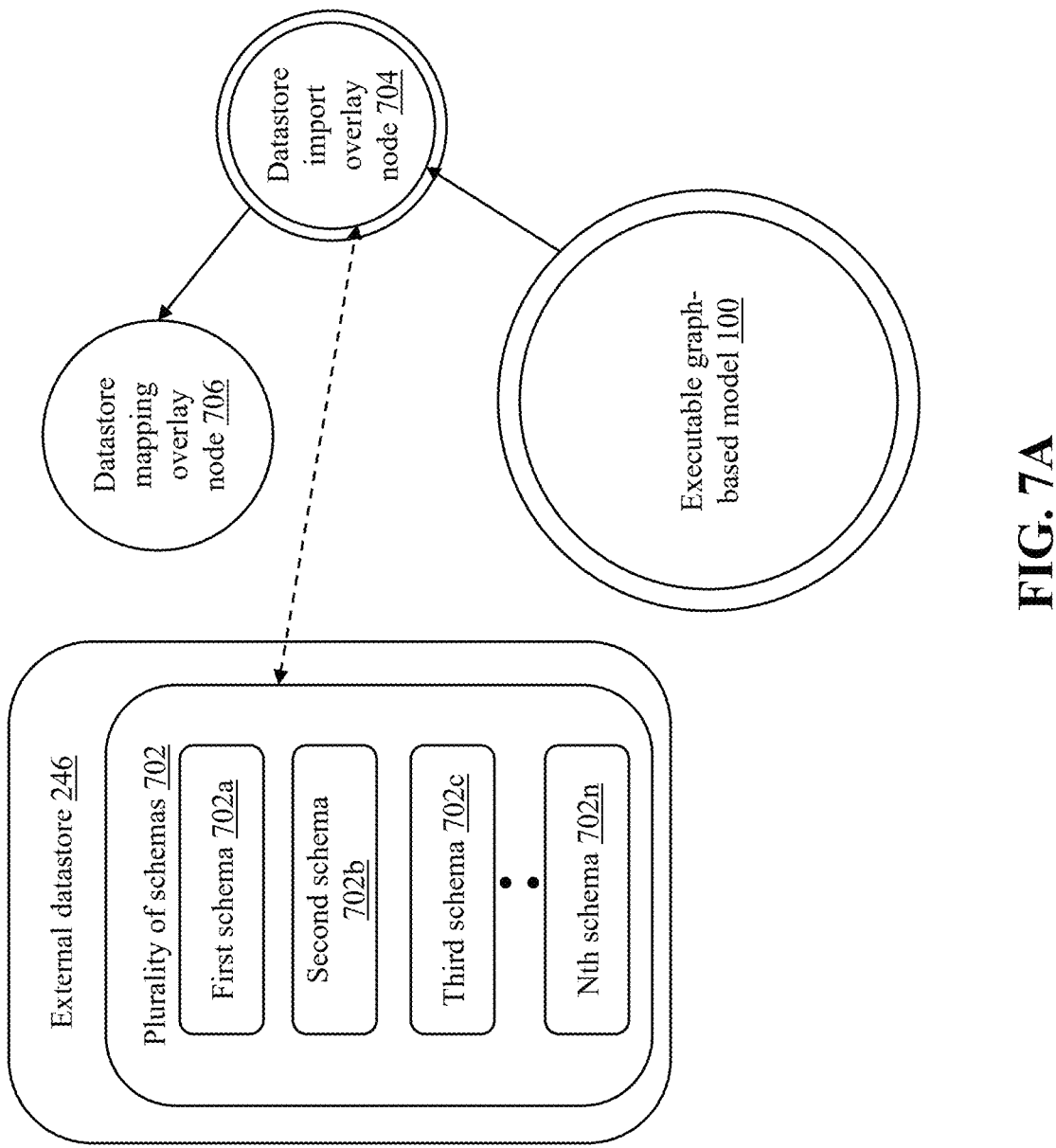
FIGS. 7A-7F, collectively, illustrate facilitation of the executable graph-based model using an external datastore, consistent with disclosed embodiments of the present disclosure.

FIGS. 7A-7F, collectively, illustrate facilitation of the executable graph-based model 100 using the external datastore 246, consistent with disclosed embodiments of the present disclosure. Referring to FIG. 7A, the external datastore 246 that includes the plurality of schemas (hereinafter referred to as "the plurality of schemas 702") is shown. The plurality of schemas 702 may include a first schema 702*a*, a second schema 702*b*, a third schema 702*c*, . . . , and an Nth schema 702*n*. Each schema of the plurality of schemas 702 may refer to a structure or blueprint that defines how data is organized and how relationships among the data are maintained in the external datastore 246. Further, each schema may outline data types, constraints, relationships, and other metadata for the data being stored in the external datastore 246. In an example, the external datastore 246 may be associated with a medical diagnosis system. In such an example, the first schema 702*a* may be associated with patient data, the second schema 702*b* may be associated with doctor data, the third schema 702*c* may be associated with medical equipment data, and the like. As described previously, the external datastore 246 may be stored in the server 244 which is external to the overlay system 202.

In operation, the processing circuitry (for example, the controller module 206, the transaction module 208, the stimuli management module 212, or the like) may be configured to receive a first stimulus of the set of stimuli 238 associated with the overlay system 202. The first stimulus may be indicative of creation of the executable graph-based model 100. The processing circuitry (for example, the controller module 206, the transaction module 208, the stimuli management module 212, the external datastore management module 222, or the like) may be configured to create, in the storage element, based on the first stimulus, the executable graph-based model 100 that implements the external datastore 246 associated with the overlay system 202. The creation of the executable graph-based model 100 that implements the external datastore 246 may correspond to creation of data structure in the storage element that implements data structure of external datastore 246. In other words, the processing circuitry may access the external datastore 246 and translate the data structure of the external datastore 246 to the data structure for the executable graph-based model 100 to create the executable graph-based model 100 in the overlay system 202.

Upon the creation of the executable graph-based model 100, the processing circuitry (for example, the controller module 206, the transaction module 208, the stimuli management module 212, the external datastore management module 222, or the like) may be further configured to create a datastore import overlay node 704 and a datastore mapping overlay node 706 in the storage element. The datastore import overlay node 704 may extend functionality of the executable graph-based model 100. Further, the datastore mapping overlay node 706 may extend functionality of the datastore import overlay node 704. The datastore import overlay node 704 may facilitate the processing circuitry (for example, the controller module 206, the transaction module 208, the stimuli management module 212, the external datastore management module 222, or the like) to access the plurality of schemas 702 of the external datastore 246.

The datastore import overlay node 704 may be structurally and functionally similar to the datastore overlay node 402 with the datastore import overlay node-type 428. Further, the datastore mapping overlay node 706 may be structurally and functionally similar to the datastore overlay node 402 with the datastore mapping overlay node-type 430.

Figure 7B:
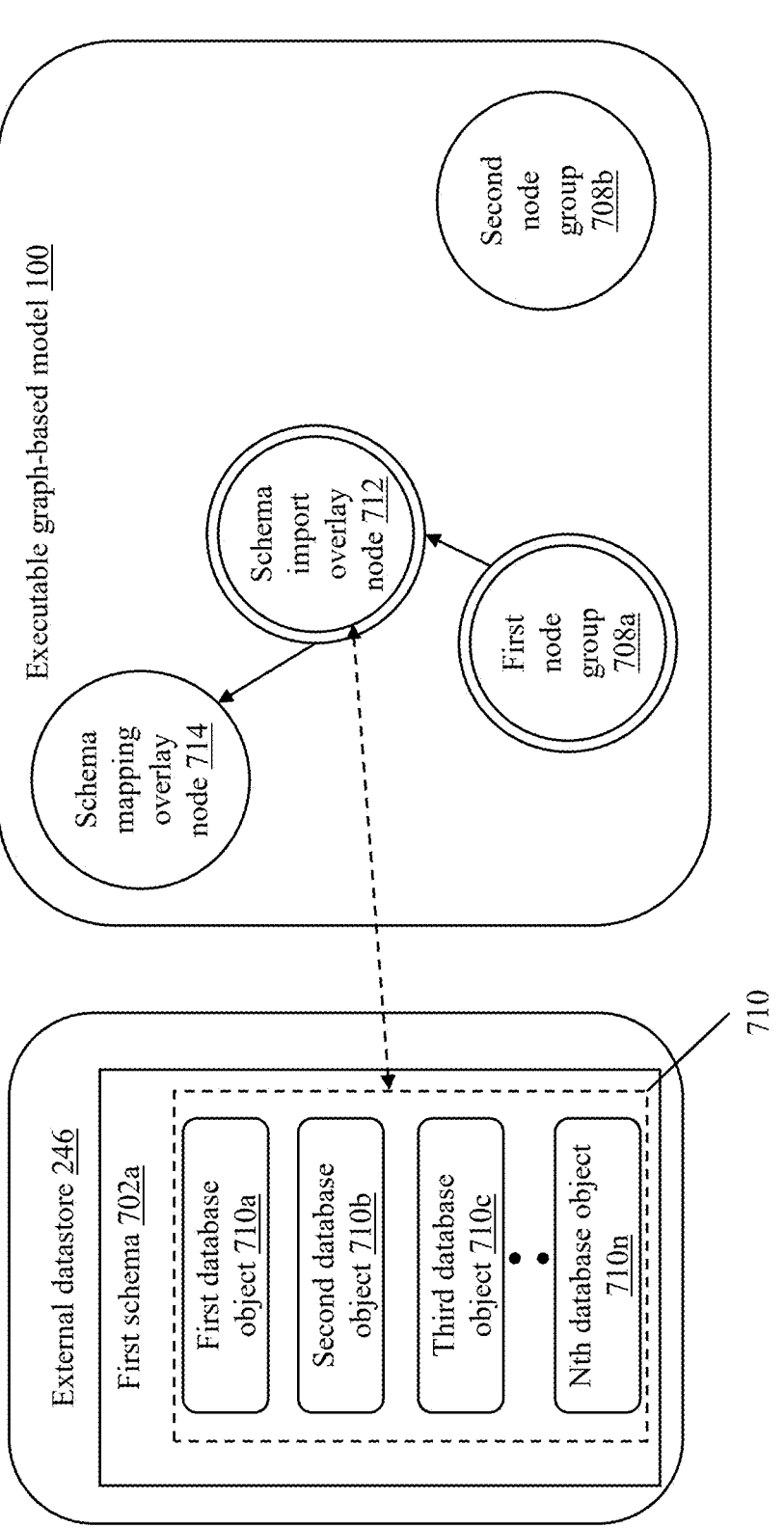

Now referring to FIG. 7B, the processing circuitry (for example, the controller module 206, the transaction module 208, the external datastore management module 222, or the like) may be further configured to create a first plurality of node groups in the executable graph-based model 100. The first plurality of node groups may implement the plurality of schemas 702, with a first node group 708a created for the first schema 702a and a second node group 708b created for the second schema 702b.

The processing circuitry (for example, the controller module 206, the transaction module 208, the external datastore management module 222, or the like) may be configured to determine the first schema 702a of the plurality of schemas 702 using the datastore import overlay node 704. Further, the first node group 708a that implements the first schema 702a may be created using the datastore mapping overlay node 706 based on the determination of the first schema 702a.

Similarly, the processing circuitry (for example, the controller module 206, the transaction module 208, the external datastore management module 222, or the like) may be configured to determine the second schema 702b using the datastore import overlay node 704. Further, the second node group 708b that implements the second schema 702b may be created using the datastore mapping overlay node 706 based on the determination of the second schema 702b. A node group refers to a data structure that can contain two or more active nodes.

In some embodiments, the processing circuitry (for example, the controller module 206, the transaction module 208, the external datastore management module 222, or the like) may be further configured to determine, using the datastore import overlay node 704, at least one of a set of data formats, a set of views, a set of triggers, or a size, of the first schema 702a. Additionally, the creation of the first node group 708a may be further based on the determination of at least one of the set of data formats, the set of views, the set of triggers, or the size, of the first schema 702a. A data format of a schema may correspond to a data type in which data is stored in the first schema 702a. Examples of a data type may include numeric data type such as integer, float, or decimal, character data type such as character, variable character, or text, format of date/time, Boolean data type, or the like. A view may refer to a virtual table created from a result of a query in the external datastore 246. A trigger may refer to an automatic action executed in the external datastore 246 when a specific event occurs in the external datastore 246. Triggers help in enforcing rules and automating tasks. The creation of the first node group 708a based on the determination of at least one of the set of data formats, the set of views, the set of triggers, or the size, of the first schema 702a may ensure that the first schema 702a is implemented in its entirety in the executable graph-based model 100.

In FIG. 7B, the first schema 702a is shown to include a plurality of database objects 710 associated therewith. The plurality of database objects 710 may include a first database object 710a, a second database object 710b, a third database object 710c, . . . , and an Nth database object 710n. Each database object of the plurality of database objects 710 may refer to a logical structure that defines and organizes the data within the first schema 702a. In reference to the example where the first schema 702a is associated with the patient data, the first database object 710a may correspond to a patient information table, the second database object 710b may correspond to a medical history table, the third database object 710c may correspond to an allergies table, and the like.

The patient information table may include a first plurality of fields that include patient ID, first name, last name, date of birth, gender, address, phone number, email, or the like. Further, the medical history table may include a second plurality of fields that include history ID, patient ID, condition name, diagnosis date, treatment received, doctor ID, or the like. Additionally, the allergies table may include a third plurality of fields that include allergy ID, patient ID, allergy name, reaction, severity, or the like.

The processing circuitry (for example, the controller module 206, the transaction module 208, the external datastore management module 222, or the like) may be further configured to create, in the executable graph-based model 100, a schema import overlay node 712 and a schema mapping overlay node 714. The schema import overlay node 712 may extend functionality of the first node group 708a, and the schema mapping overlay node 714 may extend functionality of the schema import overlay node 712. The schema import overlay node 712 may facilitate the processing circuitry (for example, the controller module 206, the transaction module 208, the external datastore management module 222, or the like) to access the plurality of database objects 710 of the first schema 702a.

For the sake of brevity, only the first node group 708a and the second node group 708b of the first plurality of node groups are shown in FIG. 7B. In various embodiments, one or more node groups of the first plurality of node groups may be coupled to one or more other node groups in the executable graph-based model 100 based on coupling between one or more schemas of the plurality of schemas 702.

The schema import overlay node 712 may be structurally and functionally similar to the datastore overlay node 402 with the schema import overlay node-type 432. Further, the schema mapping overlay node 714 may be structurally and functionally similar to the datastore overlay node 402 with the schema mapping overlay node-type 434.

Although it is described that the schema import overlay node 712 that extends the functionality of the first node group 708a and the schema mapping overlay node 714 that extends the functionality of the schema import overlay node 712 is created in the executable graph-based model 100, the scope of the present disclosure is not limited to it. In various embodiments, the processing circuitry may be configured to create a schema import overlay node for each node group of the first plurality of node groups to extend functionality of the corresponding node group in the executable graph-based model 100. In some embodiments, the processing circuitry may be further configured to create a schema mapping overlay node for each created schema import overlay node to extend functionality of the corresponding schema import overlay node. In some more embodiments, the schema mapping overlay node 714 may further extend functionality of each schema import overlay node in the executable graph-based model 100. In various additional embodiments, the schema import overlay node 712 may extend functionality of each node group of the first plurality of node groups.

Figure 7C:
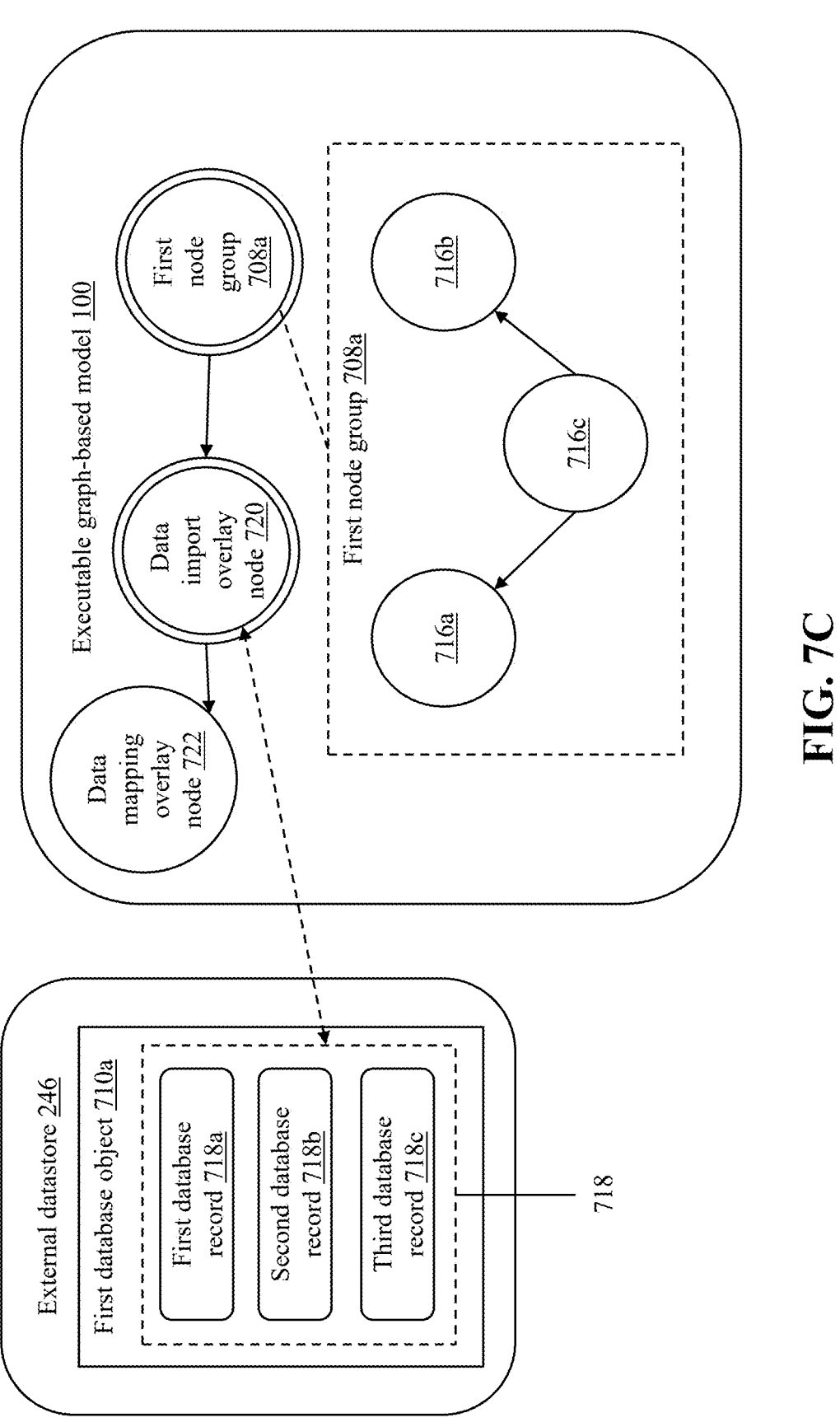

Referring to FIG. 7C, the processing circuitry (for example, the controller module 206, the transaction module 208, the external datastore management module 222, or the like) may be configured to create a first set of active nodes 716a-716c that implements the first database object 710a associated with the first schema 702a. In reference to the above-described example, an active node of the first set of active nodes 716a-716c may represent a corresponding field of the first plurality of fields associated with the first database object 710a. That is to say, the active node 716a may represent the patient ID and the active node 716b may represent the first name. Each of the active nodes 716a and 716b may be structurally and functionally similar to the active node 302 with the vertex node-type 328. Further, the active node 716c may be structurally and functionally similar to the active node 302 with the edge node-type 330 to define the relationship between active node 716a and the active node 716b.

The processing circuitry (for example, the controller module 206, the transaction module 208, the external datastore management module 222, or the like) may be configured to determine the first database object 710a of the plurality of database objects 710 using the schema import overlay node 712. Further, the first set of active nodes 716a-716c that implements the first database object 710a is created using the schema mapping overlay node 714.

Although, the first set of active nodes 716a-716c is shown to include three active nodes, the scope of the present disclosure is not limited to it. In various embodiments, the first set of active nodes 716a-716c may include more than three or less than three active nodes.

In FIG. 7C, the first database object 710a is shown to include a first set of database records 718. Further, the first set of database records 718 may include a first database record 718a, a second database record 718b, and a third database record 718c. In reference to the above-described example where the first database object 710a corresponds to the patient information table, the first database record 718a may include a first plurality of values for the first plurality of fields. Similarly, the second database record 718b may include a second plurality of values for the first plurality of fields. Further, the third database record 718c may include a third plurality of values for the first plurality of fields. That is to say, the first set of database records 718 may include pluralities of values for the patient ID, the first name, the last name, the date of birth, the gender, the address the phone number, the email, or the like. Each plurality of values may be associated with a patient of a plurality of patients associated with the medical diagnosis system.

The processing circuitry (for example, the controller module 206, the transaction module 208, the external datastore management module 222, or the like) may be configured to create a data import overlay node 720 and a data mapping overlay node 722 in the executable graph-based model 100. The data import overlay node 720 may extend functionality of the first node group 708a, and the data mapping overlay node 722 may extend functionality of the data import overlay node 720. The data import overlay node 720 may facilitate the processing circuitry (for example, the controller module 206, the transaction module 208, the external datastore management module 222, or the like) to access the first set of database records 718.

The data import overlay node 720 may be structurally and functionally similar to the datastore overlay node 402 with the data import overlay node-type 436. Further, the data mapping overlay node 722 may be structurally and functionally similar to the datastore overlay node 402 with the data mapping overlay node-type 438.

Figure 7D:
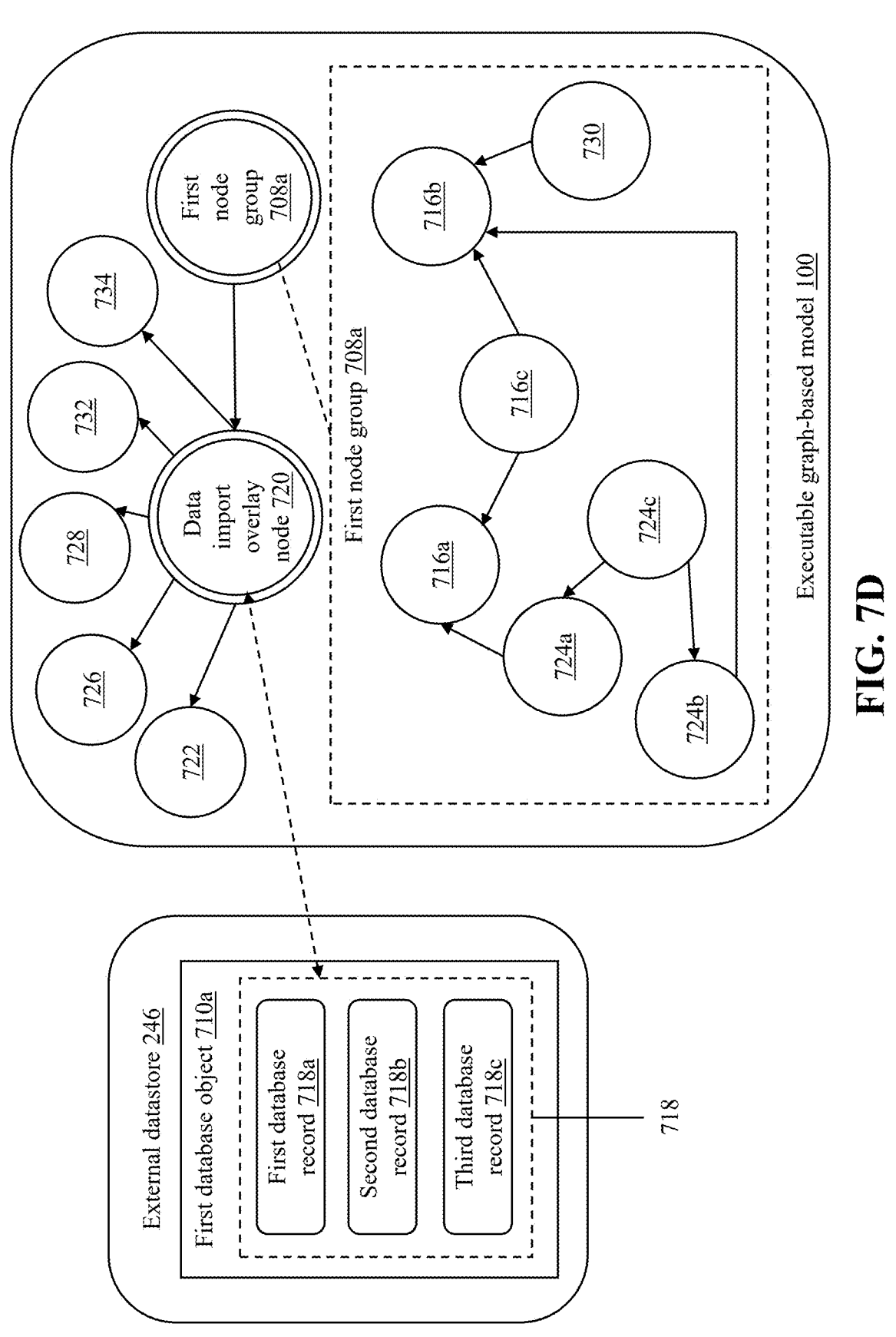

Referring to FIG. 7D, the processing circuitry (for example, the controller module 206, the transaction module 208, the external datastore management module 222, or the like) may be configured to create a second set of active nodes 724a-724c that implements the first set of database records 718 associated with the first database object 710a, in the first node group 708a. One or more active nodes of the second set of active nodes 724a-724c may correspond to one or more values associated with one or more database records of the first set of database records 718. In reference to the above-described example, the active node 724a may represent a value for the patient ID that is represented by the active node 716a. Further, the active node 724b may represent a value for the first name that is represented by the active node 716b. Further, the active node 724c may define the relationship between the active node 724a and the active node 724b. Each of the active nodes 724a and 724b may be structurally and functionally similar to the active node 302 with the vertex node-type 328. Further, the active node 724c may be structurally and functionally similar to the active node 302 with the edge node-type 330 to define the relationship between active node 724a and the active node 724b.

The processing circuitry (for example, the controller module 206, the transaction module 208, the external datastore management module 222, or the like) may be configured to determine the first set of database records 718 associated with the first database object 710a using the data import overlay node 720. Further, the second set of active nodes 724a-724c that implements the first set of database records 718 is created using the data mapping overlay node 722.

Although the creation of the second set of active nodes 724a-724c for the first set of database records 718 associated with the first database object 710a is described, the scope of the present disclosure is not limited to it. In various embodiments, a set of database records associated with each database object of the plurality of database objects 710 may be implemented as corresponding active nodes in the first node group 708a in the above-described manner. Additionally, each remaining node group of the first plurality of node groups may be populated in the above-described manner.

Although, the second set of active nodes 724a-724c is shown to include three active nodes, the scope of the present disclosure is not limited to it. In various embodiments, the second set of active nodes 724a-724c may include more than three or less than three active nodes.

In some embodiments, the processing circuitry (for example, the controller module 206, the transaction module 208, the external datastore management module 222, or the like) may be configured to create, in the executable graph-based model 100, a listener overlay node 726 that extends functionality of the data import overlay node 720. The processing circuitry (for example, the controller module 206, the transaction module 208, the external datastore management module 222, or the like) may be further configured to monitor the first schema 702a of the external datastore 246 using the listener overlay node 726 and the data import overlay node 720. Further, the processing circuitry (for example, the controller module 206, the transaction module 208, the external datastore management module 222, or the like) may be configured to update, using the data mapping overlay node 722, the first node group 708a in the executable graph-based model 100 based on the monitoring of the first schema 702a.

The processing circuitry may monitor the first schema 702a to detect any update such as addition, modification, or deletion of at least one of one or more database objects, one or more database records, or one or more values in the first schema 702a. Further, the processing circuitry may update the first node group 708a based on the detection of any update in the first schema 702a.

In some embodiments, the monitoring of the first schema 702a may be one of periodic or continuous. In an example, the first schema 702a may be monitored every 2 hours. In some embodiments, the update of the first node group 708a may be one of periodic or in real-time. In an example, the first node group 708a may be updated every 4 hours. When the update of the first node group 708a is in real-time, the first node group 708a may be updated in response to detection of any update to the first schema 702a. In various embodiments, the update of the first node group 708a may correspond to at least one of addition, modification, or deletion of one or more active nodes in the first node group 708a.

In some embodiments, the processing circuitry (for example, the controller module 206, the transaction module 208, the external datastore management module 222, or the like) may be configured to create, in the executable graph-based model 100, a search overlay node 728 that extends functionality of the data import overlay node 720. The processing circuitry (for example, the controller module 206, the transaction module 208, the external datastore management module 222, or the like) may be configured to search, using the search overlay node 728 and the data import overlay node 720, the first schema 702a based on a search value. In an example, the search value may correspond to a value for the first name. In some embodiments, the processing circuitry may receive a second stimulus of the set of stimuli 238 that is indicative of the search value and search the first schema 702a based on the reception of the second stimulus.

The processing circuitry (for example, the controller module 206, the transaction module 208, the external datastore management module 222, or the like) may be further configured to retrieve, based on the search, a second set of database records from the first schema 702a and create, using the data mapping overlay node 722, a third set of active nodes in the first node group 708a that implements the retrieved second set of database records. For the sake of brevity, an active node 730 of the third set of active nodes is shown in FIG. 7D.

In some embodiments, the processing circuitry (for example, the controller module 206, the transaction module 208, the external datastore management module 222, or the like) may be configured to create, in the executable graph-based model 100, a lookup overlay node 732 that extends functionality of the data import overlay node 720. The processing circuitry (for example, the controller module 206, the transaction module 208, the external datastore management module 222, or the like) may be further configured to lookup, using the lookup overlay node 732 and the data import overlay node 720, the first schema 702a based on one or more identifiers associated with the external datastore 246. In reference to the above-described example, the one or more identifiers may correspond to one or more values associated with the patient ID. The processing circuitry (for example, the controller module 206, the transaction module 208, the external datastore management module 222, or the like) may be further configured to retrieve, based on the lookup, a second set of database records from the first schema 702a. Further, the processing circuitry (for example, the controller module 206, the transaction module 208, the external datastore management module 222, or the like) may be configured to create, using the data mapping overlay node 722, a third set of active nodes in the first node group 708a that implements the retrieved second set of database records. For the sake of brevity, an active node 730 of the third set of active nodes is shown in FIG. 7D.

In some embodiments, upon the creation of the first set of active nodes 716a-716c in the first node group 708a, the data import overlay node 720, and the data mapping overlay node 722, the processing circuitry (for example, the controller module 206, the transaction module 208, the external datastore management module 222, or the like) may be configured to create, in the executable graph-based model 100, a retrieve-all overlay node 734 that extends functionality of the data import overlay node 720. Further, the processing circuitry (for example, the controller module 206, the transaction module 208, the external datastore management module 222, or the like) may be configured to retrieve, using the data import overlay node 720 and the retrieve-all overlay node 734, the first set of database records 718 associated with the first database object 710a. Further, the second set of active nodes 724a-724c that implements the first set of database records 718 is created using the data mapping overlay node 722. In other words, the second set of active nodes 724a-724c is created based on the retrieved first set of database records 718.

In some embodiments, the executable graph-based model 100 may be one of persistable or non-persistable. Based on the executable graph-based model 100 being persistable, the executable graph-based model 100 may be stored in the storage element. Further, based on the executable graph-based model 100 being non-persistable, the executable graph-based model 100 may cease to exist from the storage element upon expiration of a threshold time-period.

In some additional embodiments, one or more node groups of the first plurality of node groups may be further associated with one or more overlay nodes such as security overlay nodes, encryption overlay nodes, or the like.

In some more embodiments, one or more active nodes present in the executable graph-based model 100 may be associated with one or more overlay nodes to extend functionalities of the corresponding one or more active nodes.

Figure 7E:
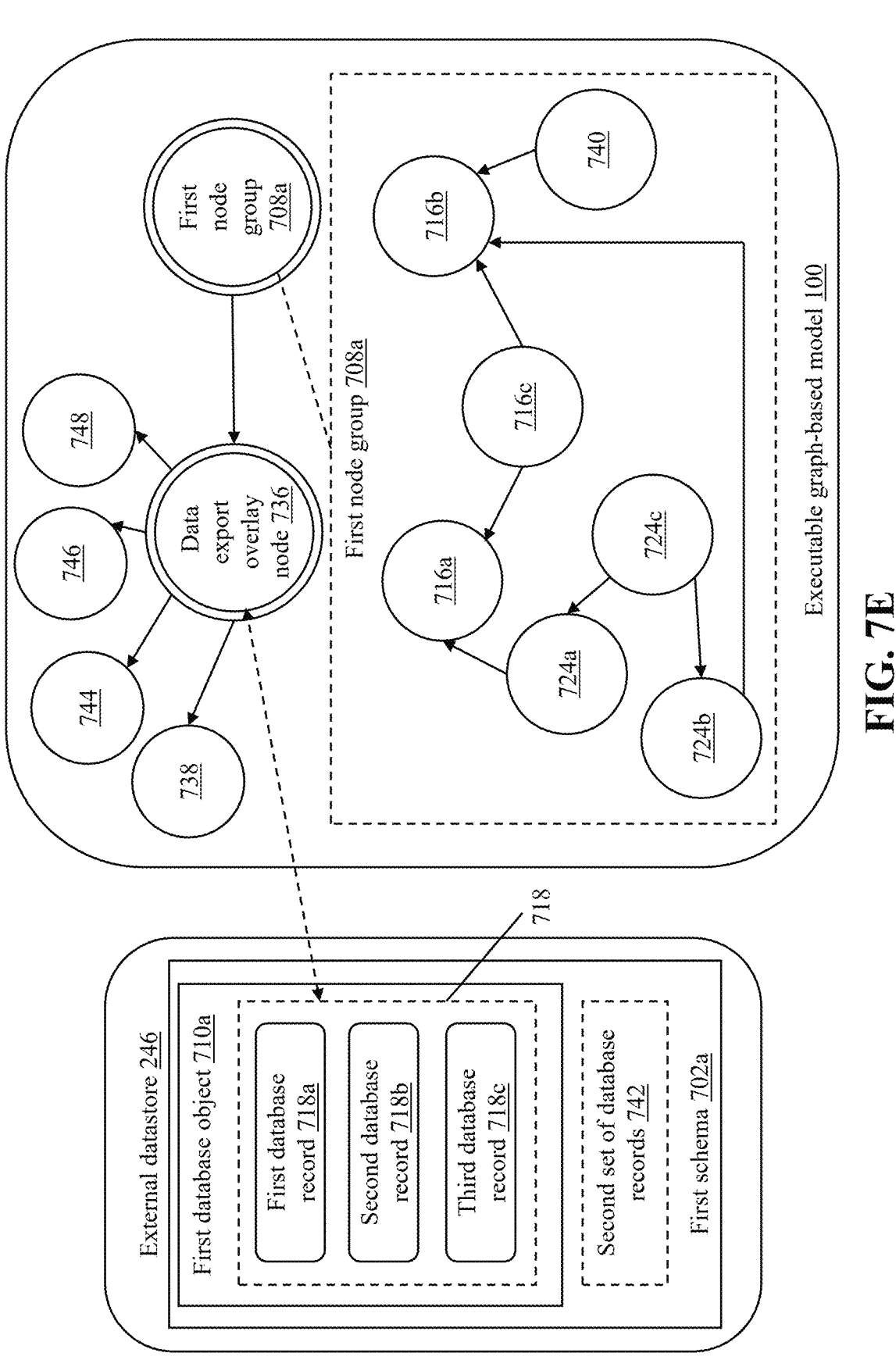

Referring to FIG. 7E, the processing circuitry (for example, the controller module 206, the transaction module 208, or the like) may be further configured to execute one or more operations in the executable graph-based model 100. In reference to the above-described medical diagnosis system example, the one or more operations may be associated with diagnosis of various conditions associated with one or more patients of the plurality of patients. The execution of the one or more operations in the executable graph-based model 100 may result in modification of the executable graph-based model 100.

The processing circuitry (for example, the controller module 206, the transaction module 208, the external datastore management module 222, or the like) may be configured to create a data export overlay node 736 that extends functionality of the first node group 708a, and a data mapping overlay node 738 that extends functionality of the data export overlay node 736.

In some embodiments, the modification of the executable graph-based model 100 may correspond to addition of a third set of active nodes in the first node group 708a of the executable graph-based model 100. For the sake of brevity, the third set of active nodes is shown to include an active node 740. In such embodiments, the processing circuitry (for example, the controller module 206, the transaction module 208, the external datastore management module 222, or the like) may be configured to identify, using the data mapping overlay node 738, the third set of active nodes added to the first node group 708a. The processing circuitry (for example, the controller module 206, the transaction module 208, the external datastore management module 222, or the like) may be further configured to create, using the data export overlay node 736, a second set of database records 742 that implements the identified third set of active nodes in the first schema 702a of the external datastore 246.

The processing circuitry (for example, the controller module 206, the transaction module 208, the external datastore management module 222, or the like) may be further configured to create a creation overlay node 744 that extends functionality of the data export overlay node 736. Further, the creation of the second set of database records 742 in the first schema 702a may be further based on the creation overlay node 744.

In some embodiments, the modification of the executable graph-based model 100 may correspond to modification of a third set of active nodes in the executable graph-based model 100. The third set of active nodes may include one or more active nodes of the second set of active nodes 724a-724c. In an example, the third set of active nodes may include the active node 724b. The processing circuitry (for example, the controller module 206, the transaction module 208, the external datastore management module 222, or the like) may be further configured to identify, using the data mapping overlay node 738, the modified third set of active nodes in the first node group 708a. Further, the processing circuitry (for example, the controller module 206, the transaction module 208, the external datastore management module 222, or the like) may be configured to update, using the data export overlay node 736, one or more database records of the first set of database records 718 based on the identified third set of active nodes.

The processing circuitry (for example, the controller module 206, the transaction module 208, the external datastore management module 222, or the like) may be further configured to create an update overlay node 746 that extends functionality of the data export overlay node 736. Further, the update of the one or more database records of the first set of database records 718 in the first schema 702a may be further based on the update overlay node 746.

In some embodiments, the modification of the executable graph-based model 100 may correspond to deletion of a third set of active nodes in the first node group 708a of the executable graph-based model 100. The third set of active nodes may include one or more active nodes of the second set of active nodes 724a-724c. In such embodiments, the processing circuitry (for example, the controller module 206, the transaction module 208, the external datastore management module 222, or the like) may be further configured to determine, using the data mapping overlay node 738, the deleted third set of active nodes in the first node group 708a. The processing circuitry (for example, the controller module 206, the transaction module 208, the external datastore management module 222, or the like) may be further configured to delete, using the data export overlay node 736, one or more database records of the first set of database records 718 based on the determined third set of active nodes.

The processing circuitry (for example, the controller module 206, the transaction module 208, the external datastore management module 222, or the like) may be further configured to create a delete overlay node 748 that extends functionality of the data export overlay node 736. Further, the deletion of the one or more database records of the first set of database records 718 in the first schema 702a may be further based on the delete overlay node 748.

Figure 7F:
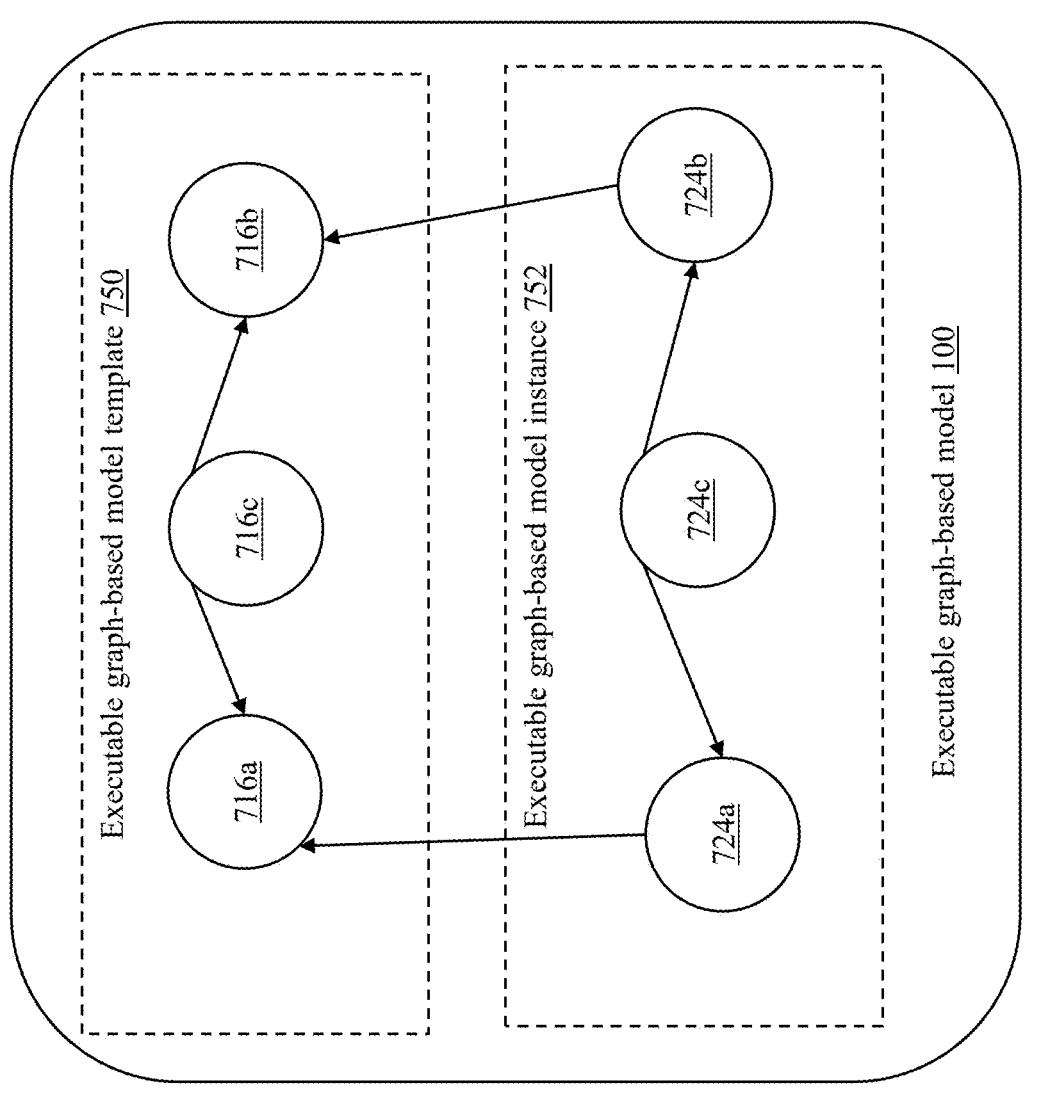

Referring to FIG. 7F, the executable graph-based model 100 that corresponds to a run-time model is illustrated. The run-time model may include an executable graph-based model template 750 that defines a graph structure and an executable graph-based model instance 752 that is an implementation of the executable graph-based model template 750. The executable graph-based model template 750 is shown to include the first set of active nodes 716a-716c. Each of the first set of active nodes 716a-716c may be structurally and functionally similar to the node template 338. The executable graph-based model instance 752 is shown to include the second set of active nodes 724a-724c. Each of the second set of active nodes 724a-724c may be structurally and functionally similar to the node instance 340. Further, the active node 724a is a node instance of the active node 716a. Similarly, the active node 724b is a node instance of the active node 716b. Additionally, the active node 724c is a node instance of the active node 716c.

FIGS. 8A-8D, collectively, illustrate facilitation of the external datastore 246 using the executable graph-based model 100, consistent with disclosed embodiments of the present disclosure.

Figure 8A:
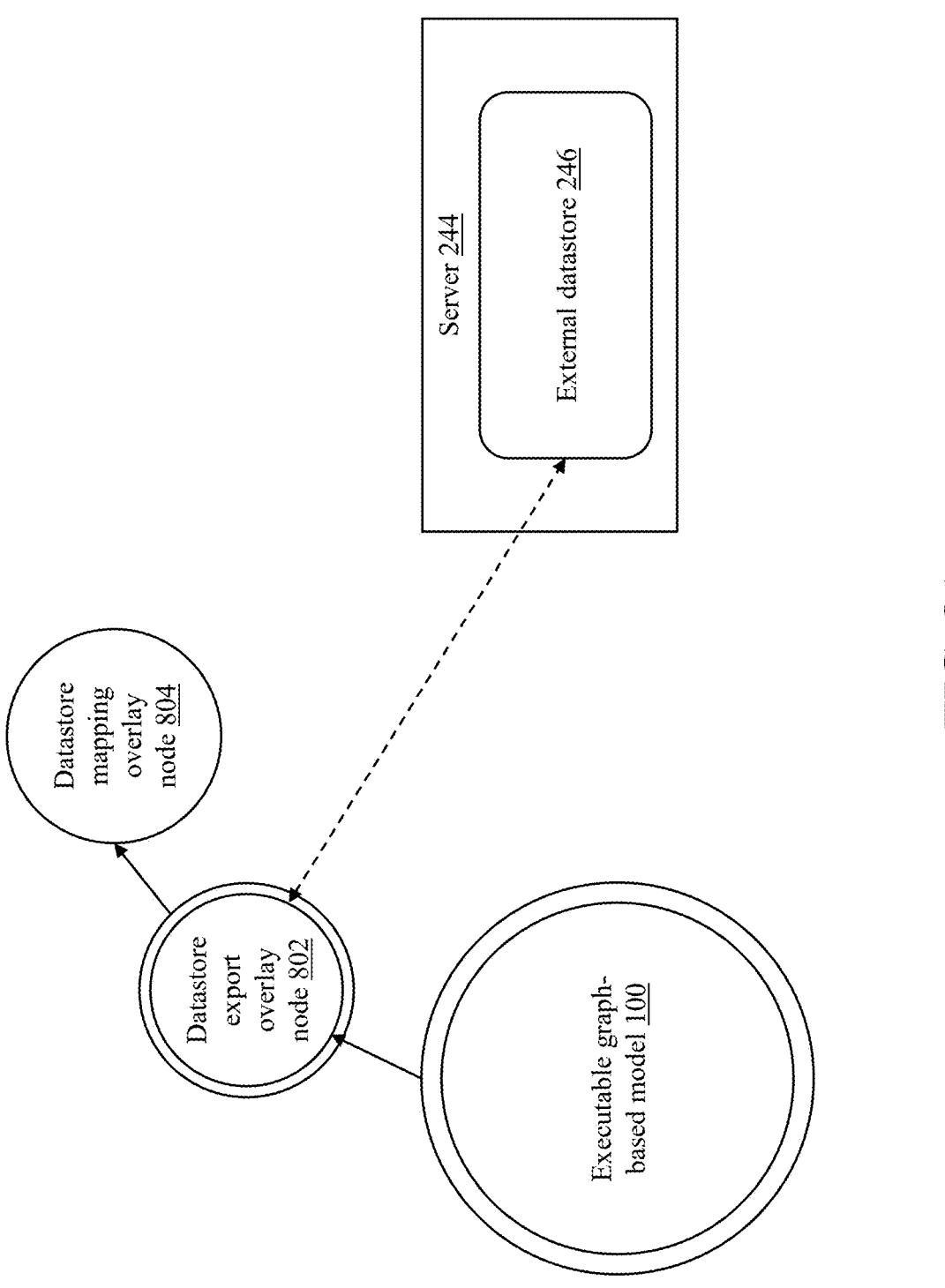
FIGS. 8A-8D, collectively, illustrate facilitation of the external datastore using the executable graph-based model, consistent with disclosed embodiments of the present disclosure.

Referring to FIG. 8A, the executable graph-based model 100 is illustrated. Further, the storage element may be configured to store a datastore export overlay node 802 that extends functionality of the executable graph-based model 100 and a datastore mapping overlay node 804 that extends functionality of the datastore export overlay node 802.

The processing circuitry (for example, the controller module 206, the transaction module 208, the stimuli management module 212, or the like) may be configured to receive a third stimulus of the set of stimuli 238 associated with the overlay system 202. The third stimulus may be indicative of creation of the external datastore 246 in the server 244 using the executable graph-based model 100. Further, the processing circuitry (for example, the controller module 206, the transaction module 208, the external datastore management module 222, or the like) may be configured to create, based on the third stimulus, the external datastore 246 using the datastore export overlay node 802 and the datastore mapping overlay node 804. The external datastore 246 may implement the executable graph-based model 100. Further, the external datastore 246 may be created in the server 244 associated with the overlay system 202.

In some examples, the external datastore 246 may be created using the executable graph-based model 100 as the external datastore 246 provides a simplified representation of data present in the executable graph-based model 100. For the sake of ongoing discussion, the external datastore 246 is assumed to be an RDBMS.

The datastore export overlay node 802 may be structurally and functionally similar to the datastore overlay node 402 with the datastore export overlay node-type 440. Further, the datastore mapping overlay node 804 may be structurally and functionally similar to the datastore overlay node 402 with the datastore mapping overlay node-type 430.

Figure 8B:
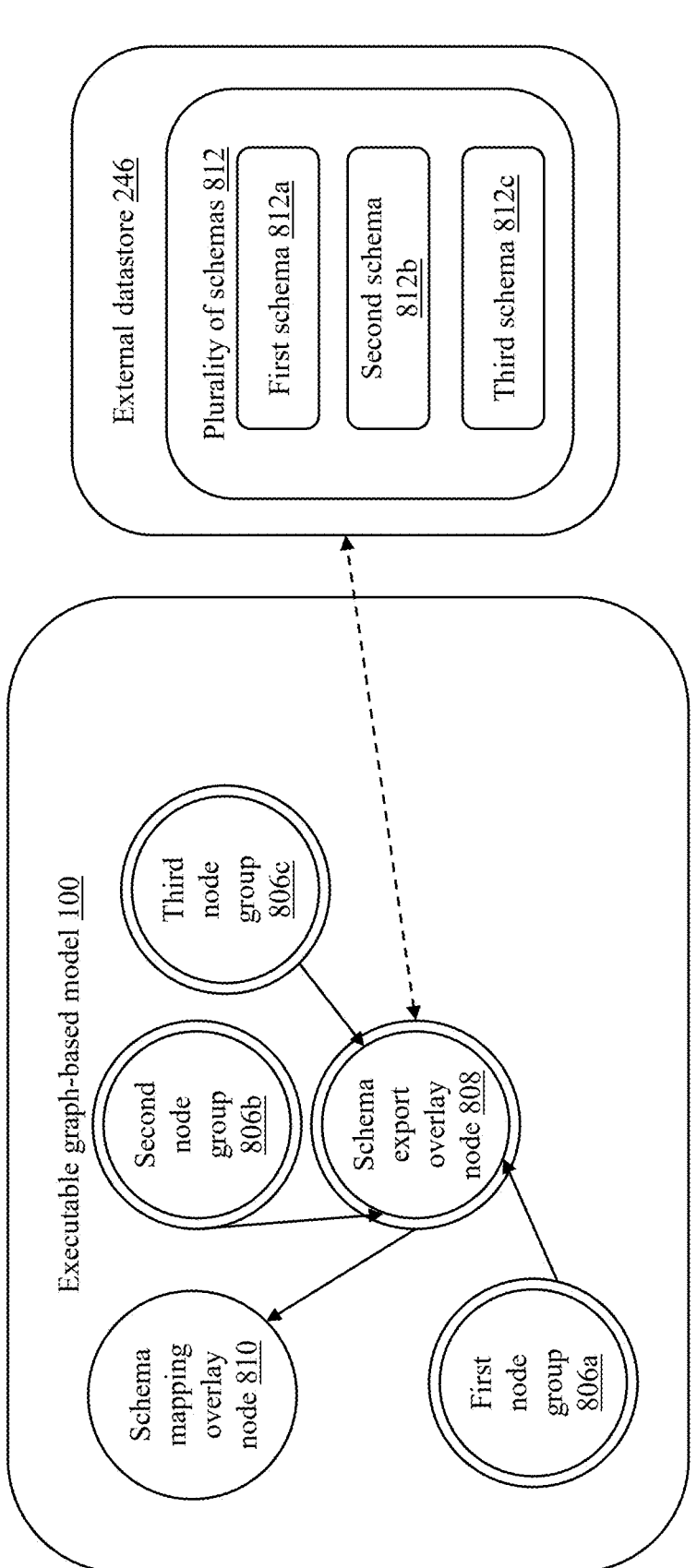

Referring to FIG. 8B, the executable graph-based model 100 is shown to include a second plurality of node groups. The second plurality of node groups may include a first node group 806*a*, a second node group 806*b*, and a third node group 806*c*. Each node group of the second plurality of node groups may correspond to a data structure that can contain a plurality of active nodes. Thus, each node group of the second plurality of node groups may include a plurality of active nodes associated therewith. In an example, the executable graph-based model 100 may be associated with the medical diagnosis system described previously. In such an example, the first node group 806*a* may be associated with the patient data, the second node group 806*b* may be associated with the doctor data, and the third node group 806*c* may be associated with the medical equipment data.

The executable graph-based model 100 may further include a schema export overlay node 808 that extends functionality of the first node group 806*a*, and a schema mapping overlay node 810 that extends functionality of the schema export overlay node 808. The schema export overlay node 808 may further extend functionalities of the second node group 806*b* and the third node group 806*c*. The schema export overlay node 808 may be structurally and functionally similar to the datastore overlay node 402 with the schema export overlay node-type 442. Further, the schema mapping overlay node 810 may be structurally and functionally similar to the datastore overlay node 402 with the schema mapping overlay node-type 434.

The processing circuitry (for example, the controller module 206, the transaction module 208, the external datastore management module 222, or the like) may be further configured to create, in the external datastore 246, a plurality of schemas 812 that implements the second plurality of node groups. That is to say, the plurality of schemas 812 may include a first schema 812*a* created for the first node group 806*a*, a second schema 812*b* created for the second node group 806*b*, and a third schema 812*c* created for the third node group 806*c*. In reference to the above-described example, the first schema 812*a* may be associated with the patient data, the second schema 812*b* may be associated with the doctor data, and the third schema 812*c* may be associated with the medical equipment data.

The processing circuitry (for example, the controller module 206, the transaction module 208, the external datastore management module 222, or the like) may be further configured to determine, using the schema mapping overlay node 810, the first node group 806*a* in the executable graph-based model 100. Further, the first schema 812*a*, that implements the first node group 806*a*, may be created using the schema export overlay node 808. In other words, the schema export overlay node 808 facilitates the creation of the first schema 812*a* in the external datastore 246. In some embodiments, the first node group 806*a* may be determined in the executable graph-based model 100 in response to the reception of the third stimulus.

Although the second plurality of node groups illustrated in FIG. 8A is shown to include three node groups, the scope of the present disclosure is not limited to it. In further embodiments, the second plurality of node groups may include at least two or more than three node groups.

Although the schema export overlay node 808 is shown to extend the functionalities of the first, second, and third node groups 806*a*-806*c*, the scope of the present disclosure is not limited to it. In some embodiments, each of the first, second, and third node groups 806*a*-806*c* may be associated with a dedicated schema export overlay node.

Figure 8C:
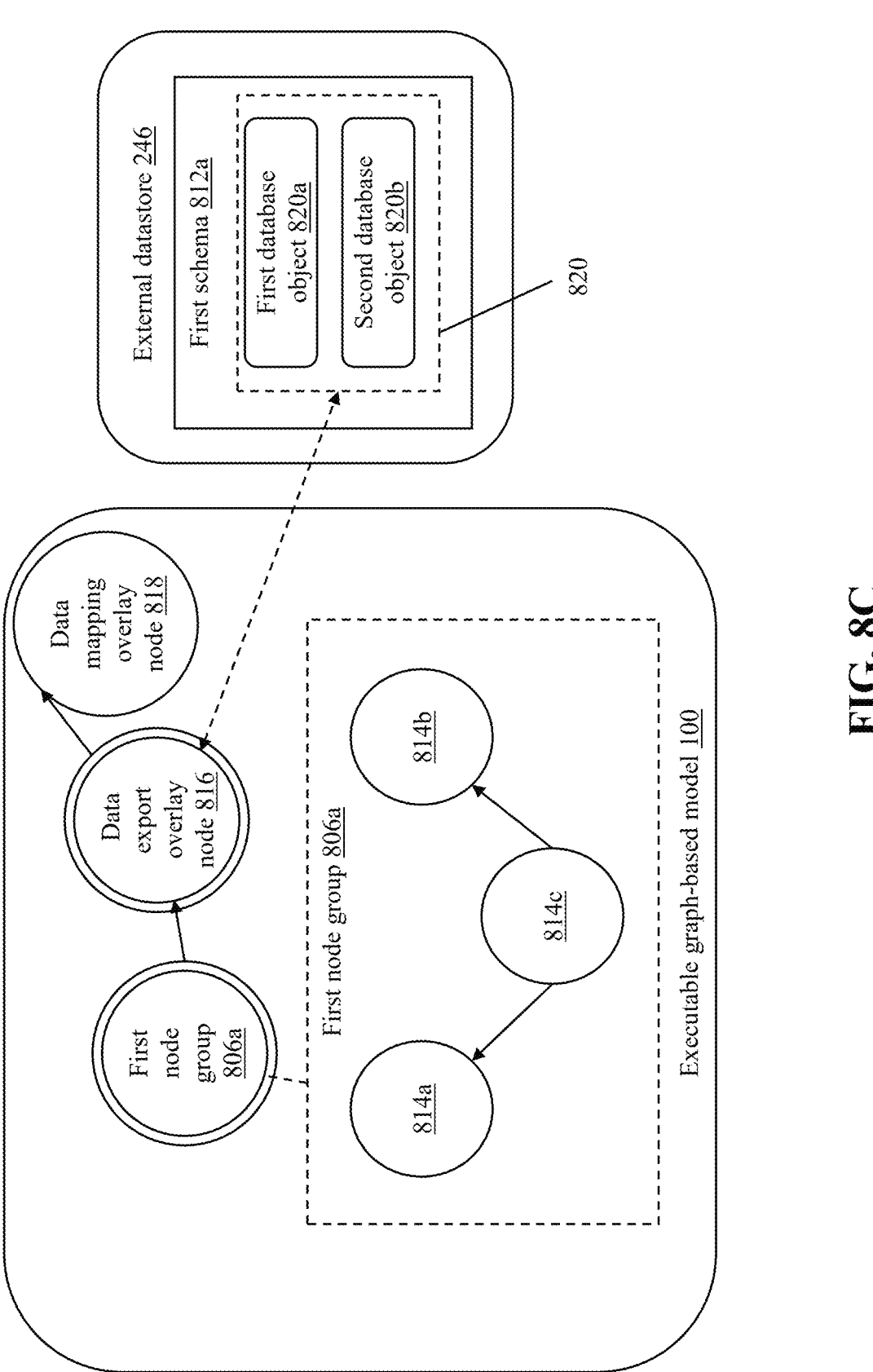

Referring to FIG. 8C, the first node group 806*a* is shown to include a fourth set of active nodes 814*a*-814*c*. In reference to the above-described example, the active node 814*a* may represent the patient ID and the active node 814*b* may represent the first name. Further, the active node 814*c* may couple the active node 814*a* to the active node 814*b* and define the relationship therebetween. Thus, each of the active nodes 814*a* and 814*b* has the vertex node-type 328 and the active node 814*c* has the edge node-type 330.

The executable graph-based model 100 may further include a data export overlay node 816 that extends functionality of the first node group 806*a*, and a data mapping overlay node 818 that extends functionality of the data export overlay node 816. The data export overlay node 816 may be structurally and functionally similar to the datastore overlay node 402 with the data export overlay node-type 444. Further, the data mapping overlay node 818 may be structurally and functionally similar to the datastore overlay node 402 with the data mapping overlay node-type 438.

The processing circuitry (for example, the controller module 206, the transaction module 208, the external datastore management module 222, or the like) may be further configured to create, in the first schema 812*a*, a first set of database objects 820 with a first database object 820*a* that implements the fourth set of active nodes 814*a*-814*c* of the first node group 806*a*. In reference to the above-described example, the first database object 820*a* may represent the patient information table in the patient data schema. Further, the first database object 820*a* may include the patient ID and the first name as the fields of the patient information table. Similarly, a second database object 820*b* of the first set of database objects 820 may implement another set of active nodes of the first node group 806*a*.

The processing circuitry (for example, the controller module 206, the transaction module 208, the external datastore management module 222, or the like) may be further configured to determine, using the data mapping overlay node 818, the fourth set of active nodes 814*a*-814*c* of the plurality of active nodes of the first node group 806*a*. Further, the first database object 820*a*, that implements the fourth set of active nodes 814*a*-814*c*, is created using the data export overlay node 816.

Although it is described that the first set of database objects 820 includes two database objects, the scope of the present disclosure is not limited to it. In additional embodiments, the first set of database objects 820 may include more than two database objects.

Although FIG. 8C describes the creation of the first set of database objects 820 in the first schema 812*a*, the scope of the present disclosure is not limited to it. In various embodiments, a corresponding set of database objects may be similarly created in each remaining schema of the plurality of schemas 812.

Figure 8D:
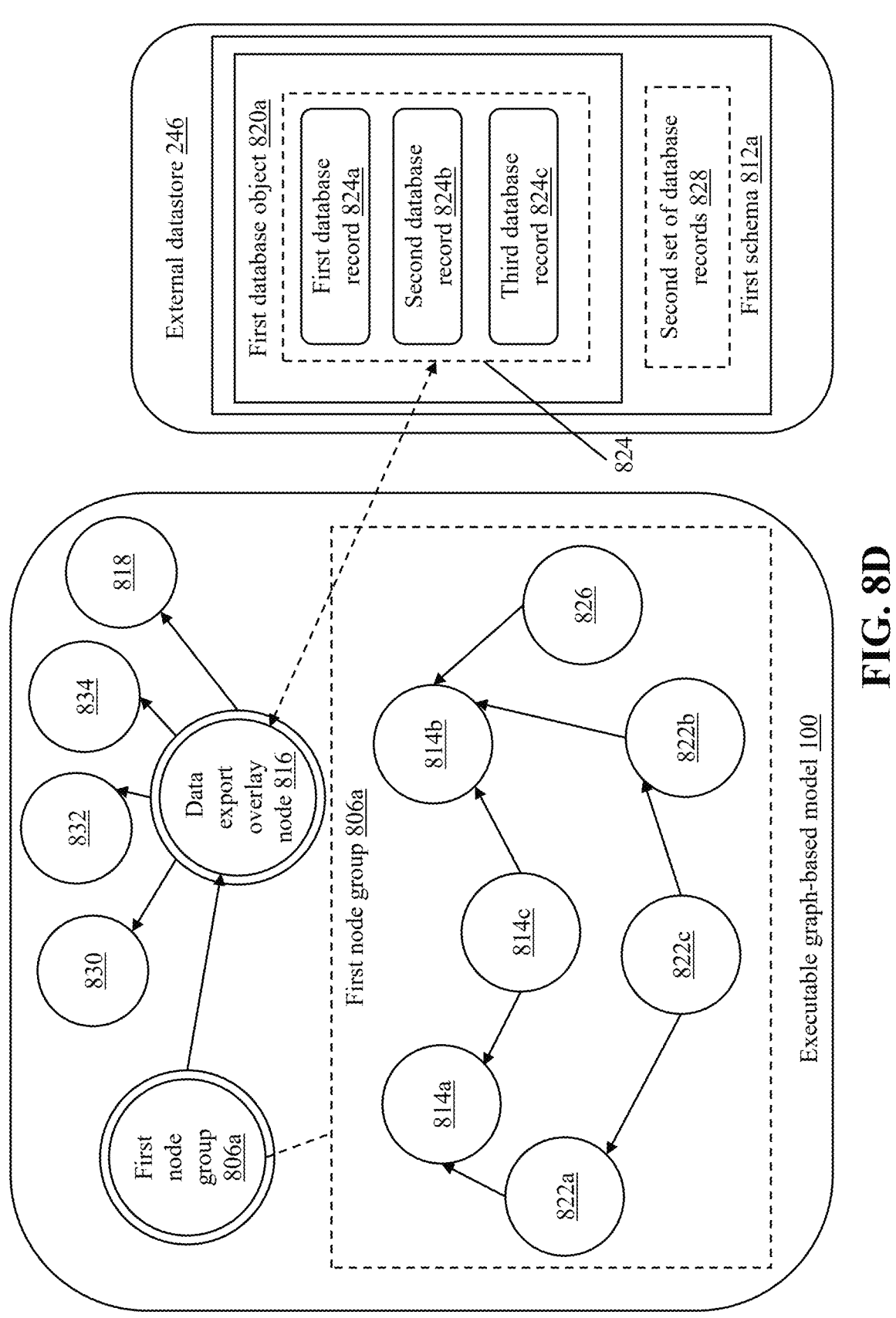

Referring to FIG. 8D, the executable graph-based model 100 is shown to include a fifth set of active nodes 822*a*-822*c* associated with the fourth set of active nodes 814*a*-814*c*. In reference to the above-described example, the active node 822*a* may correspond to a value for the patient ID represented by the active node 814*a*. Further, the active node 822*b* may correspond to a value for the first name represented by the active node 814*b*. Additionally, the active node 822*c* may couple the active node 822*a* to the active node 822*b* and define the relationship therebetween.

The processing circuitry (for example, the controller module 206, the transaction module 208, the external datastore management module 222, or the like) may be further configured to create, a first set of database records 824 with a first database record 824a that implements the fifth set of active nodes 822a-822c associated with the fourth set of active nodes 814a-814c. The first database record 824a may represent the value for the patient ID and the first name in the first database object 820a. In some examples, the first database record 824a may be associated with a first patient of the plurality of patients associated with the medical diagnosis system. Further, the processing circuitry (for example, the controller module 206, the transaction module 208, the external datastore management module 222, or the like) may be configured to determine, using the data mapping overlay node 818, the fifth set of active nodes 822a-822c associated with the fifth set of active nodes 822a-822c. Further, the first database record 824a, that implements the fifth set of active nodes 822a-822c may be created using the data export overlay node 816. The processing circuitry (for example, the controller module 206, the transaction module 208, the external datastore management module 222, or the like) may create a second database record 824b and a third database record 824c, of the first set of database records 824, similarly to the creation of the first database record 824a.

The processing circuitry (for example, the controller module 206, the transaction module 208, or the like) may be further configured to execute one or more operations in the executable graph-based model 100. In reference to the above-described medical diagnosis system example, the one or more operations may be associated with diagnosis of various conditions associated with one or more patients of the plurality of patients. The execution of the one or more operations in the executable graph-based model 100 may result in modification of the executable graph-based model 100.

In some embodiments, the modification of the executable graph-based model 100 may correspond to addition of a sixth set of active nodes in the first node group 806a of the executable graph-based model 100. For the sake of brevity, the sixth set of active nodes is shown to include an active node 826. In such embodiments, the processing circuitry (for example, the controller module 206, the transaction module 208, the external datastore management module 222, or the like) may be configured to identify, using the data mapping overlay node 818, the sixth set of active nodes added to the first node group 806a. The processing circuitry (for example, the controller module 206, the transaction module 208, the external datastore management module 222, or the like) may be further configured to create, using the data export overlay node 816, a second set of database records 828 that implements the identified sixth set of active nodes in the first schema 812a of the external datastore 246.

The executable graph-based model 100 may further include a creation overlay node 830 that extends functionality of the data export overlay node 816. Further, the creation of the second set of database records 828 in the first schema 812a may be further based on the creation overlay node 830.

In some embodiments, the modification of the executable graph-based model 100 may correspond to modification of a sixth set of active nodes in the executable graph-based model 100. The sixth set of active nodes may include one or more active nodes of the fifth set of active nodes 822a-822c. In an example, the sixth set of active nodes may include the active node 822a. The processing circuitry (for example, the controller module 206, the transaction module 208, the external datastore management module 222, or the like) may be further configured to identify, using the data mapping overlay node 818, the modified sixth set of active nodes in the first node group 806a. Further, the processing circuitry (for example, the controller module 206, the transaction module 208, the external datastore management module 222, or the like) may be configured to update, using the data export overlay node 816, one or more database records of the first set of database records 824 based on the identified sixth set of active nodes.

The executable graph-based model 100 may further include an update overlay node 832 that extends functionality of the data export overlay node 816. Further, the update of the one or more database records of the first set of database records 824 in the first schema 812a may be further based on the update overlay node 832.

In some embodiments, the modification of the executable graph-based model 100 may correspond to deletion of a sixth set of active nodes in the first node group 806a of the executable graph-based model 100. The sixth set of active nodes may include one or more active nodes of the fifth set of active nodes 822a-822c. In such embodiments, the processing circuitry (for example, the controller module 206, the transaction module 208, the external datastore management module 222, or the like) may be further configured to determine, using the data mapping overlay node 818, the deleted sixth set of active nodes in the first node group 806a. The processing circuitry (for example, the controller module 206, the transaction module 208, the external datastore management module 222, or the like) may be further configured to delete, using the data export overlay node 816, one or more database records of the first set of database records 824 based on the determined sixth set of active nodes.

The executable graph-based model 100 may further include a delete overlay node 834 that extends functionality of the data export overlay node 816. Further, the deletion of the one or more database records of the first set of database records 824 in the first schema 812a may be further based on the delete overlay node 834.

Figure 9:
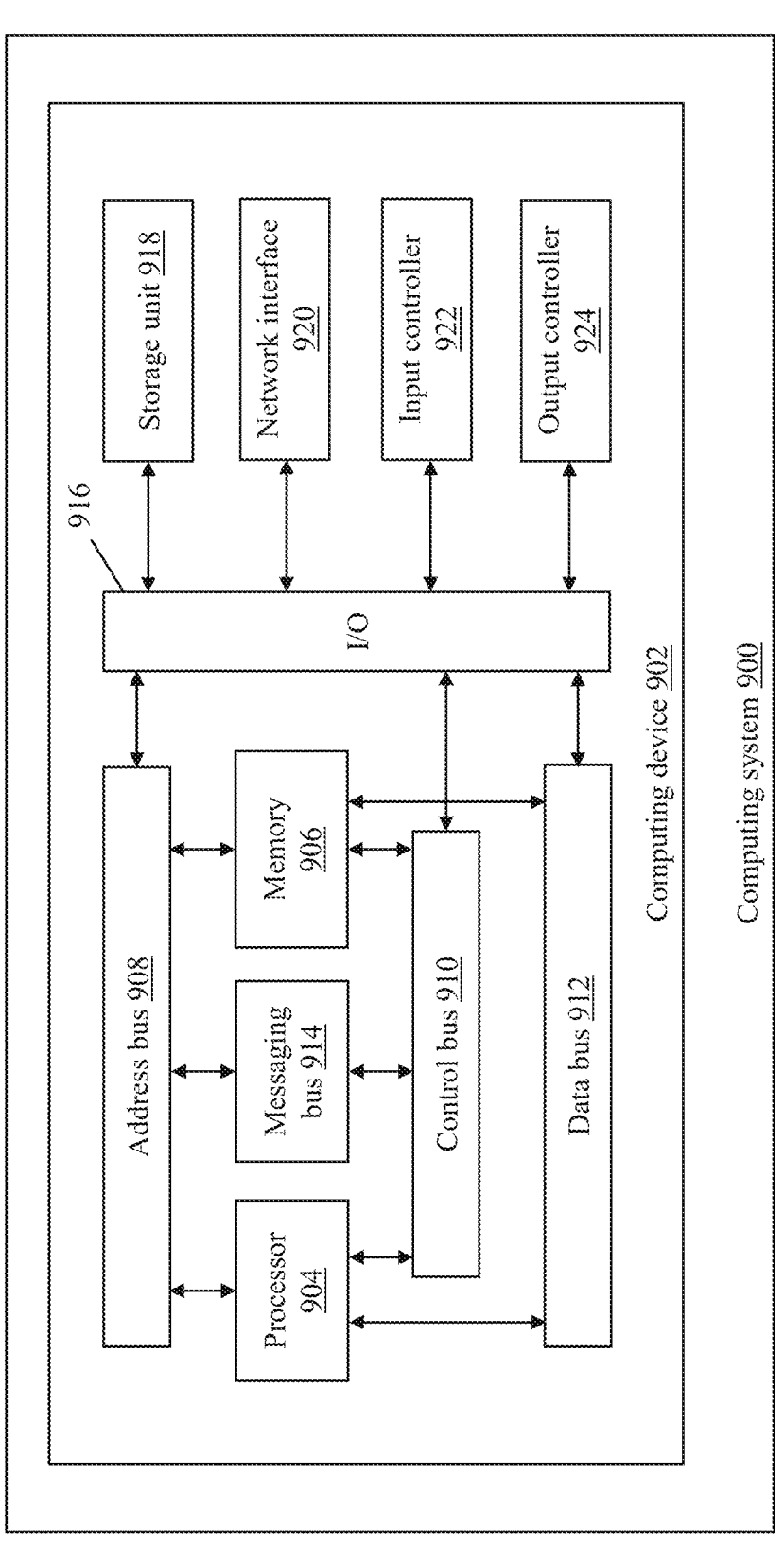
FIG. 9 shows an example computing system for carrying out methods of the present disclosure, consistent with disclosed embodiments of the present disclosure.

FIG. 9 shows an example computing system 900 for carrying out methods of the present disclosure, consistent with disclosed embodiments of the present disclosure. Specifically, FIG. 9 shows a block diagram of an embodiment of the computing system 900 according to example embodiments of the present disclosure.

The computing system 900 may be configured to perform any of the operations disclosed herein, such as for example, any of the operations discussed with reference to the functional modules described in relation to FIG. 2. The computing system 900 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 900 is a distributed system configured to function using multiple computing machines interconnected via a data network or bus system.

The computing system 900 includes computing devices (such as a computing device 902). The computing device 902 includes one or more processors (such as a processor 904) and a memory 906. The processor 904 may be any general-purpose processor(s) configured to execute a set of instructions. For example, the processor 904 may be a processor core, a multiprocessor, a reconfigurable processor, a microcontroller, a digital signal processor (DSP), an application-specific integrated circuit (ASIC), a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), a field programmable gate array (FPGA), a programmable logic device (PLD), a controller, a state machine, gated logic, discrete hardware component, any other processing unit, or any combination or multiplicity thereof. In one embodiment, the processor 904 may be multiple processing units, a single processing core, multiple processing cores, special purpose processing cores, co-processors, or any combination thereof. The processor 904 may be communicatively coupled to the memory 906 via an address bus 908, a control bus 910, a data bus 912, and a messaging bus 914.

The memory 906 may include non-volatile memories such as a read-only memory (ROM), a programable read-only memory (PROM), an erasable programmable read-only memory (EPROM), a flash memory, or any other device capable of storing program instructions or data with or without applied power. The memory 906 may also include volatile memories, such as a random-access memory (RAM), a static random-access memory (SRAM), a dynamic random-access memory (DRAM), and a synchronous dynamic random-access memory (SDRAM). The memory 906 may include single or multiple memory modules. While the memory 906 is depicted as part of the computing device 902, a person skilled in the art will recognize that the memory 906 can be separate from the computing device 902.

The memory 906 may store information that can be accessed by the processor 904. For instance, the memory 906 (e.g., one or more non-transitory computer-readable storage mediums, memory devices) may include computer-readable instructions (not shown) that can be executed by the processor 904. The computer-readable instructions may be software written in any suitable programming language or may be implemented in hardware. Additionally, or alternatively, the computer-readable instructions may be executed in logically and/or virtually separate threads on the processor 904. For example, the memory 906 may store instructions (not shown) that when executed by the processor 904 cause the processor 904 to perform operations such as any of the operations and functions for which the computing system 900 is configured, as described herein. Additionally, or alternatively, the memory 906 may store data (not shown) that can be obtained, received, accessed, written, manipulated, created, and/or stored. The data can include, for instance, the data and/or information described herein in relation to FIGS. 1-8D. In some implementations, the computing device 902 may obtain from and/or store data in one or more memory device(s) that are remote from the computing system 900.

The computing device 902 may further include an input/output (I/O) interface 916 communicatively coupled to the address bus 908, the control bus 910, and the data bus 912. The data bus 912 and messaging bus 914 may include a plurality of tunnels that may support parallel execution of messages by the overlay system 202. The I/O interface 916 is configured to couple to one or more external devices (e.g., to receive and send data from/to one or more external devices). Such external devices, along with the various internal devices, may also be known as peripheral devices. The I/O interface 916 may include both electrical and physical connections for operably coupling the various peripheral devices to the computing device 902. The I/O interface 916 may be configured to communicate data, addresses, and control signals between the peripheral devices and the computing device 902. The I/O interface 916 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, FireWire, various video buses, or the like. The I/O interface 916 is configured to implement only one interface or bus technology. Alternatively, the I/O interface 916 is configured to implement multiple interfaces or bus technologies. The I/O interface 916 may include one or more buffers for buffering transmissions between one or more external devices, internal devices, the computing device 902, or the processor 904. The I/O interface 916 may couple the computing device 902 to various input devices, including mice, touch screens, scanners, biometric readers, electronic digitizers, sensors, receivers, touchpads, trackballs, cameras, microphones, keyboards, any other pointing devices, or any combinations thereof. The I/O interface 916 may couple the computing device 902 to various output devices, including video displays, speakers, printers, projectors, tactile feedback devices, automation control, robotic components, actuators, motors, fans, solenoids, valves, pumps, transmitters, signal emitters, lights, and so forth.

The computing system 900 may further include a storage unit 918, a network interface 920, an input controller 922, and an output controller 924. The storage unit 918, the network interface 920, the input controller 922, and the output controller 924 are communicatively coupled to the central control unit (e.g., the memory 906, the address bus 908, the control bus 910, and the data bus 912) via the I/O interface 916. The network interface 920 communicatively couples the computing system 900 to one or more networks such as wide area networks (WAN), local area networks (LAN), intranets, the Internet, wireless access networks, wired networks, mobile networks, telephone networks, optical networks, or combinations thereof. The network interface 920 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 918 is a computer-readable medium, preferably a non-transitory computer-readable medium, comprising one or more programs, the one or more programs comprising instructions which when executed by the processor 904 cause the computing system 900 to perform the method steps of the present disclosure. Alternatively, the storage unit 918 is a transitory computer-readable medium. The storage unit 918 can include a hard disk, a floppy disk, a compact disc read-only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 918 stores one or more operating systems, application programs, program modules, data, or any other information. The storage unit 918 is part of the computing device 902. Alternatively, the storage unit 918 is part of one or more other computing machines that are in communication with the computing device 902, such as servers, database servers, cloud storage, network attached storage, and so forth.

The input controller 922 may include suitable logic, circuitry, interfaces, and/or code, executable by the circuitry, that may be configured to control one or more input devices that may be configured to receive an input (e.g., the first stimulus of the set of stimuli 238) for the overlay system 202. The output controller 924 may include suitable logic, circuitry, interfaces, and/or code, executable by the circuitry, that may be configured to control one or more output devices that may be configured to render/output the outcome (e.g., the outcome 242) of the operation executed to process the received input (e.g., the first stimulus of the set of stimuli 238).

FIG. 10 illustrates a flowchart 1000 of a method for facilitation of an executable graph-based model using an external datastore, consistent with disclosed embodiments of the present disclosure. Referring to FIG. 10, at 1002, a stimulus (for example, the first stimulus of the set of stimuli 238) associated with an overlay system (for example, the overlay system 202) is received. The processing circuitry (for example, the controller module 206, the stimuli management module 212, or the like) receives the stimulus. The stimulus is indicative of a creation of an executable graph-based model (for example, the executable graph-based model 100) that implements an external datastore (for example, the external datastore 246).

At 1004, the executable graph-based model that implements the external datastore associated with the overlay system is created in a storage element of the overlay system based on the stimulus. The processing circuitry (for example, the controller module 206, the stimuli management module 212, the external datastore management module 222, or the like) creates the executable graph-based model in the storage element.

At 1006, a plurality of node groups that implements a plurality of schemas (for example, the plurality of schemas 702) associated with the external datastore is created in the executable graph-based model, with a first node group (for example, the first node group 708a) created for a first schema (for example, the first schema 702a). The processing circuitry (for example, the controller module 206, the stimuli management module 212, the external datastore management module 222, or the like) creates the plurality of node groups in the executable graph-based model.

At 1008, a first set of active nodes (for example, the first set of active nodes 716a-716c) that implements a first database object associated with the first schema is created in the first node group. The processing circuitry (for example, the controller module 206, the stimuli management module 212, the external datastore management module 222, or the like) creates the first set of active nodes in the first node group.

At 1010, a second set of active nodes (for example, the second set of active nodes 724a-724c) that implements a first set of database records associated with the first database object is created in the first node group. The processing circuitry (for example, the controller module 206, the stimuli management module 212, the external datastore management module 222, or the like) creates the second set of active nodes in the first node group.

At 1012, one or more operations are executed in executable graph-based model. The processing circuitry (for example, the controller module 206, the stimuli management module 212, the external datastore management module, or the like) executes the one or more operations.

FIG. 11 illustrates a flowchart 1100 of a method for facilitation of an external datastore using an executable graph-based model, consistent with disclosed embodiments of the present disclosure. Referring to FIG. 11, at 1102, a stimulus (for example, the third stimulus of the set of stimuli 238) associated with an overlay system (for example, the overlay system 202) is received. The processing circuitry (for example, the controller module 206, the stimuli management module 212, or the like) receives the stimulus. The stimulus is indicative of a creation of an external datastore (for example, the external datastore 246) that implements an executable graph-based model (for example, the executable graph-based model 100).

At 1104, the external datastore that implements the executable graph-based model is created in a server (for example, the server 244) associated with overlay system using a datastore export overlay node (for example, the datastore export overlay node 802) and a datastore mapping overlay node (for example, the datastore mapping overlay node 804), based on the stimulus. The processing circuitry (for example, the controller module 206, the stimuli management module 212, the external datastore management module 222, or the like) creates the external datastore in the server.

At 1106, a plurality of schemas (for example, the plurality of schemas 812) that implements a plurality of node groups is created in the external datastore, with a first schema (for example, the first schema 812a) created for a first node group (for example, the first node group 806a). The processing circuitry (for example, the controller module 206, the stimuli management module 212, the external datastore management module 222, or the like) creates the plurality of schemas in the external datastore.

At 1108, a first set of database objects (for example, the first set of database objects 820) with a first database object (for example, the first database object 820a) that implements a first set of active nodes (for example, the fourth set of active nodes 814a-814c) of the first node group is created in the first schema. The processing circuitry (for example, the controller module 206, the stimuli management module 212, the external datastore management module 222, or the like) creates the first set of database objects in the first schema.

At 1110, a first set of database records (for example, the first set of database records 824) with a first database record (for example, the first database record 824a) that implements a second set of active nodes (for example, the fifth set of active nodes 822a-822c) associated with the first set of active nodes is created in the first schema. The processing circuitry (for example, the controller module 206, the stimuli management module 212, the external datastore management module 222, or the like) creates the first set of database records in the first schema.

The disclosed embodiments encompass numerous advantages including a simple and user-friendly implementation of the executable graph-based model 100 that may be in turn used to implement various complex and advanced applications. Further, the disclosed systems and methods allow for creation of the executable graph-based model 100 using the external datastore 246 that may prevent the latency associated with the loading and unloading of the external datastore 246 as the capabilities associated with the overlay system 202 may be leveraged by way of the executable graph-based model 100. That is to say, the execution of one or more operations utilizing the external datastore 246 may be more performant upon being implemented as the executable graph-based model 100 due to the efficient computing and processing capabilities as well as the low-latency behavior of the overlay system 202. Application areas of the systems and methods disclosed herein are fintech platforms, social media platforms, gaming platforms, research and analytics platforms, robotics, medical diagnosis systems, AI and ML applications, or the like.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems, and methods for facilitating an executable graph-based model using an external datastore. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:

1. An overlay system, comprising:
    a storage element; and
    processing circuitry that is coupled to the storage element, and configured to:
        receive a stimulus associated with the overlay system;
        create, in the storage element, based on the stimulus, an executable graph-based model that implements an external datastore associated with the overlay system;
        create, in the executable graph-based model, a plurality of node groups that implements a plurality of schemas associated with the external datastore, with a first node group created for a first schema;
        create, in the first node group, a first set of active nodes that implements a first database object associated with the first schema;
        create, in the first node group, a second set of active nodes that implements a first set of database records associated with the first database object; and
        execute one or more operations in the executable graph-based model.
2. The overlay system of 1, wherein the processing circuitry is further configured to:
    create, in the storage element, a datastore import overlay node that extends functionality of the executable graph-based model, and a datastore mapping overlay node that extends functionality of the datastore import overlay node; and determine, using the datastore import overlay node, the first schema of the plurality of schemas, wherein the first node group, that implements the first schema, is created using the datastore mapping overlay node.
3. The overlay system of 2, wherein the processing circuitry is further configured to determine, using the datastore import overlay node, at least one of a set of data formats, a set of views, a set of triggers, or a size, of the first schema, and wherein the creation of the first node group is further based on the determination of at least one of the set of data formats, the set of views, the set of triggers, or the size, of the first schema.
4. The overlay system of 2, wherein the processing circuitry is further configured to:
    create, in the executable graph-based model, a schema import overlay node that extends functionality of the first node group, and a schema mapping overlay node that extends functionality of the schema import overlay node, wherein the first schema has a plurality of database objects associated therewith; and
    determine, using the schema import overlay node, the first database object of the plurality of database objects, wherein the first set of active nodes, that implements the first database object, is created using the schema mapping overlay node.
5. The overlay system of 4, wherein the processing circuitry is further configured to:
    create, in the executable graph-based model, a data import overlay node that extends functionality of the first node group, and a data mapping overlay node that extends functionality of the data import overlay node; and
    determine, using the data import overlay node, the first set of database records associated with the first database object, wherein the second set of active nodes, that implements the first set of database records, is created using the data mapping overlay node.
6. The overlay system of 4, wherein the processing circuitry is further configured to:
    create, in the executable graph-based model, a listener overlay node that extends functionality of the data import overlay node;
    monitor the first schema of the external datastore using the listener overlay node and the data import overlay node; and
    update, using the data mapping overlay node, the first node group in the executable graph-based model based on the monitoring of the first schema.
7. The overlay system of 6, wherein the update of the first node group corresponds to at least one of addition, modification, or deletion of one or more active nodes in the first node group.
8. The overlay system of 6, wherein the monitoring of the first schema is periodic.
9. The overlay system of 6, wherein the monitoring of the first schema is continuous.
10. The overlay system of 6, wherein the update of the first node group is periodic.
11. The overlay system of 6, wherein the update of the first node group is in real-time.
12. The overlay system of 6, wherein the processing circuitry is further configured to:
    create, in the executable graph-based model, a search overlay node that extends functionality of the data import overlay node;

search, using the search overlay node and the data import overlay node, the first schema based on a search value;

retrieve, based on the search, a second set of database records from the first schema; and create, using the data mapping overlay node, a third set of active nodes in the first node group that implements the retrieved second set of database records.

13. The overlay system of 6, wherein the processing circuitry is further configured to:

create, in the executable graph-based model, a lookup overlay node that extends functionality of the data import overlay node;

lookup, using the lookup overlay node and the data import overlay node, the first schema based on one or more identifiers associated with the external datastore;

retrieve, based on the lookup, a second set of database records from the first schema; and create, using the data mapping overlay node, a third set of active nodes in the first node group that implements the retrieved second set of database records.

14. The overlay system of 6, wherein the processing circuitry is further configured to:

create, in the executable graph-based model, a data import overlay node that extends functionality of the first node group, and a data mapping overlay node and a retrieve-all overlay node, that extend functionality of the data import overlay node; and retrieve, using the data import overlay node and the retrieve-all overlay node, the first set of database records associated with the first database object, wherein the second set of active nodes that implements the first set of database records is created using the data mapping overlay node.

15. The overlay system of 1, wherein the execution of the one or more operations in the executable graph-based model results in modification of the executable graph-based model.

16. The overlay system of 15, wherein the modification of the executable graph-based model corresponds to addition of a third set of active nodes in the first node group of the executable graph-based model, and wherein the processing circuitry is further configured to:

create a data export overlay node that extends functionality of the first node group, and a data mapping overlay node that extends functionality of the data export overlay node;

identify, using the data mapping overlay node, the third set of active nodes added to the first node group; and create, using the data export overlay node, a second set of database records that implements the identified third set of active nodes in the first schema of the external datastore.

17. The overlay system of 16, wherein the processing circuitry is further configured to create a creation overlay node that extends functionality of the data export overlay node, and wherein the creation of the second set of database records in the first schema is further based on the creation overlay node.

18. The overlay system of 15, wherein the modification of the executable graph-based model corresponds to modification of a third set of active nodes in the executable graph-based model, wherein the third set of active nodes includes one or more active nodes of the second set of active nodes, and wherein the processing circuitry is further configured to:

create a data export overlay node that extends functionality of the first node group, and a data mapping overlay node that extends functionality of the data export overlay node;

identify, using the data mapping overlay node, the modified third set of active nodes in the first node group; and update, using the data export overlay node, one or more database records of the first set of database records based on the identified third set of active nodes.

19. The overlay system of 18, wherein the processing circuitry is further configured to create an update overlay node that extends functionality of the data export overlay node, and wherein the update of the one or more database records of the first set of database records in the first schema is further based on the update overlay node.

20. The overlay system of 15, wherein the modification of the executable graph-based model corresponds to deletion of a third set of active nodes in the first node group of the executable graph-based model, wherein the third set of active nodes includes one or more active nodes of the second set of active nodes, and wherein the processing circuitry is further configured to:

create a data export overlay node that extends functionality of the first node group and a data mapping overlay node that extends functionality of the data export overlay node;

determine, using the data mapping overlay node, the deleted third set of active nodes in the first node group; and delete, using the data export overlay node, one or more database records of the first set of database records based on the determined third set of active nodes.

21. The overlay system of 20, wherein the processing circuitry is further configured to create a delete overlay node that extends functionality of the data export overlay node, and wherein the deletion of the one or more database records of the first set of database records in the first schema is further based on the delete overlay node.

22. The overlay system of 1, wherein the executable graph-based model is one of persistable or non-persistable, wherein based on the executable graph-based model being persistable, the executable graph-based model is stored in the storage element, and wherein based on the executable graph-based model being non-persistable, the executable graph-based model ceases to exist from the storage element upon expiration of a threshold time-period.

23. The overlay system of 1, wherein the executable graph-based model is a run-time model that includes (i) an executable graph-based model template that defines a graph structure and (ii) an executable graph-based model instance that is an implementation of the executable graph-based model template.

24. An overlay system, comprising:

a storage element configured to store an executable graph-based model that includes a plurality of node groups, a datastore export overlay node that extends functionality of the executable graph-based model, and a datastore mapping overlay node that extends functionality of the datastore export overlay node, wherein each node group of the plurality of node groups comprises a plurality of active nodes; and processing circuitry that is coupled to the storage element, and configured to:

receive a stimulus associated with the overlay system; and create, based on the stimulus, using the datastore export overlay node and the datastore mapping overlay node, an external datastore that implements the executable graph-based model, in a server associated with the overlay system;

create, in the external datastore, a plurality of schemas that implements the plurality of node groups, with a first schema created for a first node group;

create, in the first schema, a first set of database objects with a first database object that implements a first set of active nodes of the first node group; and create, in the first schema, a first set of database records with a first database record that implements a second set of active nodes associated with the first set of active nodes.

25. The overlay system of 24, wherein the executable graph-based model further includes a schema export overlay node that extends functionality of the first node group, and a schema mapping overlay node that extends functionality of the schema export overlay node, and wherein the processing circuitry is further configured to:

determine, using the schema mapping overlay node, the first node group in the executable graph-based model, wherein the first schema, that implements the first node group, is created using the schema export overlay node.

26. The overlay system of 25, wherein the executable graph-based model further includes a data export overlay node that extends functionality of the first node group, and a data mapping overlay node that extends functionality of the data export overlay node, and wherein the processing circuitry is further configured to:

determine, using the data mapping overlay node, the first set of active nodes of the plurality of active nodes of the first node group, wherein the first database object, that implements the first set of active nodes, is created using the data export overlay node.

27. The overlay system of 26, wherein the processing circuitry is further configured to:

determine, using the data mapping overlay node, the second set of active nodes associated with the first set of active nodes, wherein the first database record, that implements the second set of active nodes is created using the data export overlay node.

28. A method, comprising:

receiving, by processing circuitry of an overlay system, a stimulus associated with the overlay system;

creating, in a storage element of the overlay system, based on the stimulus, an executable graph-based model that implements an external datastore associated with the overlay system;

creating, in the executable graph-based model, a plurality of node groups that implements a plurality of schemas associated with the external datastore, with a first node group created for a first schema;

creating, in the first node group, a first set of active nodes that implements a first database object associated with the first schema;

creating, in the first node group, a second set of active nodes that implements a first set of database records associated with the first database object; and executing one or more operations in the executable graph-based model.

What is claimed is:

1. An overlay system, comprising:

a storage element; and processing circuitry that is coupled to the storage element, and configured to:

receive a stimulus associated with the overlay system;

create, in the storage element, based on the stimulus, an executable graph-based model that implements an external datastore associated with the overlay system;

create, in the executable graph-based model, a plurality of node groups that implements a plurality of schemas associated with the external datastore, with a first node group created for a first schema;

create, in the first node group, a first set of active nodes that implements a first database object associated with the first schema;

create, in the first node group, a second set of active nodes that implements a first set of database records associated with the first database object; and execute one or more operations in the executable graph-based model.

2. The overlay system of claim 1, wherein the processing circuitry is further configured to:

create, in the storage element, a datastore import overlay node that extends functionality of the executable graph-based model, and a datastore mapping overlay node that extends functionality of the datastore import overlay node; and determine, using the datastore import overlay node, the first schema of the plurality of schemas, wherein the first node group, that implements the first schema, is created using the datastore mapping overlay node.

3. The overlay system of claim 2, wherein the processing circuitry is further configured to:

create, in the executable graph-based model, a schema import overlay node that extends functionality of the first node group, and a schema mapping overlay node that extends functionality of the schema import overlay node, wherein the first schema has a plurality of database objects associated therewith; and determine, using the schema import overlay node, the first database object of the plurality of database objects, wherein the first set of active nodes, that implements the first database object, is created using the schema mapping overlay node.

4. The overlay system of claim 3, wherein the processing circuitry is further configured to:

create, in the executable graph-based model, a data import overlay node that extends functionality of the first node group, and a data mapping overlay node that extends functionality of the data import overlay node; and determine, using the data import overlay node, the first set of database records associated with the first database object, wherein the second set of active nodes, that implements the first set of database records, is created using the data mapping overlay node.

5. The overlay system of claim 4, wherein the processing circuitry is further configured to:

create, in the executable graph-based model, a listener overlay node that extends functionality of the data import overlay node;

monitor the first schema of the external datastore using the listener overlay node and the data import overlay node; and update, using the data mapping overlay node, the first node group in the executable graph-based model based on the monitoring of the first schema.

6. The overlay system of claim 5, wherein the update of the first node group corresponds to at least one of addition, modification, or deletion of one or more active nodes in the first node group, wherein the monitoring of the first schema is one of periodic or continuous, and wherein the update of the first node group is one of periodic or is in real-time.

7. The overlay system of claim 4, wherein the processing circuitry is further configured to:

create, in the executable graph-based model, a search overlay node that extends functionality of the data import overlay node;

search, using the search overlay node and the data import overlay node, the first schema based on a search value;

retrieve, based on the search, a second set of database records from the first schema; and create, using the data mapping overlay node, a third set of active nodes in the first node group that implements the retrieved second set of database records.

8. The overlay system of claim 4, wherein the processing circuitry is further configured to:

create, in the executable graph-based model, a lookup overlay node that extends functionality of the data import overlay node;

lookup, using the lookup overlay node and the data import overlay node, the first schema based on one or more identifiers associated with the external datastore;

retrieve, based on the lookup, a second set of database records from the first schema; and create, using the data mapping overlay node, a third set of active nodes in the first node group that implements the retrieved second set of database records.

9. The overlay system of claim 3, wherein the processing circuitry is further configured to:

create, in the executable graph-based model, a data import overlay node that extends functionality of the first node group, and a data mapping overlay node and a retrieve-all overlay node, that extend functionality of the data import overlay node; and retrieve, using the data import overlay node and the retrieve-all overlay node, the first set of database records associated with the first database object, wherein the second set of active nodes that implements the first set of database records is created using the data mapping overlay node.

10. The overlay system of claim 1, wherein the execution of the one or more operations in the executable graph-based model results in modification of the executable graph-based model, wherein the modification of the executable graph-based model corresponds to addition of a third set of active nodes in the first node group of the executable graph-based model, and wherein the processing circuitry is further configured to:

create a data export overlay node that extends functionality of the first node group, and a data mapping overlay node that extends functionality of the data export overlay node;

identify, using the data mapping overlay node, the third set of active nodes added to the first node group; and create, using the data export overlay node, a second set of database records that implements the identified third set of active nodes in the first schema of the external datastore.

11. The overlay system of claim 10, wherein the processing circuitry is further configured to create a creation overlay node that extends functionality of the data export overlay node, and wherein the creation of the second set of database records in the first schema is further based on the creation overlay node.

12. The overlay system of claim 1, wherein the execution of the one or more operations in the executable graph-based model results in modification of the executable graph-based model, wherein the modification of the executable graph-based model corresponds to modification of a third set of active nodes in the executable graph-based model, wherein the third set of active nodes includes one or more active nodes of the second set of active nodes, and wherein the processing circuitry is further configured to:

create a data export overlay node that extends functionality of the first node group, and a data mapping overlay node that extends functionality of the data export overlay node;

identify, using the data mapping overlay node, the modified third set of active nodes in the first node group; and update, using the data export overlay node, one or more database records of the first set of database records based on the identified third set of active nodes.

13. The overlay system of claim 12, wherein the processing circuitry is further configured to create an update overlay node that extends functionality of the data export overlay node, and wherein the update of the one or more database records of the first set of database records in the first schema is further based on the update overlay node.

14. The overlay system of claim 1, wherein the execution of the one or more operations in the executable graph-based model results in modification of the executable graph-based model, wherein the modification of the executable graph-based model corresponds to deletion of a third set of active nodes in the first node group of the executable graph-based model, wherein the third set of active nodes includes one or more active nodes of the second set of active nodes, and wherein the processing circuitry is further configured to:

create a data export overlay node that extends functionality of the first node group and a data mapping overlay node that extends functionality of the data export overlay node;

determine, using the data mapping overlay node, the deleted third set of active nodes in the first node group; and delete, using the data export overlay node, one or more database records of the first set of database records based on the determined third set of active nodes.

15. The overlay system of claim 14, wherein the processing circuitry is further configured to create a delete overlay node that extends functionality of the data export overlay node, and wherein the deletion of the one or more database records of the first set of database records in the first schema is further based on the delete overlay node.

16. The overlay system of claim 1, wherein the executable graph-based model is a run-time model that includes (i) an executable graph-based model template that defines a graph structure and (ii) an executable graph-based model instance that is an implementation of the executable graph-based model template.

17. An overlay system, comprising:

a storage element configured to store an executable graph-based model that includes a plurality of node groups, a datastore export overlay node that extends functionality of the executable graph-based model, and a datastore mapping overlay node that extends functionality of the datastore export overlay node, wherein each node group of the plurality of node groups comprises a plurality of active nodes; and processing circuitry that is coupled to the storage element, and configured to:

receive a stimulus associated with the overlay system; create, based on the stimulus, using the datastore export overlay node and the datastore mapping overlay node, an external datastore that implements the executable graph-based model, in a server associated with the overlay system; create, in the external datastore, a plurality of schemas that implements the plurality of node groups, with a first schema created for a first node group;

create, in the first schema, a first set of database objects with a first database object that implements a first set of active nodes of the first node group; and create, in the first schema, a first set of database records with a first database record that implements a second set of active nodes associated with the first set of active nodes.

18. The overlay system of claim 17, wherein the executable graph-based model further includes a schema export overlay node that extends functionality of the first node group, and a schema mapping overlay node that extends functionality of the schema export overlay node, wherein the processing circuitry is further configured to determine, using the schema mapping overlay node, the first node group in the executable graph-based model, and wherein the first schema, that implements the first node group, is created using the schema export overlay node.

19. The overlay system of claim 18, wherein the executable graph-based model further includes a data export overlay node that extends functionality of the first node group, and a data mapping overlay node that extends functionality of the data export overlay node, wherein the processing circuitry is further configured to determine, using the data mapping overlay node, the first set of active nodes of the plurality of active nodes of the first node group, and wherein the first database object, that implements the first set of active nodes, is created using the data export overlay node.

20. A method, comprising:

receiving, by processing circuitry of an overlay system, a stimulus associated with the overlay system;

creating, in a storage element of the overlay system, based on the stimulus, an executable graph-based model that implements an external datastore associated with the overlay system;

creating, in the executable graph-based model, a plurality of node groups that implements a plurality of schemas associated with the external datastore, with a first node group created for a first schema;

creating, in the first node group, a first set of active nodes that implements a first database object associated with the first schema;

creating, in the first node group, a second set of active nodes that implements a first set of database records associated with the first database object; and executing one or more operations in the executable graph-based model.

\* \* \* \* \*